(12) United States Patent
Park et al.

(10) Patent No.: US 10,506,625 B2
(45) Date of Patent: Dec. 10, 2019

(54) METHOD FOR TRANSMITTING AND RECEIVING SCHEDULING REQUEST BETWEEN TERMINAL AND BASE STATION IN WIRELESS COMMUNICATION SYSTEM AND DEVICE FOR SUPPORTING SAME

(71) Applicant: LG ELECTRONICS INC., Seoul (KR)

(72) Inventors: Hanjun Park, Seoul (KR); Seonwook Kim, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/248,653

(22) Filed: Jan. 15, 2019

(65) Prior Publication Data

US 2019/0246416 A1    Aug. 8, 2019

Related U.S. Application Data

(63) Continuation of application No. PCT/KR2018/005149, filed on May 3, 2018.

(60) Provisional application No. 62/635,476, filed on Feb. 26, 2018, provisional application No. 62/630,308, filed on Feb. 14, 2018, provisional application No. 62/620,982, filed on Jan. 23, 2018, provisional application No. 62/620,394, filed on Jan. 22, 2018, provisional application No. 62/616,461, filed on Jan. 12, 2018, provisional application No. 62/590,633, filed on Nov. 26, 2017, provisional application No.
(Continued)

(30) Foreign Application Priority Data

May 3, 2018    (KR) .................. 10-2018-0051192

(51) Int. Cl.
| | | |
|---|---|---|
| H04W 72/12 | (2009.01) | |
| H04L 1/18 | (2006.01) | |
| H04W 88/08 | (2009.01) | |
| H04W 4/70 | (2018.01) | |

(52) U.S. Cl.
CPC ....... *H04W 72/1278* (2013.01); *H04L 1/1812* (2013.01); *H04W 4/70* (2018.02); *H04W 88/08* (2013.01)

(58) Field of Classification Search
CPC ................................................ H04L 1/1812
See application file for complete search history.

(56) References Cited

U.S. PATENT DOCUMENTS

2011/0045860 A1* 2/2011 Nam ............... H04L 5/0023
455/509
2012/0033628 A1* 2/2012 Eriksson ......... H04W 72/1284
370/329
(Continued)

FOREIGN PATENT DOCUMENTS

WO    WO2016048522    3/2016

OTHER PUBLICATIONS

Ericsson, "Handling Overlapping Allocations with Short and 1ms TTI", Feb. 2017, R1-1703258 (Year: 2017).*
(Continued)

*Primary Examiner* — Jamaal Henson
(74) *Attorney, Agent, or Firm* — Fish & Richardson P.C.

(57) ABSTRACT

Disclosed are a method for transmitting and receiving a scheduling request between a terminal and a base station in a wireless communication system, and a device for supporting same.

17 Claims, 13 Drawing Sheets

Related U.S. Application Data

62/587,519, filed on Nov. 17, 2017, provisional application No. 62/586,917, filed on Nov. 16, 2017, provisional application No. 62/566,341, filed on Sep. 30, 2017, provisional application No. 62/555,689, filed on Sep. 8, 2017, provisional application No. 62/549,367, filed on Aug. 23, 2017, provisional application No. 62/547,891, filed on Aug. 21, 2017, provisional application No. 62/543,946, filed on Aug. 10, 2017, provisional application No. 62/501,060, filed on May 3, 2017.

(56) References Cited

U.S. PATENT DOCUMENTS

| | | | |
|---|---|---|---|
| 2014/0010126 A1* | 1/2014 | Sayana | H04J 3/1694 370/280 |
| 2016/0094996 A1* | 3/2016 | Xiong | H04W 4/70 370/329 |
| 2016/0183290 A1* | 6/2016 | Ko | H04W 52/365 370/329 |
| 2017/0013641 A1* | 1/2017 | Patel | H04L 1/0027 |

OTHER PUBLICATIONS

Intel Corporation, "UCI contents and UL control channel formats," R1-1609536, 3GPP TSG-RAN WG1 #86bis, Lisbon, Portugal, Oct. 10-14, 2016, 6 pages.

Intel Corporation, "Scheduling request design for NR," R1-1700370, 3GPP TSG RAN WG1 NR Ad-Hoc Meeting, Spokane, USA, Jan. 16-20, 2017, 4 pages.

Intel Corporation, "Scheduling request design for NR," R1-1704760, 3GPP TSG RAN WG1 Meeting #88bis, Spokane, USA, Apr. 3-7, 2017, 4 pages.

LG Electronics, "Design of short NR-PUCCH format," R1-1704907, 3GPP TSG RAN WG1 Meeting #88bis, Spokane, USA, Apr. 3-7, 2017, 9 pages.

ZTE, Sanechips, "Summary of email discussion [90-09] on sPUCCH format design," R1-1717702, 3GPP TSG RAN WG1 Meeting #90bis, Prague, Czech Republic, Oct. 9-13, 2017, 23 pages.

Ericsson, "Summary of Short PUCCH structure (7.3.2.1)," R1-1718862, 3GPP TSG RAN WG1 Meeting AH_NR#3, Nagoya, Japan, Sep. 18-21, 2017, 12 pages.

MCC Support, "Draft Report of 3GPP TSG RAN WG1 #90bis v0.1.0 (Prague, Czech Rep, Oct. 9-13, 2017)," 3GPP TSG RAN WG1 Meeting #91, Reno, USA, Nov. 27-Dec. 1, 2017, 174 pages.

Sharp, "UCI reporting on PUCCH and PUSCH," R1-1700729, 3GPP TSG RAN WG1 NR Ad Hoc Meeting, Spokane, USA, Jan. 16-20, 2017, 3 pages.

* cited by examiner

METHOD FOR TRANSMITTING AND RECEIVING SCHEDULING REQUEST BETWEEN TERMINAL AND BASE STATION IN WIRELESS COMMUNICATION SYSTEM AND DEVICE FOR SUPPORTING SAME

CLAIM OF PRIORITY

This application is a continuation and claims priority to International Application Serial No. PCT/KR2018/005149, filed on May 3, 2018, which claims priority to provisional application Nos. 62/635,476 filed Feb. 26, 2018; 62/630,308 filed Feb. 14, 2018; 62/620,982 filed Jan. 23, 2018; 62/620,394 filed Jan. 22, 2018, 62/616,461 filed Jan. 12, 2018; 62/590,633 filed Nov. 26, 2017; 62/587,519 filed Nov. 17, 2017; 62/586,917 filed Nov. 16, 2017; 62/566,341 filed Sep. 30, 2017; 62/555,689 filed Sep. 8, 2017; 62/549,367 filed Aug. 23, 2017; 62/547,891 filed Aug. 21, 2017; 62/543,946 filed Aug. 10, 2017; 62/501,060 filed May 3, 2017; and KR 10-2018-0051192 filed May 3, 2018, the entire contents of which are hereby incorporated by reference.

TECHNICAL FIELD

The following description relates to a wireless communication system, and more particularly, to a method of transmitting and receiving a scheduling request between a user equipment (UE) and a base station (BS) in a wireless communication system, and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

An aspect of the present invention is to provide a method of transmitting and receiving a scheduling request (SR) between a user equipment (UE) and a base station (BS) in a wireless communication system, and an apparatus supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method of transmitting and receiving a scheduling request (SR) between a user equipment (UE) and a base station (BS) in a wireless communication system, and an apparatus supporting the same.

In an aspect of the present invention, a method of transmitting an SR) to a BS by a UE in a wireless communication system includes receiving, from the BS, first configuration information for one or more first uplink resources for SR transmission, and second configuration information for a second uplink resource carrying uplink control information (UCI), and when N first uplink resources for N SR transmissions (N is a natural number larger than 1) overlap with the second uplink resource in a time domain, transmitting bit information indicating SR information for N SR configurations along with the UCI in the second uplink resource.

The first configuration information may be received by higher-layer signaling.

Further, the second configuration information may be received in downlink control information (DCI).

The bit information indicating the SR information for the N SR configurations may indicate information about one of the N SR configurations, and positive SR information corresponding to the one SR configuration.

Or, the bit information indicating the SR information for the N SR configurations may include a plurality of bits indicating whether SR information corresponding to each of the N SR configurations is positive SR or negative SR.

When SR information corresponding to each of the plurality of bits is positive SR, the bit may have a value of 1, and when the SR information is negative SR, the bit may have a value of 0.

Further, the plurality of bits may be configured in an order of identification information about the N SR configurations.

In the above configuration, the N first uplink resources may overlap fully or partially with the second uplink resource in the time domain.

The second uplink resource may correspond to a physical uplink control channel (PUCCH) resource carrying the UCI.

Further, the bit information may be transmitted in the second uplink resource by using a coded bit format generated by combining the bit information with the UCI.

In the above configuration, the UCI may include channel state information (CSI) or hybrid automatic repeat request acknowledgement (HARQ-ACK) information.

In another aspect of the present invention, a method of receiving an SR from a UE by a BS in a wireless communication system includes transmitting, to the UE, first configuration information for one or more first uplink resources for SR transmission, and second configuration information for a second uplink resource carrying UCI, and when N first uplink resources for N SR transmissions (N is a natural number larger than 1) overlap with the second uplink resource in a time domain, receiving bit information indicating SR information for N SR configurations along with the UCI in the second uplink resource.

In another aspect of the present invention, a UE for transmitting an SR to a base station BS in a wireless communication system includes a receiver, a transmitter, and a processor operatively connected to the receiver and the transmitter. The processor is configured to receive, from the BS, first configuration information for one or more first uplink resources for SR transmission, and second configuration information for a second uplink resource carrying UCI, and when N first uplink resources for N SR transmissions (N is a natural number larger than 1) overlap with the second uplink resource in a time domain, to transmit bit information indicating SR information for N SR configurations along with the UCI in the second uplink resource.

In another aspect of the present invention, a BS for receiving an SR from a UE in a wireless communication system includes a receiver, a transmitter, and a processor operatively connected to the receiver and the transmitter. The processor is configured to transmit, to the UE, first configuration information for one or more first uplink resources for SR transmission, and second configuration information for a second uplink resource carrying UCI, and when N first uplink resources for N SR transmissions (N is a natural number larger than 1) overlap with the second uplink resource in a time domain, to receive bit information indicating SR information for N SR configurations along with the UCI in the second uplink resource.

In another aspect of the present invention, a method of transmitting an SR to a BS by a UE in a wireless communication system includes determining a first PUCCH format carrying SR information, and a second PUCCH format carrying HARQ-ACK information, and when the first PUCCH format is a PUCCH format including one or two symbols and supporting UCI of up to two bits, the second PUCCH format is a PUCCH format including four or more symbols and supporting UCI of up to two bits, and the SR information is positive SR, performing simultaneous transmission of the SR information and the HARQ-ACK information by transmitting only the HARQ-ACK information in the second PUCCH format.

When a first uplink resource carrying the SR information overlaps with a second uplink resource carrying the HARQ-ACK information in a time domain, the simultaneous transmission of the SR information and the HARQ-ACK information may be performed.

In another aspect of the present invention, a UE for transmitting an SR to a BS in a wireless communication system includes a receiver, a transmitter, and a processor operatively connected to the receiver and the transmitter. The processor is configured to determine a first PUCCH format carrying SR information, and a second PUCCH format carrying HARQ-ACK information, and when the first PUCCH format is a PUCCH format including one or two symbols and supporting UCI of up to two bits, the second PUCCH format is a PUCCH format including four or more symbols and supporting UCI of up to two bits, and the SR information is positive SR, to perform simultaneous transmission of the SR information and the HARQ-ACK information by transmitting only the HARQ-ACK information in the second PUCCH format.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present invention have the following effects.

According to the present invention, when a first uplink resource carrying a plurality of pieces of scheduling request (SR) information overlaps in the time domain with a second uplink resource carrying acknowledgement/negative acknowledgement (ACK/NACK) information, a user equipment (UE) may transmit bit information corresponding to the plurality of pieces of SR information, together with the ACK/NACK information in the second uplink resource.

Accordingly, the UE may transmit the plurality of pieces of SR information adaptively according to circumstances.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR CARRYING OUT THE INVENTION

Figure 1:
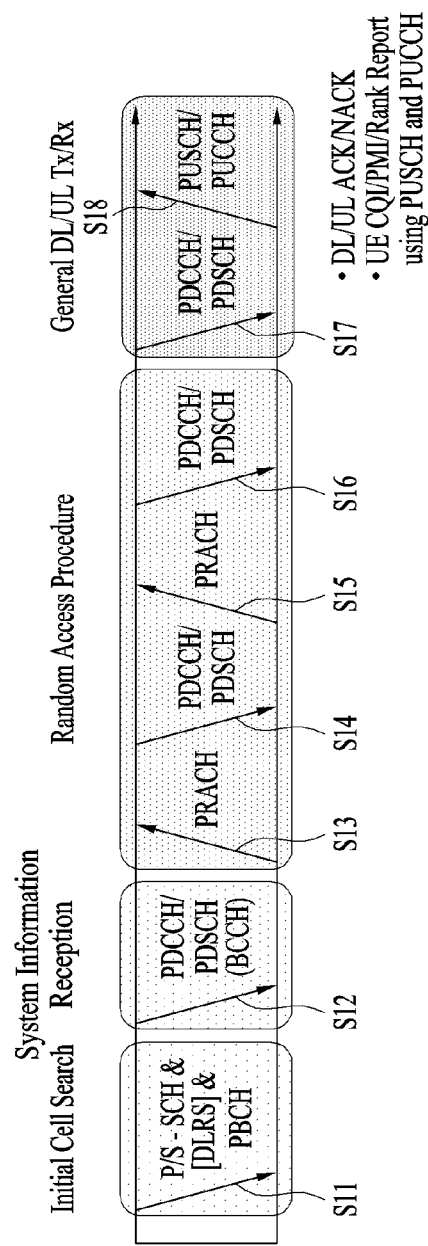
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems and 3GPP NR system are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While embodiments of the present invention are described in the context of a 3GPP NR system as well as a 3GPP LTE/LTE-A system in order to clarify the technical features of the present invention, the present invention is also applicable to an IEEE 802.16e/m system, and so on.

1. 3GPP LTE/LTE-A System

1.1. Physical Channels and Signal Transmission and Reception Method Using the Same In a wireless access system, a UE receives information from an base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an base station. Specifically, the UE synchronizes its timing to the base station and acquires information such as a cell Identifier (ID) by receiving a Primary Synchronization Channel (P-SCH) and a Secondary Synchronization Channel (S-SCH) from the base station.

Then the UE may acquire information broadcast in the cell by receiving a Physical Broadcast Channel (PBCH) from the base station.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the base station, the UE may perform a random access procedure with the base station (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the base station (S17) and transmit a Physical Uplink Shared Channel (PUSCH) and/or a Physical Uplink Control Channel (PUCCH) to the base station (S18), in a general UL/DL signal transmission procedure.

Control information that the UE transmits to the base station is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
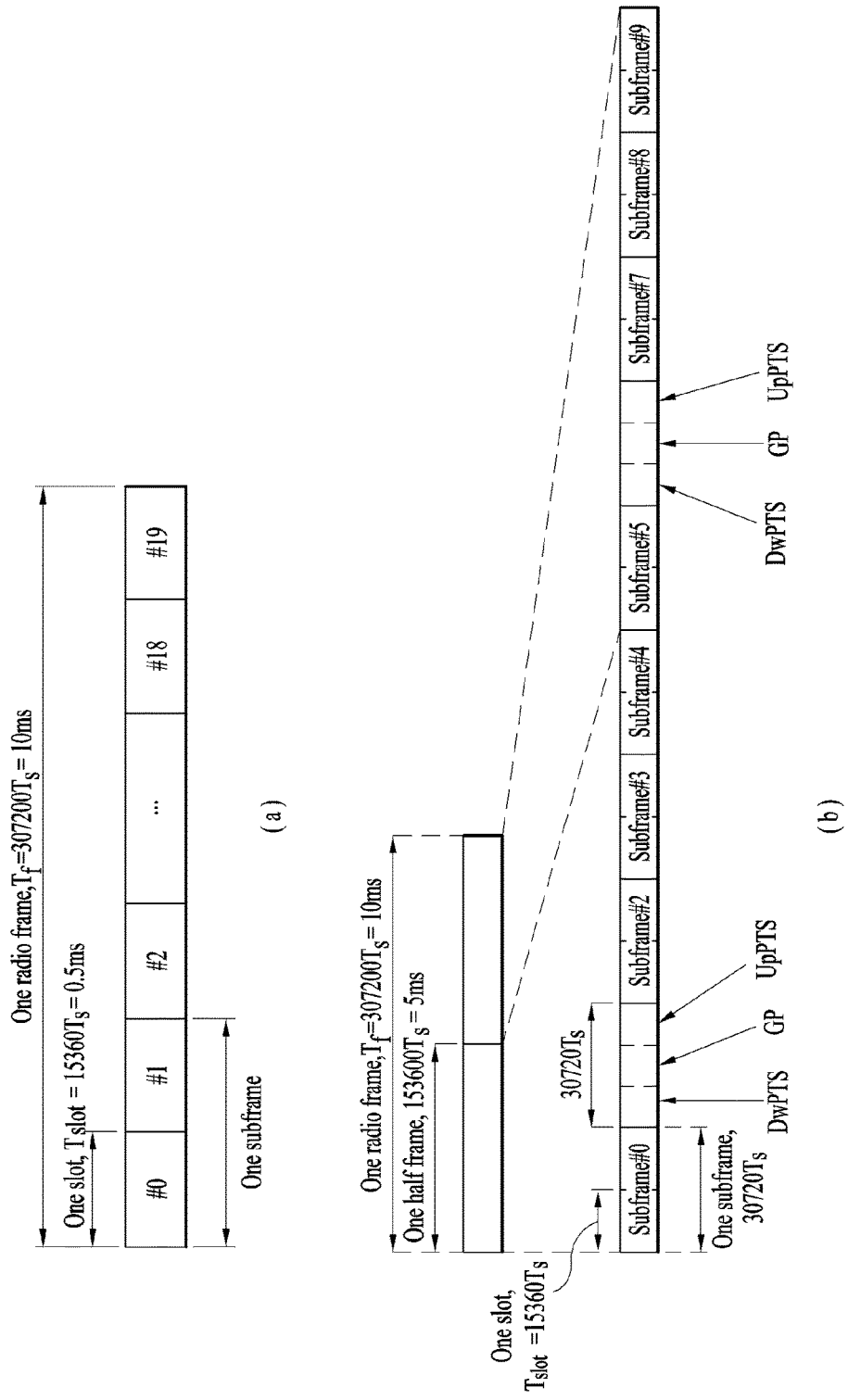
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($Tf=307200 \cdot Ts$) long, including equal-sized 20 slots indexed from 0 to 19. Each slot is 0.5 ms ($Tslot=15360 \cdot Ts$) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as $Ts=1/(15 \text{ kHz} \times 2048)=3.2552 \times 10-8$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($Tf=307200 \cdot Ts$) long, including two half-frames each having a length of 5 ms ($=153600 \cdot Ts$) long. Each half-frame includes five subframes each being 1 ms ($=30720 \cdot Ts$) long. An ith subframe includes 2ith and (2i+1)th slots each having a length of 0.5 ms ($Tslot=15360 \cdot Ts$). Ts is a sampling time given as $Ts=1/(15 \text{ kHz} \times 2048)=3.2552 \times 10-8$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an base station. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | (1 + X) · 2192 · $T_s$ | (1 + X) · 2560 · $T_s$ | 7680 · $T_s$ | (1 + X) · 2192 · $T_s$ | (1 + X) · 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | (2 + X) · 2192 · $T_s$ | (2 + X) · 2560 · $T_s$ |
| 5 | 6592 · $T_s$ | (2 + X) · 2192 · $T_s$ | (2 + X) · 2560 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |
| 10 | 13168 · $T_s$ | 13152 · $T_s$ | 12800 · $T_s$ | — | — | — |

Figure 3:
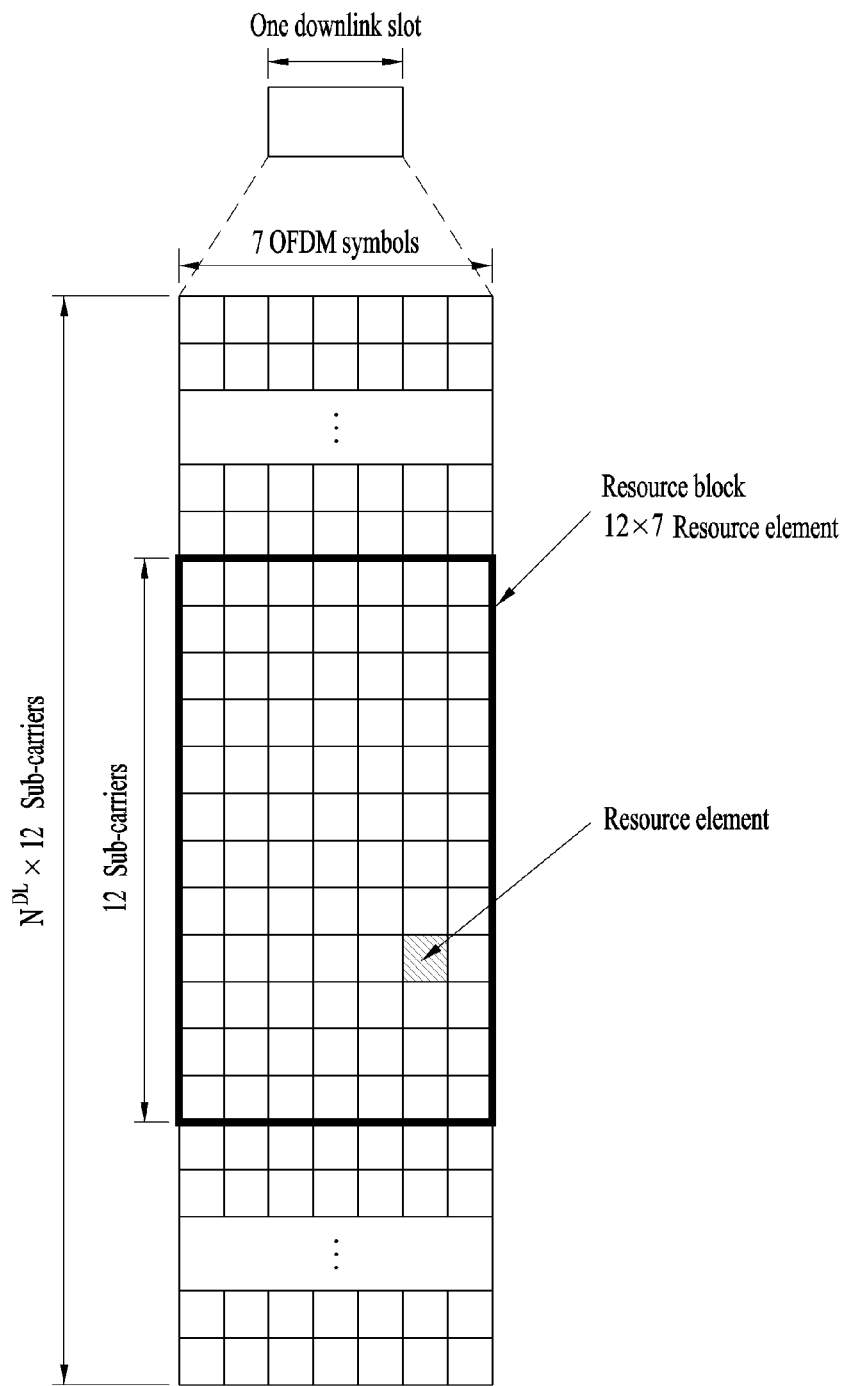
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
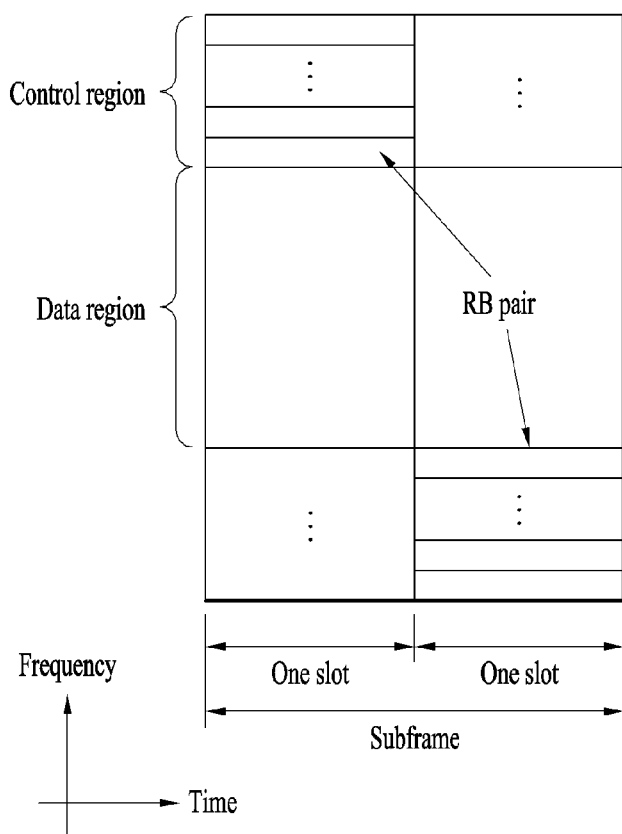
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
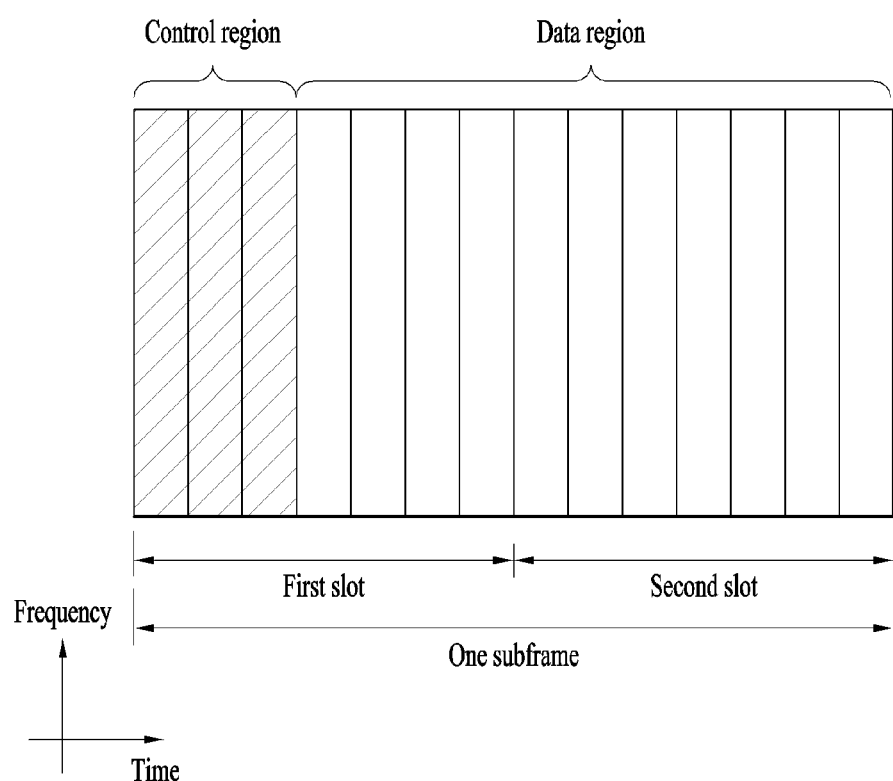
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure can be applied based on the above-described slot structure.

Figure 6:
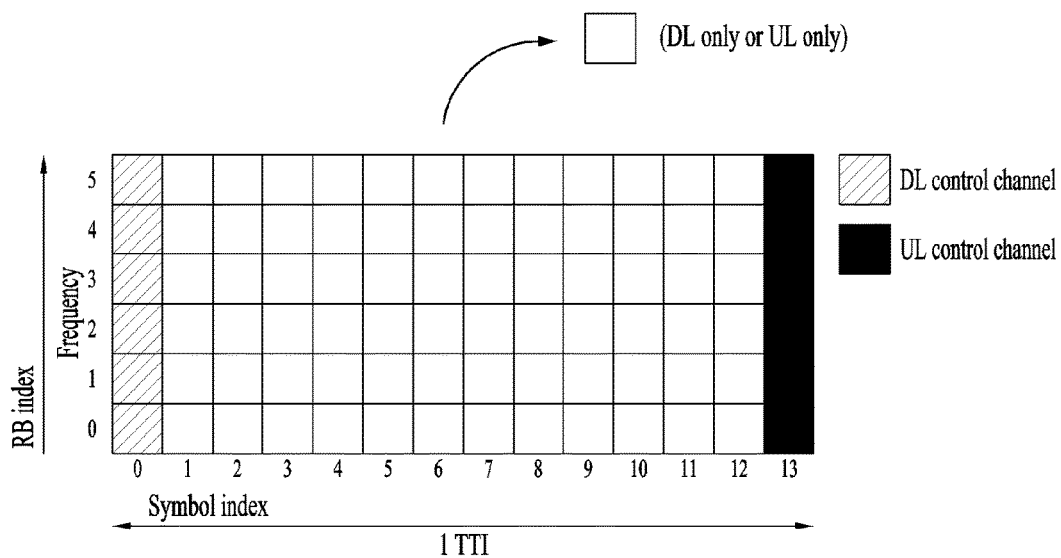
FIG. 6 is a diagram illustrating a self-contained subframe structure applicable to the present invention.

FIG. 6 is a diagram illustrating a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the base station and UE can sequentially perform DL transmission and UL transmission in one slot. That is, the base station and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the base station and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
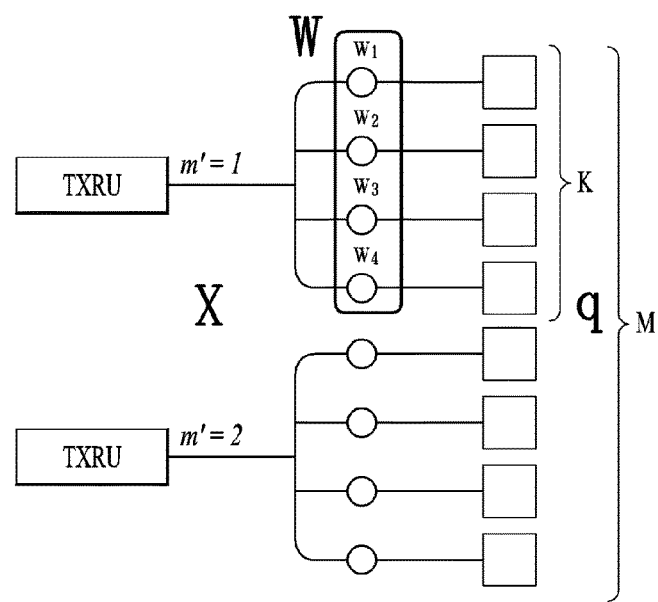
FIGS. 7 and 8 are diagrams illustrating representative connection methods for connecting TXRUs to antenna elements.
Figure 8:
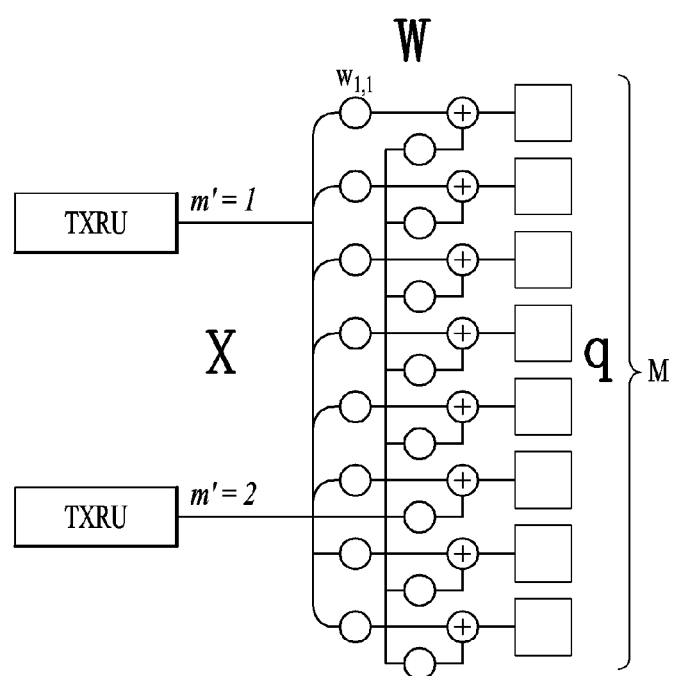

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to subarrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
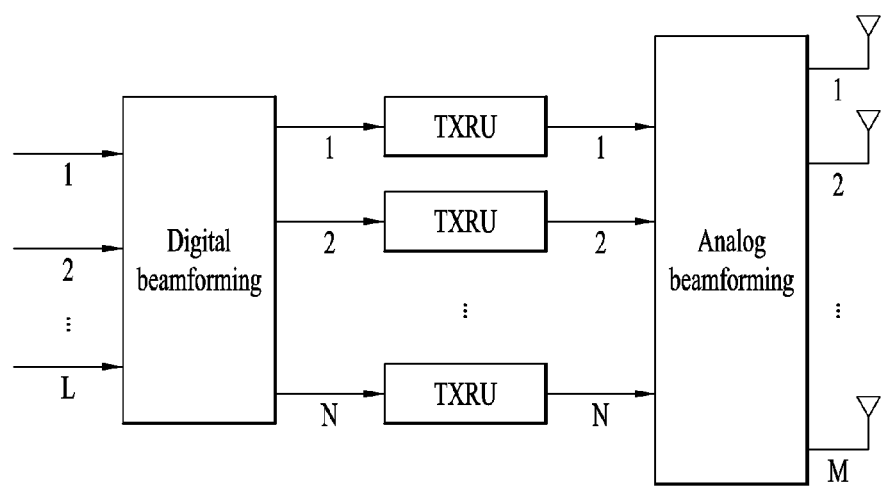
FIG. 9 is a schematic diagram illustrating a hybrid beamforming structure according to an embodiment of the present invention from the perspective of TXRUs and physical antennas.

FIG. 9 is a schematic diagram illustrating a hybrid beamforming structure according to an embodiment of the present invention from the perspective of TXRUs and physical antennas. In FIG. 9, it is assumed that the number of digital beams is L and the number of analog beams is N.

Additionally, a method for providing efficient beamforming to UEs located in a specific area by designing an base station capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the base station uses a plurality of analog beams as described above, each UE has a different analog beam suitable for signal reception. Thus, the beam sweeping operation where the base station applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 10:
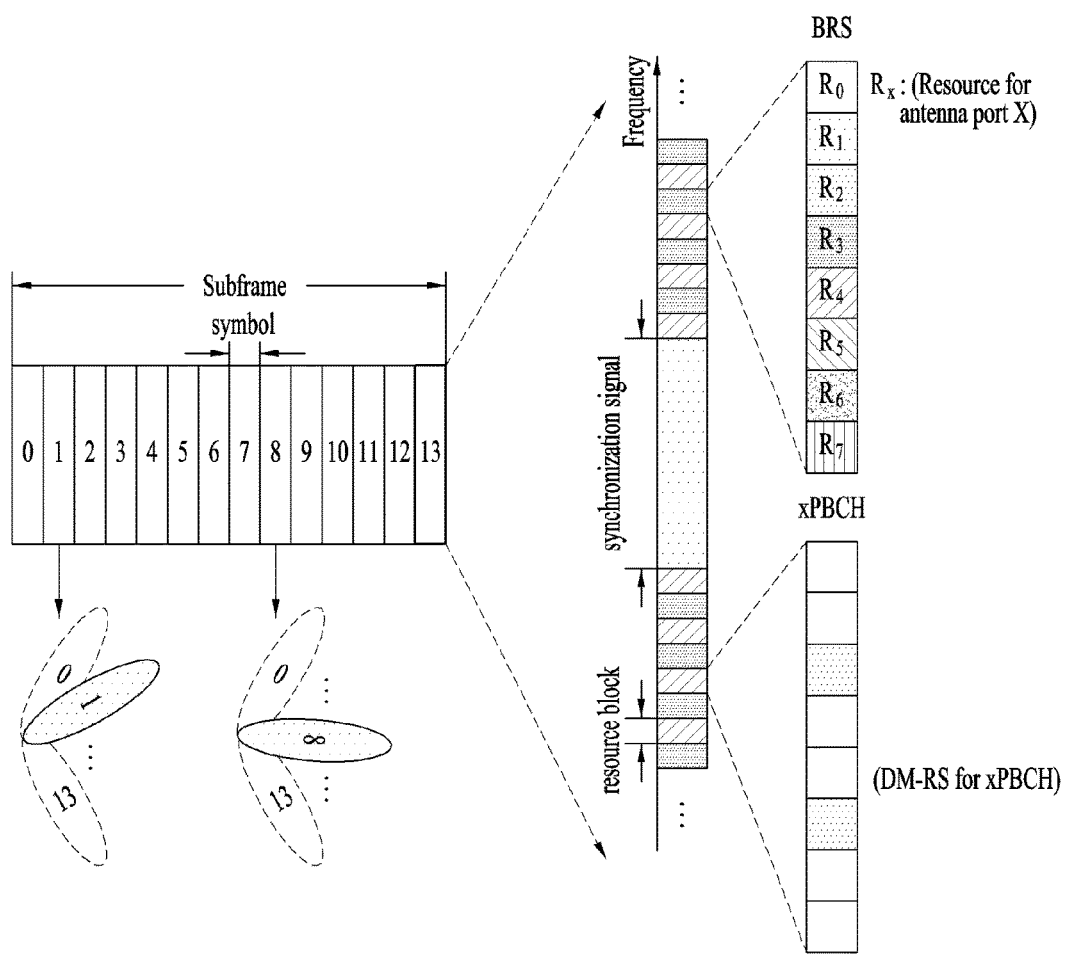
FIG. 10 is a diagram schematically illustrating the beam sweeping operation for synchronization signals and system information during a downlink (DL) transmission process according to an embodiment of the present invention.

FIG. 10 is a diagram schematically illustrating the beam sweeping operation for synchronization signals and system information during a downlink (DL) transmission process according to an embodiment of the present invention In FIG. 10, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

3. Proposed Embodiments

Now, a detailed description will be given of configurations proposed by the present invention on the basis of the above technical idea of the present invention.

Particularly, methods of transmitting, to an base station, a scheduling request (SR) by which a UE requests UL data scheduling will be described in greater detail.

In a wireless communication system, an base station (or network) controls UL data transmission of a UE as well as DL data transmission. For UL data transmission, the UE is allocated a physical uplink shared channel (PUSCH), which is a physical channel used to transmit UL data, by the base station (or network). Subsequently, the base station (or network) may schedule UL data transmission on the specific PUSCH for the UE by downlink control information (DCI) called a UL grant.

The base station (or network) may not have knowledge of the presence of absence of UL data (or UL traffic) to be transmitted by the UE. Therefore, there is a need for supporting a method of requesting UL data scheduling to an base station by a UE.

For the purpose, the UE may transmit a UL scheduling request (SR) message (referred to shortly as an SR) including UL data traffic and so on to the base station (or network). For example, the UE may transmit the SR on a PUCCH which is a physical channel used to carry uplink control information (UCI). The PUCCH with the SR may be transmitted in time and frequency resources configured by higher-layer signaling of the base station (or network).

Meanwhile, an NR system to which the present invention is applicable may be designed so as to support a plurality of logical networks in a single physical system, and services having various requirements (e.g., enhanced mobile broadband (eMBB)), massive machine type communication (mMTC), ultra reliable and low latency communication (URLLC), etc.).

For example, PUCCHs, which are physical channels for UCI transmission, may include a PUCCH which includes a relatively large number of OFDM symbols (e.g., 4 or more OFDM symbols), and thus supports wide UL coverage (hereinafter, referred to as a long PUCCH), and a PUCCH which includes a relatively small number of OFDM symbols (e.g., 1 or 2 symbols) and thus supports low-latency transmission (hereinafter, referred to as a short PUCCH).

One or more transmission structures are available for the short PUCCH. For example, when the amount of UCI to be transmitted on the short PUCCH is small (e.g., 1 or 2 bits), the base station may allocate a set of a plurality of sequences as a short PUCCH resource to the UE. The UE may then select a specific sequence corresponding to the UCI to be transmitted from among the sequences allocated as the short PUCCH resource, and transmit the selected sequence. The sequences may be designed to satisfy a low peak power-to-average power ratio (PAPR) property. For the convenience of description, the sequence-based short PUCCH structure will be referred to as a SEQ-PUCCH.

Meanwhile, if the amount of UCI to be transmitted on the short PUCCH is large (e.g., 3 or more bits), the base station may allocate the UE a short PUCCH resource including resource elements (REs) for UCI transmission and REs for reference signal (RS) transmission. The RS REs and the UCI REs may be distinguished from each other in each symbol by frequency division multiplexing (FDM). The UE may generate coded bits of the UCI, and then transmit modulated symbols of the coded bits in the UCI REs. For the convenience of description, the short PUCCH structure in which an RS and UCI are multiplexed in FDM (in each symbol) will be referred to as an FDM-PUCCH.

Now, a detailed description will be given of methods of transmitting an SR on the afore-described short PUCCH and long PUCCH by a UE. While operations of the present invention are described below as embodied as UE operations and base station operations in the NR system, the proposed methods of the present invention are applicable in the same manner to general wireless communication systems.

In the present invention, a demodulation reference signal (DM-RS) is an RS for data demodulation, a sounding reference signal (SRS) is an RS for UL channel measurement, an acknowledgement/negative acknowledgement (ACK/NACK) is ACK/NACK information about a data decoding result, and channel state information (CSI) is feedback information for a channel measurement result. Further, a cyclic shift (CS) resource for a specific sequence refers to a resource resulting from applying a cyclic time shift (a cyclic frequency shift) to the sequence on the time axis (on the frequency axis), and a root index refers to a seed value with which a sequence is generated.

Further, a physical resource block (PRB) may be a frequency-domain resource allocation unit in the present invention.

3.1 $1^{st}$ SR Transmission Method

The base station may configure (potential) time resources (or a slot set) for SR transmission for the UE in one of the following methods.

(1) Configured in a preset method
(2) Configured by a broadcast channel or system information
(3) Configured by (UE-specific) higher-layer signaling In response to the configuration, the UE may determine whether to actually transmit an SR in the (potential) time resources (or slot set) for SR transmission in one or more of the following methods.

1) SR transmission without any further check

The UE may perform this operation only for time resources (or a slot) configured in a preset method or by a broadcast channel or system information.

2) Only when SR transmission is allowed on a group-common PDCCH (GC-PDCCH) within time resources (or a slot), the SR is transmitted.

The UE may perform this operation only in time resources (or a slot) configured by (UE-specific) higher-layer signaling.

The GC-PDCCH refers to a physical transmission channel carrying DCI directed to a group of a plurality of UEs.

The foregoing resource allocations and their associated signal transmission methods may also be applied in the same manner to (periodic) SRS transmission.

More specifically, the NR system of the present invention may support slot-wise DL or UL data transmission defined on the time axis. To support flexible scheduling based on data traffic in the NR system, a method of minimizing use of a slot carrying DL data only (hereinafter, referred to as a fixed DL slot), or a slot carrying UL data only (hereinafter, referred to as a fixed UL slot) may be applied.

If (periodic) SR transmission is allowed only in fixed UL slots, time resources available for SR transmission of the UE become relatively small, and an SR transmission period is lengthened. This operation may not be preferable in terms of latency of the UE.

To avert the problem, aside from the fixed UL slot, a slot of which the usage may be switched flexibly to DL/UL data transmission (referred to as a flexible DL/UL slot) may be supported for SR transmission.

However, if the base station configures a set of slots potentially available for SR transmission for the UE, the UE may not be sure whether SR transmission is allowed in a flexible DL/UL slot other than a fixed UL slot (within the potential SR transmission slot set).

Then, the base station may indicate whether SR transmission is actually allowed in a specific slot of the potential SR transmission slot set to the UE by a GC-PDCCH. For example, the base station may indicate a specific slot structure in a potential SR transmission slot by the GC-PDCCH. In response to the indication, the UE may determine that SR transmission is possible in the slot, if the indicated slot structure includes a UL control transmission region (available for SR transmission).

Unless otherwise conflicting with each other, the 1$^{st}$ SR transmission method and other proposed methods of the present invention may be applied in combination.

3.2. 2$^{nd}$ SR Transmission Method

The base station may configure a set of M sequences as transmission resources for an SR having M states for the UE in one or more of the following methods.

(1) SEQ-PUCCH (with M sequences allocated thereto)
The sequences for the SEQ-PUCCH may be distinguished from each other by time resources/frequency resources/CS resources/root indexes.

(2) M SRS(s) are allocated.
The SRS(s) may be distinguished from each other by time resources/frequency resources/CS resources/root indexes.

Thus, the UE may select a sequence corresponding to a state that the UE is to request from among the M states of an SR, and transmit the SR by the selected sequence.

The M states may not include Negative SR (i.e., a state in which the UE does not request UL scheduling). In other words, the UE may indicate no request for UL scheduling by not transmitting an SR.

More specifically, the states of the SR may include a state in which the UE requests UL data scheduling (Positive SR), and a state in which the UE does not request UL data scheduling (Negative SR). Negative SR may be indicated by transmitting no UL signal at the UE. Thus, the SR may have one state, Positive SR from the perspective of information.

In the NR system according to an embodiment of the present invention, the UE may use an SEQ-PUCCH to which one sequence is allocated as a UL signal carrying Positive SR.

The feature may be generalized to say that the UE may use a SEQ-PUCCH to which M sequences are allocated to transmit an SR having M states in the NR system of the present invention.

Meanwhile, if the UE transmits the SR, the base station may need to perform UL channel measurement in order to schedule UL data for the UE. For example, in an approach to UL channel measurement, the base station may indicate transmission of an RS for UL channel measurement, SRS to the UE.

A 2-step operation of (separate) SR transmission and SRS transmission at the UE may not be preferable in terms of latency. In this context, the SR transmission and the SRS transmission of the UE may be combined into one process. That is, the UE may use an SRS resource to transmit a UL signal carrying an SR to the base station.

For example, if the SR has M states, the base station may allocate M SRS resources corresponding to the M states. To indicate a specific state of the SR to the base station, the UE may transmit SR information to the base station by transmitting an SRS resource corresponding to the specific state.

In the case where the UE uses SRS resources as SR transmission resources as described above, the UE may advantageously reduce latency by simultaneously transmitting an SR and an RS for UL channel estimation.

Herein, different amounts of (frequency-axis) resources in the SRS resources may be allocated to the SR states. For example, if each state of SR information indicates the size of UL traffic, more frequency-axis resources of the SRS resources may be configured for larger UL traffic.

Additionally, the UE according to the present invention may transmit an SR requesting UL scheduling (e.g., data-SR), and an SR requesting beam refinement (e.g., beam-SR). In this case, the data-SR and the beam-SR may be transmitted in SR transmission resources independently configured for the respective data-SR and beam-SR, or the result of jointly encoding the data-SR and the beam-SR may be transmitted in a single SR transmission resource.

For example, in the case where Positive SR and Negative SR are available for each of the data-SR and the beam-SR, the UE may transmit the joint coded result on an SEQ-PUCCH having 3 states (and 3 sequences corresponding to the 3 states), as illustrated in [Table 6] below. However, if both of the data-SR and the beam-SR are Negative SR, the UE may not transmit any signal.

TABLE 6

| Sequence Resource | Data-SR | Beam-SR |
|---|---|---|
| SEQ0 | Positive SR | Positive SR |
| SEQ1 | Positive SR | Negative SR |
| SEQ2 | Negative SR | Positive SR |

The above-described operation may also be applied to SRs for different services. For example, an SR for eMBB data (e.g., eMBB-SR) and an SR for URLLC data (e.g., URLLC-SR) may be transmitted in SR transmission resources independently configured for the respective eMBB-SR and URLLC-SR, or the result of jointly encoding the eMBB-SR and the URLLC-SR may be transmitted in a single SR transmission resource. In the case where Positive SR and Negative SR are available for each of the eMBB-SR and the URLLC-SR, the UE may transmit the joint coded result on an SEQ-PUCCH having 3 states (and 3 sequences corresponding to the 3 states), similarly to [Table 6]. Also in this case, if both of the eMBB-SR and the URLLC-SR are Negative SR, the UE may not transmit any signal.

Unless otherwise conflicting with each other, the 2nd SR transmission method and other proposed methods of the present invention may be applied in combination.

3.3. 3$^{rd}$ SR Transmission Method

If the UE is to transmit an SR additionally in a slot scheduled for PUCCH transmission of UCI (e.g., ACK/NACK and/or CSI), the UE may transmit the SR and/or the UCI as follows.

(1) If an SR transmission resource does not overlap with a UCI transmission resource on the time axis (e.g., if the SR and the UCI are multiplexed in time division multiplexing (TDM)), Option 1: The SR and the UCI are transmitted in their respective transmission resources (Method 1).

Option 2: The SR and UCI are transmitted in combination in the UCI transmission resource.

One thing to note herein is that the above operation may be applied when the SR transmission resource is adjacent to the UCI transmission resource on the time axis, and the transmission power difference between the two transmission resources is equal to or larger than a predetermined value. For example, when the SR transmission resource is a sequence, and the UCI transmission resource is an FDM-PUCCH transmitted in concatenation to the SR transmission resource on the time axis, the above operation may be applied.

(2) If the SR transmission resource overlaps with the UCI transmission resource on the time axis (e.g., if the SR and the UCI are multiplexed in frequency division multiplexing (FDM) or code division multiplexing (CDM)), Option 1: The SR and the UCI are transmitted in their respective transmission resources (Method 2).

However, if both of the SR transmission resource and the UCI transmission resource are sequence resources, different CSs/root indexes may be configured for the SR sequence and the UCI sequence. For example, the CSs/root indexes applied to the SR sequence and the UCI sequence may be configured to have a predetermined gap.

Option 2: The SR and the UCI are transmitted in combination in the UCI transmission resource.

However, the above operation may be applied when the UE exceeds (preset) maximum transmission power to transmit the SR and the UCI in their respective transmission resources.

Further, if the UCI transmission resource is a PUCCH resource with a DM-RS, SR information may be represented as a sequence multiplexed with the PUCCH DM-RS in CDM.

In the above configurations, the UCI transmission resource may be configured with a different PUCCH transmission structure depending on whether a corresponding slot is a (potential) SR transmission slot. For example, if the corresponding slot is a (potential) SR transmission slot, the UCI transmission resource may be configured as an FDM-PUCCH, whereas if the corresponding slot is not an SR transmission slot, the UCI transmission resource may be configured for an SEQ-PUCCH.

When an SRS and UCI are transmitted in the same slot, Method 1/2 may be applied (with an SR replaced with the SRS), or when an SR and an SRS are transmitted in the same slot, Method 1/2 may be applied (with UCI replaced with the SRS).

Figure 11:
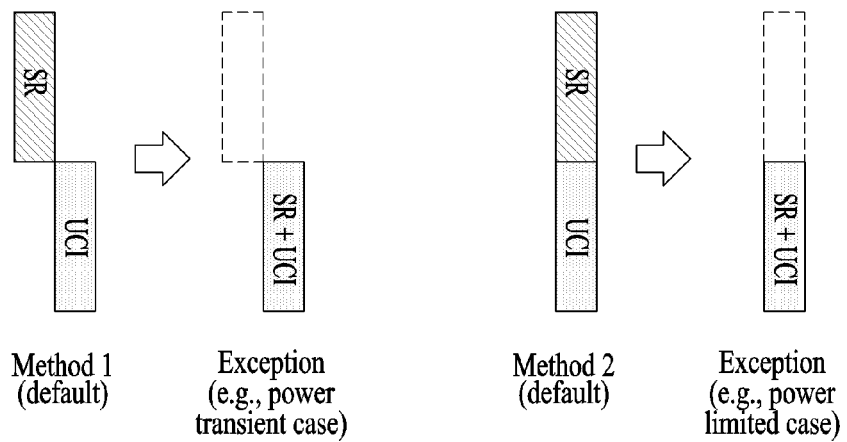
FIG. 11 is a schematic diagram illustrating a third scheduling request (SR) transmission method according to an example of the present invention.

FIG. 11 is a schematic diagram illustrating the 3rd SR transmission method according to an example of the present invention.

More specifically, when an SR and UCI (e.g., ACK/NACK or CSI) are transmitted in the same subframe in the legacy LTE system, the SR and the UCI are transmitted in combination in a single PUCCH resource.

However, in the NR system to which the present invention is applicable, an SR transmission resource and a UCI transmission resource may be transmitted in TDM within one slot. Thus, if the SR transmission resource does not overlap with the UCI transmission resource, the basic operation may be to transmit the SR and the UCI in their respective allocated transmission resources.

However, if the SR transmission resource and the UCI transmission resource are located in adjacent symbols without overlap, and have a larger transmission power difference, the UE may transmit the SR and the UCI in combination in a single transmission resource (e.g., a short PUCCH).

For example, it is assumed that the UE transmits the SR in the first one of two adjacent OFDM symbols on an SEQ-PUCCH (satisfying the low PAPR property), and the ACK/NACK on an FDM-PUCCH in the second symbol. Compared to the SEQ-PUCCH, the FDM-PUCCH has a high PAPR, and to avoid distortion caused by the non-linearity of a power amplifier (PA), back-off for transmission power may be applied to the FDM-PUCCH. Herein, there may be a transmission power difference between the SR transmission symbol and the ACK/NACK transmission symbol, and signal distortion may occur due to a power transient period during which transmission power is changed slowly, not rapidly.

As a solution to the problem, if the transmission power difference between the SR transmission resource and the UCI transmission resource which are adjacent to each other is equal to or larger than a predetermined value, the UE may transmit SR information in the UCI transmission resource (PUCCH). For example, the UE may transmit information obtained by combining the SR with the ACK/NACK on the FDM-PUCCH allocated for ACK/NACK transmission in the second symbol.

Even though the SR transmission resource overlaps with the UCI (e.g., ACK/NACK or CSI) on the time axis, unless the sum of transmission power allocated to each transmission resource exceeds the maximum transmission power of the UE (i.e., in a case other than a power limited case), the UE may transmit the SR and the UCI in their respective transmission resources.

If the SR transmission resource overlaps with the UCI (e.g., ACK/NACK or CSI) transmission resource on the time axis, and this case corresponds to the power limited case, the UE may transmit the SR and the UCI in combination in the UCI transmission resource. Herein, if the UCI transmission resource is in a PUCCH structure with a DM-RS, the SR information may be represented by a specific sequence which can be multiplexed with the DM-RS in CDM. In this case, the UE may transmit SR information having M states by selecting one of M sequences for which CDM with the PUCCH DM-RS is supported, and transmitting the selected sequence in the same time/frequency resource.

The afore-described 3rd SR transmission method may be extended to the generalization that the UE may divide UCI (e.g., SR, CSI, and ACK/NACK) into a plurality of subsets, and transmit the plurality of subsets on a plurality of PUCCHs in the same/different symbols (within the same slot).

Additionally, the UE may apply one of the following methods to the slot in which the SR and the UCI are scheduled simultaneously.

Method 1: A plurality of PUCCH resources (for UCI transmission) are configured (in correspondence with SR states), and the UCI is transmitted in a specific PUCCH resource according to an SR state.

Method 2: The SR and the UCI are transmitted in different PUCCH resources (distinguished from each other in TDM/FDM/CDM).

Method 3: The SR and the UCI are transmitted in combination in a single PUCCH resource (notably, the PUCCH format may be different from a PUCCH format for SR only or UCI only).

Further, in the case where the UCI transmission PUCCH resource is indicated by (an ACK/NACK resource indicator (ARI) in) DCI, if the PUCCH resource indicated by the (ARI in) DCI is in a different symbol from a PUCCH resource for SR transmission (referred to as SR PUCCH resource), the UE may perform Method 2, whereas if the symbols are identical, the UE may perform Method 1.

Unless otherwise conflicting with each other, the $3^{rd}$ SR transmission method and other proposed methods of the present invention may be applied in combination.

3.4. $4^{th}$ SR Transmission Method

If an SR and UCI are transmitted in one PUCCH resource, and the PUCCH resource includes a DM-RS, N PUCCH DM-RS candidates (or DM-RS resources) may be configured. The UE may represent SR information having (N−1) states or Negative SR by selecting one of the N RS candidates (or DM-RS resources) and transmitting the selected RS candidate (or DM-RS resource).

Negative SR refers to a state in which the UE does not request UL data scheduling.

Further, the plurality of DM-RS candidates (or DM-RS resources) may be distinguished from each other by CSs/orthogonal cover codes (OCCs).

More specifically, if the SR and the UCI are transmitted on a single FDM-PUCCH in which a DM-RS is designed to be a constant amplitude zero auto-correlation (CAZAC) sequence, the coded bits of the UCI may be transmitted in UCI REs of the FDM-PUCCH. The SR information having (N−1) states or Negative SR may be transmitted by selecting one of N CS resources (or OCC resources) supported by the PUCCH DM-RS.

In more general terms, if RS candidates are configured for the DM-RS within the FDM-PUCCH, the UE may represent SR information by selecting an RS from the RS candidates.

Unless otherwise conflicting, with each other, the $4^{th}$ SR transmission method and other proposed methods of the present invention may be applied in combination.

3.5. $5^{th}$ SR Transmission Method

When the UE transmits a plurality of PUCCHs with different transmission power contiguously on the time axis, the UE may transmit the plurality of PUCCHs in one of the following methods.

(1) The plurality of PUCCHs are transmitted at a (single) transmission power level.

The (single) transmission power level may be the transmission power level of a PUCCH having a high priority, or the maximum (or minimum) of the transmission power levels of the plurality of PUCCHs.

(2) The plurality of PUCCHs are transmitted at their respective power levels, with a different power transient period configured per PUCCH.

For lower-priority UCI or a smaller UCI payload size, a longer power transient period may be configured.

More specifically, when the UE transmits a plurality of PUCCHs at very different transmission power levels contiguously on the time axis (within the same slot), a power transient period may cause signal distortion. To mitigate the power transient period-caused signal distortion, the same transmission power may be applied to the plurality of PUCCHs transmitted contiguously on the time axis.

The transmission power applied equally to the plurality of PUCCHs may be a transmission power level allocated to a PUCCH having a highest priority for UCI among the plurality of PUCCHs or the maximum (or minimum) of the transmission power levels allocated to the plurality of PUCCHs. Or the UE may transmit the plurality of PUCCHs at their respective allocated transmission power levels, while a different power transient period caused by a transmission power difference is applied to each PUCCH. For example, a PUCCH having a lower priority for UCI may be configured to have a longer power transient period.

The $5^{th}$ SR transmission method may be applied to a case in which a long PUCCH and a short PUCCH are multiplexed in TDM (contiguously on the time domain) and a case in which long PUCCHs are multiplexed in TDM (contiguously on the time axis) as well as a case in which short PUCCHs are multiplexed in TDM (contiguously on the time axis). Additionally, in the case where short PUCCHs are multiplexed in TDM (contiguously on the time axis), if the transmission power difference between the two channels is equal to or greater than a predetermined value, the UE may drop a short PUCCH having the lower UCI priority between the two PUCCHs, or may combine UCI scheduled in the short PUCCHs and transmit the combined UCI on one of the two short PUCCHs (or on a third PUCCH). Particularly, in the case where a long PUCCH and a short PUCCH are multiplexed in TDM (contiguously on the time axis), the UE may match the transmission power level of the short PUCCH to be equal to that of the long PUCCH. Or if the short PUCCH has a higher priority in the above case, the UE may match the transmission power level of the long PUCCH to be equal to that of the short PUCCH.

The afore-described $5^{th}$ SR transmission method may be generalized to say that the UE performs one of the following operations in a situation in which a PUSCH and a PUCCH or PUCCHs are multiplexed in TDM (contiguously on the time axis).

1) Opt 1: The power of a lower-power channel is matched to that of a high-power channel.

2) Opt 2: The power of a short channel is matched to that of a long channel, or a power transient period is configured in the long channel (however, power may not be constant within a symbol on the channel configured with the power transient period, while power is maintained constant in a symbol on the channel with no power transient period).

3) Opt 3: The power of a low-priority channel is matched to that of a high-priority channel, or a power transient period is configured in the low-priority channel.

Additionally, when the UE transmits a 2-symbol PUCCH, frequency hopping may be applied between the two symbols or the power difference between the two symbols may be large. In this case, to avoid performance degradation caused by a power transient period, the UE may perform the following operation.

A time gap is configured between two 1-symbol PUCCHs included in the 2-symbol PUCCH.

The time gap may be configured in symbols. For example, the time gap may be set to 1 symbol.

Further, the operation of configuring a time gap may selectively be applied according to a frequency band carrying the 2-symbol PUCCH or a subcarrier spacing (SCS) applied to the 2-symbol PUCCH.

Additionally, when two 1-symbol PUCCHs (or SRSs) are transmitted in TDM, the UE may perform the following operation to avoid performance degradation caused by a power transient period resulting from turning on/off a 1-symbol PUCCH (or SRS).

A time gap is configured between the two 1-symbol PUCCHs (or SRSs).

The time gap may be configured in symbols. For example, the time gap may be set to 1 symbol.

Further, the operation of configuring a time gap may selectively be applied according to a frequency band carrying the 1-symbol PUCCHs or an SCS applied to the 1-symbol PUCCHs.

Additionally, with two (short) PUCCHs multiplexed in TDM (contiguously on the time axis), the UE may apply one of the following options.

If a coding rate is equal to or higher than a predetermined value after joint coding in Option 1, the UE may apply one of Option 2 to Option 4.

Option 2: Power transient periods are configured in both (short) PUCCHs.

Option 3: A power transient period is configured in a lower-priority (short) PUCCH.

Option 4: The same power is allocated the two (short) PUCCHs (with no configured power transient period).

Option 5: One or more of the two (short) PUCCHs are not transmitted (i.e., (short) PUCCH drop).

Unless otherwise conflicting, with each other, the 5$^{th}$ SR transmission method and other proposed methods of the present invention may be applied in combination.

3.6. 6$^{th}$ SR Transmission Method

M sequences included in any sequence set SB (having the same time and frequency resources) distinguished by CS resources within a sequence set SA allocated to an SEQ-PUCCH may correspond to M (contiguous) gray codes in ascending order (or descending order) of CS indexes.

The sequences of the sequence set for the SEQ-PUCCH may differ in one of time resource, frequency resource, length, CS resource, and root index.

More specifically, the SEQ-PUCCH may be allocated SEQ1, SEQ2 and SEQ3 which have a time resource T1 and a frequency resource F1 and are identified respectively by CS indexes 0, 3 and 6, and SEQ4 having time resource T2 and frequency resource F2 (distinguished from time resource T1 and frequency resource F1). The sequences distinguished from each other by CS resources in the same time and frequency resources may be configured such that the Hamming distance between UCI bits represented by each sequence is small. Gray codes in 2 bits are given as 00, 01, 11, and 10, and may correspond to the respective sequences of the SEQ-PUCCH, as illustrated in [Table 7] below.

TABLE 7

| Gray code | Mapping 1 | Mapping 2 | Mapping 3 | Mapping 4 |
|---|---|---|---|---|
| 00 | SEQ1 | SEQ4 | SEQ3 | SEQ4 |
| 01 | SEQ2 | SEQ1 | SEQ2 | SEQ3 |
| 11 | SEQ3 | SEQ2 | SEQ1 | SEQ2 |
| 10 | SEQ4 | SEQ3 | SEQ4 | SEQ1 |

More specifically, when a plurality of sequences are allocated to a SEQ-PUCCH, the sequences may be indexed as far as successive indexes are assigned to sequences (with different CS resources) in the same time and frequency resources among the plurality of sequences, in ascending order (or descending order) of CS indexes. Subsequently, a k$^{th}$ Gray code for N-bit UCI may be transmitted in a sequence having a k$^{th}$ index in the SEQ-PUCCH.

Particularly, when the SEQ-PUCCH is transmitted in a plurality of time resources, if a sequence set per time resource has a different CS resource (e.g., CS hopping), a different Gray code-sequence mapping may be configured for each time resource so that adjacent sequences in the CS resources correspond to (contiguous) Gray codes.

For the principle of mapping between Gray codes and sequences in each time resource, the above-described 6$^{th}$ SR transmission method may be applied.

Unless otherwise conflicting, with each other, the 6$^{th}$ SR transmission method and other proposed methods of the present invention may be applied in combination.

3.7. 7$^{th}$ SR Transmission Method

The UE may transmit information with an SR and an ACK/NACK combined on a (single) SEQ-PUCCH in one of the following methods.

After ACKs/NACKs are bundled, the SR and the bundled ACK/NACK are transmitted on the (single) SEQ-PUCCH.

Sequences are allocated such that the distance between the sequence resources of Negative SR and Positive SR is largest (e.g., sequences in different symbols are allocated to Negative SR and Positive SR), and an ACK/NACK is transmitted by allocating resources to the ACK/NACK in consideration of Gray coding (e.g., a CS spacing).

More specifically, when the SR is divided into Positive SR (a state of requesting UL scheduling) and Negative SR (a state of requesting no UL scheduling), and the payload size of the ACK/NACK is 2 bits, the information with the SR and the ACK/NACK combined may be represented as a total of 8 states: {Positive SR, 00}, {Positive SR, 01}, {Positive SR, 10}, {Positive SR, 11}, {Negative SR, 00}, {Negative SR, 01}, {Negative SR, 10}, and {Negative SR, 11}.

However, the SEQ-PUCCH deals mainly with 1 or 2 bits. To allocate resources so that 8 sequences are available to the information, it may be difficult to maintain the structure of the information in line with the SEQ-PUCCH structure dealing with 1 or 2 bits (e.g., a frequency resource length may vary). In the above case, the number of the total states transmitted by the SEQ-PUCCH may be reduced through ACK/NACK bundling.

For example, the above 8 states may be decreased to 6 states, {Positive SR, 0 (bundled ACK/NACK of 00 or 01 or 10)}, {Positive SR, 1 (bundled ACK/NACK of 11)}, {Negative SR, 00}, {Negative SR, 01}, {Negative SR, 10}, and {Negative SR, 11}, or 4 states, {Positive SR, 0 (bundled ACK/NACK of 00 or 01 or 10)}, {Positive SR, 1 (bundled ACK/NACK of 11)}, {Negative SR, 0 (bundled ACK/NACK of 00 or 01 or 10)}, and {Negative SR, 1 (bundled ACK/NACK of 11)}.

Or, when 8 sequences are used, sequences resources may be allocated in a manner that guarantees orthogonality between sequence resources representing Positive SR and sequence resources representing Negative SR. For example, it is assumed that there are 8 sequences in total in the SEQ-PUCCH, and the 8 sequences include 4 sequences distinguished by CS resources in each of two symbols. The sequences may be allocated such that only Positive SR+ACK/NACK is represented in the first of the two symbols, and only Negative SR+ACK/NACK information is represented in the second symbol.

Additionally, the UE may transmit a specific single combination from among (all or some of) combinations (e.g., $N_1*N_2$ combinations) of (e.g., $N_1$) SR states and (e.g., $N_2$) HARQ-ACK states by M sequence resources (distinguished in the frequency domain and code domain) in one of the following methods.

(1) Method #1: A specific single sequence is transmitted.
It is possible to represent up to $_MC_1$ combinations of SR states and HARQ-ACK states.

(2) Method #2: Specific L sequences (among the M sequences) are transmitted.
For a given L value, it is possible to represent up to $_MC_L$ combinations of SR states and HARQ-ACK states.

When it is said that sequences are distinguished in the frequency domain and the code domain, this implies that frequency resources and/or CSs or OCCs allocated to the sequences are distinguished from each other.

Further, for a specific SR and HARQ-ACK combination, the UE may not transmit any sequence (i.e., represented as discontinuous transmission (DTX)).

Further, the UE may represent a specific one of 8 combinations of SR states (e.g., Positive SR or Negative SR) and 2-bit HARQ-ACK states (e.g., {ACK, ACK}, {ACK, NACK}, {NACK, ACK}, {NACK, NACK}) by transmitting one or more of four sequences (e.g., Seq. 1, Seq. 2, Seq. 3, and Seq. 4) (i.e., M=4)

1) Positive SR+{ACK, ACK}
Transmit Seq. 1
2) Positive SR+{NACK, NACK} (or Positive SR only)
Transmit Seq. 2
3) Negative SR+{ACK, ACK}
Transmit Seq. 3
4) Negative SR+{NACK, NACK}
Transmit Seq. 4 (however, for Negative SR only, no signal is transmitted)
5) Positive SR+{ACK, NACK} or Positive SR+{NACK, ACK} or Negative SR+{ACK, NACK} or Negative SR+{NACK, ACK}
5-1) In the case where a plurality of sequences can be transmitted simultaneously,
For each (SR and HARQ-ACK) combination, a specific (single) sequence pair is allocated and transmitted from among cases of selecting a sequence pair (i.e., two sequences) (e.g., Seq. 1+Seq. 2 or Seq. 1+Seq. 3 or Seq. 1+Seq. 4 or Seq. 2+Seq. 3 or Seq. 2+Seq. 4 or Seq. 3+Seq. 4) from 4 sequences.
The UE allocates and transmits different sequence pairs for different SR and HARQ-ACK combinations.
5-2) In the case where only a single sequence can be transmitted (e.g., the power limited case)
For Positive SR and {ACK, NACK} (or {NACK, ACK}), Seq. 2 is transmitted.
For Negative SR and {ACK, NACK} (or {NACK, ACK}), Seq. 4 is transmitted.
In the case where only 4 sequences (M=4), Seq. 1, Seq. 2, Seq. 3, and Seq. 4 are used to represent Positive or Negative SR+2-bit HARQ-ACK, the UE may transmit a sequence as follows. In the following table, '0' means transmission of a corresponding sequence.
[1] Case 1: A plurality of sequences can be transmitted simultaneously.

TABLE 8

| SR | HARQ-ACK (2 bits) | | Seq. 1 | Seq. 2 | Seq. 3 | Seq. 4 |
|---|---|---|---|---|---|---|
| Positive | ACK | ACK | O | — | — | — |
| Positive | ACK | NACK | O | O | — | — |
| Positive | NACK | ACK | — | O | O | — |
| Positive | NACK | NACK | — | O | — | — |
| Negative | ACK | ACK | — | — | O | — |
| Negative | ACK | NACK | O | — | — | O |
| Negative | NACK | ACK | — | — | O | O |
| Negative | NACK | NACK | — | — | — | O |

[2] Case 2: Only a single sequence can be transmitted (e.g., the power limited case)

TABLE 9

| SR | HARQ-ACK (2 bits) | | Seq. 1 | Seq. 2 | Seq. 3 | Seq. 4 |
|---|---|---|---|---|---|---|
| Positive | ACK | ACK | O | — | — | — |
| Positive | ACK | NACK | — | O | — | — |
| Positive | NACK | ACK | — | O | — | — |
| Positive | NACK | NACK | — | O | — | — |
| Negative | ACK | ACK | — | — | O | — |
| Negative | ACK | NACK | — | — | — | O |
| Negative | NACK | ACK | — | — | — | O |
| Negative | NACK | NACK | — | — | — | O |

Or, the base station may be configured to transmit a sequence(s) according to Case 1 or Case 2.
For Negative SR and DTX in the above example, the UE may not transmit any signal.

However, in the case of Positive SR (only) in the above example, the UE may transmit the same sequence (e.g., Seq. 2) as that for Positive SR+{NACK, NACK} to represent Positive SR (only).
Further, in the above example, the base station may identify an SR and HARQ-ACK combination on the basis of a detected sequence(s).
1] If only Seq. 1 is detected: the SR and HARQ-ACK combination is identified as Positive SR+{ACK, ACK}.
2] If only Seq. 2 is detected: the SR and HARQ-ACK combination is identified as Positive SR+{NACK, NACK}.
3] If only Seq. 3 is detected: the SR and HARQ-ACK combination is identified as Negative SR+{ACK, ACK}.
4] If only Seq. 4 is detected: the SR and HARQ-ACK combination is identified as Negative SR+{NACK, NACK}.
5] If Seq. 1+Seq. 2 are detected: the SR and HARQ-ACK combination is identified as Positive SR+{ACK, NACK}.
6] If Seq. 2+Seq. 3 are detected: the SR and HARQ-ACK combination is identified as Positive SR+{NACK, ACK}.
7] If Seq. 1+Seq. 4 are detected: the SR and HARQ-ACK combination is identified as Negative SR+{ACK, NACK}.
8] If Seq. 3+Seq. 4 are detected: the SR and HARQ-ACK combination is identified as Negative SR+{NACK, ACK}.
If Seq. 1 and Seq. 3 are transmitted in symbol A, and Seq. 2 and Seq. 4 are transmitted in TDM in symbol B (≠symbol A) in the foregoing example, the UE may always operate according to Case 1. That is, when sequences to be simultaneously transmitted are multiplexed in TDM, the power limited case does not occur, and thus the UE may always performing a simultaneous transmission operation.
The above configuration may be generalized to say that if Seq. 1 and Seq. 3 are transmitted in symbol A, and Seq. 2 and Seq. 4 are transmitted in TDM in symbol B (≠symbol A), the UE may represent a specific SR and HARQ-ACK combination by one of the following 8 sequence transmission cases.
<1> Seq. 1
<2> Seq. 2
<3> Seq. 3
<4> Seq. 4
<5> Seq. 1+Seq. 2
<6> Seq. 1+Seq. 4
<7> Seq. 3+Seq. 2
<8> Seq. 3+Seq. 4
The 8 sequence transmission combinations may be mapped one-to-one to a total of 8 SR and 2-bit HARQ-ACK combinations, that is, Negative SR+{ACK, ACK}, Negative SR+{ACK, NACK}, Negative SR+{NACK, ACK}, Negative SR+{NACK, NACK}, Positive SR+{ACK, ACK}, Positive SR+{ACK, NACK}, Positive SR+{NACK, ACK}, and Positive SR+{NACK, NACK}.
In a specific example, the 8 sequence transmission combinations may be mapped one-to-one to the SR and 2-bit HARQ-ACK combinations as illustrated in the table corresponding to Case 1.
Or, if Seq. 1 is transmitted in symbol A, and Seq. 2 Seq. 3 and Seq. 4 are transmitted in TDM in symbol B (≠symbol A), the UE may represent a specific SR and HARQ-ACK combination by one of the following 7 sequence transmission cases.
1> Seq. 1
2> Seq. 2
3> Seq. 3
4> Seq. 4
5> Seq. 1+Seq. 2
6> Seq. 1+Seq. 3
7> Seq. 1+Seq. 4

The 7 sequence transmission combinations may be mapped one-to-one to 7 SR and 2-bit HARQ-ACK combinations except for Negative SR+{NACK, NACK}, that is, Negative SR+{ACK, ACK}, Negative SR+{ACK, NACK}, Negative SR+{NACK, ACK}, Positive SR+{ACK, ACK}, Positive SR+{ACK, NACK}, Positive SR+{NACK, ACK}, and Positive SR+{NACK, NACK}.

Or, six ones out of the 7 sequence transmission combinations may be mapped one-to-one to the following 6 SR and 2-bit HARQ-ACK combinations, that is, Negative SR+{ACK, ACK}, Negative SR+{ACK, NACK}, Negative SR+{NACK, ACK}, Negative SR+{NACK, NACK}, Positive SR+All ACK (i.e., {ACK, ACK})}, Positive SR+Bundled NACK (i.e., {NACK, ACK}, {ACK, NACK}). The remaining one of the 7 sequence transmission combinations may correspond to one of combinations of a plurality of sequences for transmission (e.g., Seq. 1+Seq. 2, Seq. 1+Seq. 3, and Seq. 1+Seq. 4).

For example, the UE may transmit a sequence per SR and 2-bit HARQ-ACK combination, as follows.

TABLE 10

| SR | HARQ-ACK (2 bits) | | Seq. 1 | Seq. 2 | Seq. 3 | Seq. 4 |
|---|---|---|---|---|---|---|
| Positive | ACK | ACK | O | | | |
| Positive | ACK | NACK | O | O | | |
| Positive | NACK | ACK | O | | | O |
| Positive | NACK | NACK | | | O | |
| Negative | ACK | ACK | O | | O | |
| Negative | ACK | NACK | | | O | |
| Negative | NACK | ACK | | | | O |
| Negative | NACK | NACK | | | | |

In another example, the UE may represent a specific one of 8 combinations of SR states (e.g., Positive SR or Negative SR) and 2-bit HARQ-ACK states (e.g., {ACK, ACK}, {ACK, NACK}, {NACK, ACK}, {NACK, NACK}) by transmitting one or more of 6 sequences (e.g., Seq. 1, Seq. 2, Seq. 3, Seq. 4, Seq. 5, and Seq. 6) (i.e., M=6).

(A) Negative SR+{ACK, ACK}
Seq. 1 is transmitted.
(B) Negative SR+{ACK, NACK}
Seq. 2 is transmitted.
(C) Negative SR+{NACK, ACK}
Seq. 3 is transmitted.
(D) Negative SR+{NACK, NACK}
Seq. 4 is transmitted (for Negative SR only, no signal is transmitted).
(E) Positive SR only
Seq. 5 is transmitted.
(F) Positive SR+{ACK, ACK}
Seq. 6 is transmitted.
(G) Positive SR+{ACK, NACK} or Positive SR+{NACK, ACK} or Positive SR+{NACK, NACK}
(G-1) In the case where a plurality of sequences can be transmitted simultaneously,
For each (SR and HARQ-ACK) combination, a specific (single) sequence pair is allocated and transmitted from among cases of selecting a sequence pair (i.e., two sequences) (e.g., Seq. 1+Seq. 2 or Seq. 1+Seq. 3 or Seq. 1+Seq. 4 or Seq. 1+Seq. 5 or Seq. 1+Seq. 6 or Seq. 2+Seq. 3 or Seq. 2+Seq. 4 or Seq. 2+Seq. 5 or Seq. 2+Seq. 6 or Seq. 3+Seq. 4 or Seq. 3+Seq. 5 or Seq. 3+Seq. 6) from 6 sequences.
The UE allocates and transmits different sequence pairs for different SR and HARQ-ACK combinations.

G-2) In the case where only a single sequence can be transmitted (e.g., the power limited case),
For Positive SR and {ACK, NACK} (or {NACK, ACK} or {NACK, NACK}), Seq. 5 is transmitted.
In the case where only 6 sequences (M=6), Seq. 1, Seq. 2, Seq. 3, Seq. 4, Seq. 5, and Seq. 6 are used to represent Positive or Negative SR+2-bit HARQ-ACK, the UE may transmit a sequence as follows. In the following table, 'O' means transmission of a corresponding sequence.

A) Case 3: A plurality of sequences can be transmitted simultaneously.

TABLE 11

| SR | HARQ-ACK (2 bits) | | Seq. 1 | Seq. 2 | Seq. 3 | Seq. 4 | Seq. 5 | Seq. 6 |
|---|---|---|---|---|---|---|---|---|
| Positive | ACK | ACK | | | | | | O |
| Positive | ACK | NACK | | O | | | O | |
| Positive | NACK | ACK | | | O | | O | |
| Positive | NACK | NACK | | | | O | O | |
| Positive | DTX | | | | | | O | |
| Negative | ACK | ACK | O | | | | | |
| Negative | ACK | NACK | | O | | | | |
| Negative | NACK | ACK | | | O | | | |
| Negative | NACK | NACK | | | | O | | |

B) Case 4: Only a single sequence can be transmitted (e.g., the power limited case).

TABLE 12

| SR | HARQ-ACK (2 bits) | | Seq. 1 | Seq. 2 | Seq. 3 | Seq. 4 | Seq. 5 | Seq. 6 |
|---|---|---|---|---|---|---|---|---|
| Positive | ACK | ACK | | | | | | O |
| Positive | ACK | NACK | | | | | O | |
| Positive | NACK | ACK | | | | | O | |
| Positive | NACK | NACK | | | | | O | |
| Positive | DTX | | | | | | O | |
| Negative | ACK | ACK | O | | | | | |
| Negative | ACK | NACK | | O | | | | |
| Negative | NACK | ACK | | | O | | | |
| Negative | NACK | NACK | | | | O | | |

Or the base station may be configured to transmit a sequence(s) to the UE according to Case 3 or Case 4.

For Negative SR and DTX in the above example, the UE may not transmit any signal.

Further, in the above example, the base station may identify an SR and HARQ-ACK combination on the basis of a detected sequence(s) as follows.

[A] If only Seq. 1 is detected, the SR and HARQ-ACK combination is identified as Negative SR+{ACK, ACK}.

[B] If only Seq. 2 is detected, the SR and HARQ-ACK combination is identified as Negative SR+{ACK, NACK}.

[C] If only Seq. 3 is detected, the SR and HARQ-ACK combination is identified as Negative SR+{NACK, ACK}.

[D] If only Seq. 4 is detected, the SR and HARQ-ACK combination is identified as Negative SR+{NACK, NACK}.

[E] If only Seq. 5 is detected, the SR and HARQ-ACK combination is identified as Positive SR+bundled NACK (or DTX).

[F] If only Seq. 6 is detected, the SR and HARQ-ACK combination is identified as Positive SR+{ACK, ACK}.

[G] If Seq. 5+Seq. 2 are detected, the SR and HARQ-ACK combination is identified as Positive SR+{ACK, NACK}.

[H] If Seq. 5+Seq. 3 are detected, the SR and HARQ-ACK combination is identified as Positive SR+{NACK, ACK}.

[I] If Seq. 5+Seq. 4 are detected, the SR and HARQ-ACK combination is identified as Positive SR+{NACK, NACK}.

Additionally, the UE may modify sequence transmissions for Positive SR+{NACK, NACK} and Positive SR+DTX (i.e., Positive SR only) to sequence transmissions illustrated in [Table 13] or [Table 14] below.

TABLE 13

| SR | HARQ-ACK (2 bits) | Seq. 1 | Seq. 2 | Seq. 3 | Seq. 4 | Seq. 5 | Seq. 6 |
|---|---|---|---|---|---|---|---|
| Positive | NACK NACK | | | | | O | |
| Positive | DTX | | | | | O | |

TABLE 14

| SR | HARQ-ACK (2 bits) | Seq. 1 | Seq. 2 | Seq. 3 | Seq. 4 | Seq. 5 | Seq. 6 |
|---|---|---|---|---|---|---|---|
| Positive | NACK NACK | | | | O | O | |
| Positive | DTX | | | | O | O | |

According to [Table 13], the base station may identify an SR and HARQ-ACK combination on the basis of a detected sequence(s), as follows.

A] If only Seq. 1 is detected, the SR and HARQ-ACK combination is identified as Negative SR+{ACK, ACK}.

B] If only Seq. 2 is detected, the SR and HARQ-ACK combination is identified as Negative SR+{ACK, NACK}.

C] If only Seq. 3 is detected, the SR and HARQ-ACK combination is identified as Negative SR+{NACK, ACK}.

D] If only Seq. 4 is detected, the SR and HARQ-ACK combination is identified as Negative SR+{NACK, NACK}.

E] If only Seq. 5 is detected, the SR and HARQ-ACK combination is identified as Positive SR+{NACK, NACK} (or DTX).

F] If only Seq. 6 is detected, the SR and HARQ-ACK combination is identified as Positive SR+{ACK, ACK}.

G] If Seq. 5+Seq. 2 are detected, the SR and HARQ-ACK combination is identified as Positive SR+{ACK, NACK}.

H] If Seq. 5+Seq. 3 are detected, the SR and HARQ-ACK combination is identified as Positive SR+{NACK, ACK}.

Or according to [Table 14], the base station may identify an SR and HARQ-ACK combination on the basis of a detected sequence(s) as follows.

<A> If only Seq. 1 is detected, the SR and HARQ-ACK combination is identified as Negative SR+{ACK, ACK}.

<B> If only Seq. 2 is detected, the SR and HARQ-ACK combination is identified as Negative SR+{ACK, NACK}.

<C> If only Seq. 3 is detected, the SR and HARQ-ACK combination is identified as Negative SR+{NACK, ACK}.

<D> If only Seq. 4 is detected, the SR and HARQ-ACK combination is identified as Negative SR+{NACK, NACK}.

<E> If only Seq. 5 is detected, the SR and HARQ-ACK combination is identified as Positive SR+bundled NACK (or DTX).

<F> If only Seq. 6 is detected, the SR and HARQ-ACK combination is identified as Positive SR+{ACK, ACK}.

<G> If Seq. 5+Seq. 2 are detected, the SR and HARQ-ACK combination is identified as Positive SR+{ACK, NACK}.

<H> If Seq. 5+Seq. 3 are detected, the SR and HARQ-ACK combination is identified as Positive SR+{NACK, ACK}.

<I> If Seq. 5+Seq. 4 are detected, the SR and HARQ-ACK combination is identified as Positive SR+{NACK, NACK} (or DTX).

Further, when the UE transmits a 1-bit HARQ-ACK and an SR, the following sequence allocation may be considered.

Specifically, when the UE uses only 2 sequences (M=2) (e.g., Seq. 1 and Seq. 2) for (Positive or Negative) SR+2-bit HARQ-ACK, the UE may operate as follows A> Case 1: In the case where a plurality of sequences can be transmitted simultaneously, The UE may operate according to one of the following tables.

TABLE 15

| SR | HARQ-ACK (1 bits) | Seq. 1 | Seq. 2 |
|---|---|---|---|
| Positive | ACK | O | |
| Positive | NACK | O | O |
| Negative | ACK | | O |
| Negative | NACK | | |

TABLE 16

| SR | HARQ-ACK (1 bits) | Seq. 1 | Seq. 2 |
|---|---|---|---|
| Positive | ACK | O | O |
| Positive | NACK | O | |
| Negative | ACK | | O |
| Negative | NACK | | |

TABLE 17

| SR | HARQ-ACK (1 bits) | Seq. 1 | Seq. 2 |
|---|---|---|---|
| Positive | ACK | O | |
| Positive | NACK | | O |
| Negative | ACK | O | O |
| Negative | NACK | | |

In the above example, it is assumed that the UE is always capable of transmitting a plurality of sequences. For Positive SR (only), the UE may transmit the same sequence as for Positive SR+NACK (i.e., Seq. 2), whereas for Negative SR+NACK, the UE may not transmit any signal.

Further, if the UE transmits an SR (e.g., Positive SR or Negative SR) and a 2-bit HARQ-ACK in a (2-symbol) SEQ-PUCCH transmission structure in which the UE selects and transmits one of N sequences in each of two symbols, the UE may represent 8 SR and 2-bit HARQ-ACK combinations by using 8 of a total of N*N sequence pairs transmitted in two symbols.

Additionally, the UE may use a PUCCH structure (hereinafter, referred to as a SEQ-PUCCH structure) that represents a specific state of M-bit UCI by selecting and transmitting one of $2^M$ sequences for the M-bit UCI (e.g., HARQ-ACK). If the $2^M$ sequences available for the M-bit UCI transmission have the same frequency resources (e.g., PRBs) and are distinguished from each other by $2^M$ equidistant CSs (in the CS domain), a PUCCH resource may be represented by a frequency resource index (e.g., PRB index) and a starting CS value in a corresponding frequency resource. The UE may derive the starting CS value and the spacing between CSs on the basis of the remaining $2^M-1$ CS values. The spacing between CSs may be determined according to a UCI payload size, or on the basis of a value configured by higher-layer signaling of the base station.

Further, the base station may configure a plurality of PUCCH resources for the UE, and then select and indicate a specific PUCCH resource to be used for UCI transmission from among the plurality of PUCCH resources by DCI.

Additionally, for SR only transmission, the UE may operate as follows depending on Positive SR or Negative SR. Specifically, for Positive SR only, the UE may transmit a specific single sequence, while for Negative SR only, the UE may not transmit the sequence (i.e., specific sequence-based on/off keying). Further, for N-bit HARQ-ACK only transmission, the UE may select a specific single sequence (corresponding to an HARQ-ACK state) from among $2^N$ sequences, and transmit the selected sequence (i.e., sequence selection-based PUCCH). When an SR transmission and an HARQ-ACK transmission take place in the same time resource, the UE may operate in the following manner.

A. For Positive SR, an operation corresponding to SR only transmission is performed.
  That is, only a specific single sequence allocated for SR transmission is transmitted.
  Notably, the base station may regard the HARQ-ACK as DTX or ALL NACK in the above case.

B. For Negative SR, an operation corresponding to HARQ-ACK only transmission is performed.
  That is, only a specific single sequence (corresponding to an HARQ-ACK state) among $2^N$ sequences allocated for HARQ-ACK transmission is transmitted.

However, if an SR transmission and an HARQ-ACK transmission take place in the same time resource, and the UE is capable of transmitting two sequences simultaneously due to a case other than the power limited case, the UE may operate as follows.

C. For Positive SR, an operation corresponding to SR only transmission is performed.
  A specific single sequence allocated for SR transmission is transmitted.
  Additionally, a specific one (corresponding to an HARQ-ACK state) of $2^N$ sequences allocated for HARQ-ACK transmission is transmitted.

D. For Negative SR, an operation corresponding to HARQ-ACK only transmission is performed.
  That is, a specific one (corresponding to an HARQ-ACK state) of $2^N$ sequences allocated for HARQ-ACK transmission is transmitted.

Unless otherwise conflicting, with each other, the $7^{th}$ SR transmission method and other proposed methods of the present invention may be applied in combination.

3.8. $8^{th}$ SR Transmission Method

The following description is given with the appreciation that an SR is a physical layer signal that a UE transmits to an base station to indicate the presence or absence of a UL transmission resource request (or UL transmission data), Positive SR indicates the presence of a UL transmission resource request (or UL transmission data), and Negative SR indicates the absence of a UL transmission resource request (or UL transmission data).

When a (short) PUCCH resource carrying an SR for service type A overlaps on the time axis with a PUSCH resource carrying data for service type B service type A), the UE may apply one or more of the following methods.

(1) SR information (e.g., Positive SR or Negative SR) is transmitted by UCI-piggyback in a (time and frequency) resource allocated to a PUSCH.
  When the SR is subjected to UCI-piggyback, the UE may puncture (or rate-match) some UL data of the PUSCH, and then transmit (encoded) UCI bits for the (1-bit) SR in specific REs of the PUSCH (according to a preset RE mapping pattern between the UE and the base station).

(2) Symbols of the PUSCH are punctured in a PUCCH resource, and the SR information (e.g., Positive SR or Negative SR) is transmitted in the symbols on the PUCCH.

The PUCCH resource carrying the SR information may be used by on/off keying of a specific sequence.

(3) Method of transmitting SR information (e.g., Positive SR or Negative SR) by switching a PUSCH DM-RS sequence.
  The PUSCH DM-RS whose sequence is switched according to the SR information may be a PUSCH DM-RS closest to a PUCCH resource allocated for SR transmission (or an earliest PUSCH DM-RS after the PUCCH resource allocated for SR transmission).
  Further, when it is said that the PUSCH DM-RS sequence is switched, this may imply that the scrambling value or CS value of the DM-RS is switched.

(4) Only an SR (short) PUCCH resource is transmitted, while a PUSCH transmission is not performed (i.e., PUSCH drop).

In the above configuration, the (short) PUCCH resource may have a transmission period spanning one or two OFDM symbols.

Further, the configuration may be applied equally to a (short) PUCCH resource carrying an SR and a DM-RS-based (long) PUCCH resource carrying UCI (e.g., an HARQ-ACK or CSI)(other than an SR). In other words, "PUSCH" may be replaced with "DM-RS-based (long) PUCCH", and "PUSCH DM-RS" may be replaced with "PUCCH DM-RS" in the configuration.

Further, if the (short) PUCCH carrying an SR and the (long) PUSCH carrying UL data differ in frequency resources, and the UE is capable of simultaneously transmitting a PUCCH and a PUSCH in FDM, the UE may simultaneously transmit the (short) PUCCH and the (long) PUSCH.

In a more specific example, if an SR is transmitted in a sequence selection-based PUCCH resource (e.g., a SEQ-PUCCH, which is a PUCCH resource in which one of a plurality of sequences is selected and transmitted to thereby represent UCI) within one symbol, and the transmission period of the SR is set to one OFDM symbol, it may occur that another PUSCH transmission collides with the SR transmission in a slot. In this case, if the SR and the PUSCH are for the same service type, the UE may transmit a buffer state report (BSR) or a UL scheduling request by MAC-layer or higher-layer information on the PUSCH without transmitting the SR separately, because the UE has already been transmitting the PUSCH.

On the other hand, if the SR and the PUSCH are for different service types, there may be different requirements for the transmission reliability of the service types. Thus, the SR and the PUSCH may preferably be transmitted as physical layer signals.

Accordingly, in the case where an SR and a PUSCH of different service types are to be transmitted, the present invention proposes a method of puncturing (or rate-matching) some REs or some symbols of the PUSCH, and transmitting UCI REs or a PUCCH resource carrying SR information in the corresponding resource, or a method of changing the sequence of a PUSCH DM-RS according to SR information, and then transmitting the SR information in the PUSCH DM-RS.

Unless otherwise conflicting, with each other, the $8^{th}$ SR transmission method and other proposed methods of the present invention may be applied in combination.

3.9. $9^{th}$ SR Transmission Method

When an SR (short) PUCCH resource overlaps on the time axis with a (sequence modulation-based) (long)

PUCCH resource for specific UCI (e.g., HARQ-ACK or CSI) transmission, the UE may apply one or more of the following methods.

(1) SR information (e.g., Positive SR or Negative SR) is transmitted by switching a sequence(s) transmitted in a specific symbol(s) within the (sequence modulation-based) (long) PUCCH resource.

The specific symbol(s) within the (sequence modulation-based) (long) PUCCH resource may be a symbol(s) corresponding to a (time-domain) transmission resource of the SR (short) PUCCH resource.

Further, switching the sequence(s) transmitted in the specific symbol(s) within the (long) PUCCH resource may amount to switching the scrambling value or CS value of the sequence(s).

(2) The SR (short) PUCCH resource is transmitted, while the (sequence modulation-based) (long) PUCCH is not transmitted (i.e., PUCCH drop).

The (short) PUCCH resource may have a transmission period spanning one or two OFDM symbols.

Further, the sequence modulation-based (long) PUCCH resource refers to a PUCCH resource in which modulated symbols of UCI are multiplied by a sequence in each of a plurality of symbols (e.g., 4 or more symbols), for transmission.

Further, if the (short) PUCCH carrying an SR and the (long) PUCCH carrying specific UCI differ in frequency resources, and the UE is capable of simultaneously transmitting a (short) PUCCH and a (long) PUCCH in FDM, the UE may simultaneously transmit the (short) PUCCH and the (long) PUCCH.

More specifically, the UE may support a sequence modulation-based (long) PUCCH carrying a signal obtained by multiplying a specific sequence by modulated symbols (binary phase shift keying (BPSK) or quadrature phase shift keying (QPSK) symbols) of UCI in each of a predetermined number of or more symbols.

Meanwhile, if an SR is transmitted in a sequence selection-based PUCCH resource (e.g., SEQ-PUCCH, which is a PUCCH resource carrying a selected one of a plurality of sequences to thereby represent UCI) within one symbol, and has a transmission period set to one OFDM symbol, the PUCCH resource carrying the SR may overlap with a specific transmission symbol(s) of a sequence modulation-based (long) PUCCH carrying UCI (other than an SR). The UE may represent transmission of SR information in the specific transmission symbol(s) by switching a sequence(s) of the sequence modulation-based (long) PUCCH, corresponding to the transmission symbol(s).

Particularly, if the sequence satisfies a low PAPR, the UE may advantageously transmit further SR information in the frequency resource already allocated as the sequence modulation-based (long) PUCCH resource by not transmitting the SR and the (long) PUCCH at the same time, while maintaining the low PAPR characteristics.

More specifically, for the above operation, the base station may configure two or more CS offset values (e.g., CS offset 0 and CS offset 1) for the sequence modulation-based (long) PUCCH, and indicate whether an SR is to be transmitted in a specific symbol of the sequence modulation-based (long) PUCCH in order to enable the UE to apply the different CS offsets. For example, if the base station indicates SR transmission in a specific symbol of the sequence modulation-based (long) PUCCH, the UE may apply CS offset 1 to a sequence in the symbol, while if the base station does not indicate SR information in a specific symbol of the sequence modulation-based (long) PUCCH, the UE may apply CS offset 0 to a sequence in the symbol.

Unless otherwise conflicting, with each other, the $9^{th}$ SR transmission method and other proposed methods of the present invention may be applied in combination.

3.10. $10^{th}$ SR Transmission Method

It is assumed that N HARQ-ACK states are mapped to N sequences in a one-to-one correspondence in each of two (OFDM) symbols, and the UE selects a sequence corresponding to an HARQ-ACK state and transmits the selected sequence. SR information may be represented by changing the one-to-one mapping between N HARQ-ACK states and sequences in the first symbol and/or the second symbol.

For example, when for two (OFDM) symbols, a 1-bit HARQ-ACK is transmitted in the sequence selection scheme, two sequences may be mapped to two HARQ-ACK states, ACK and NACK in a one-to-one correspondence in each symbol, as listed in the following table. In [Table 18], Seq. 1, Seq. 2, Seq. 3, and Seq. 4 may all be different sequences, or some of Seq. 1, Seq. 2, Seq. 3, and Seq. 4 may be the same sequences.

TABLE 18

| UCI state | 1st Symbol | 2nd Symbol |
|---|---|---|
| ACK | Seq. 1 | Seq. 3 |
| NACK | Seq. 2 | Seq. 4 |

Particularly, when the UE is to represent SR+1-bit HARQ-ACK information according to the present invention, the UE may represent the SR information by changing the one-to-one mapping between HARQ-ACK states and sequences in the first symbol and/or the second symbol. The following tables illustrate such examples. In [Table 19] and [Table 20], p-SR and n-SR represent Positive SR and Negative SR, respectively.

TABLE 19

| UCI state | 1st Symbol | 2nd Symbol |
|---|---|---|
| ACK (+n-SR) | Seq. 1 | Seq. 3 |
| NACK (+n-SR) | Seq. 2 | Seq. 4 |
| ACK (+p-SR) | Seq. 1 | Seq. 4 |
| NACK (+p-SR) | Seq. 2 | Seq. 3 |

TABLE 20

| UCI state | 1st Symbol | 2nd Symbol |
|---|---|---|
| ACK (+n-SR) | Seq. 1 | Seq. 3 |
| NACK (+n-SR) | Seq. 2 | Seq. 4 |
| ACK (+p-SR) | Seq. 2 | Seq. 3 |
| NACK (+p-SR) | Seq. 1 | Seq. 4 |

In another example, when the UE transmits a 2-bit HARQ-ACK in two (OFDM) symbols in the sequence selection scheme, four sequences may be mapped to four HARQ-ACK states, ACK/ACK, ACK/NACK, NACK/ACK, and NACK/NACK in a one-to-one correspondence in each symbol, as listed in the following table. In [Table 21], Seq. 1, Seq. 2, . . . Seq. 8 may all be different sequences, or some of Seq. 1, Seq. 2, . . . . Seq. 8 may be the same sequences.

TABLE 21

| UCI state | 1st Symbol | 2nd Symbol |
|---|---|---|
| ACK/ACK | Seq. 1 | Seq. 5 |
| ACK/NACK | Seq. 2 | Seq. 6 |
| NACK/ACK | Seq. 3 | Seq. 7 |
| NACK/NACK | Seq. 4 | Seq. 8 |

Further, when the UE is to represent SR+2-bit HARQ-ACK information according to the present invention, the UE may represent SR information by changing the one-to-one mapping between HARQ-ACK states and sequences in the first symbol and/or the second symbol. The following tables illustrate such examples. In [Table 22] and [Table 23], p-SR and n-SR represent Positive SR and Negative SR, respectively.

TABLE 22

| UCI state | 1st Symbol | 2nd Symbol |
|---|---|---|
| ACK/ACK (+n-SR) | Seq. 1 | Seq. 5 |
| ACK/NACK (+n-SR) | Seq. 2 | Seq. 6 |
| NACK/ACK (+n-SR) | Seq. 3 | Seq. 7 |
| NACK/NACK (+n-SR) | Seq. 4 | Seq. 8 |
| ACK/ACK (+p-SR) | Seq. 1 | Seq. 8 |
| ACK/NACK (+p-SR) | Seq. 2 | Seq. 7 |
| NACK/ACK (+p-SR) | Seq. 3 | Seq. 6 |
| NACK/NACK (+p-SR) | Seq. 4 | Seq. 5 |

TABLE 23

| UCI state | 1st Symbol | 2nd Symbol |
|---|---|---|
| ACK/ACK (+n-SR) | Seq. 1 | Seq. 5 |
| ACK/NACK (+n-SR) | Seq. 2 | Seq. 6 |
| NACK/ACK (+n-SR) | Seq. 3 | Seq. 7 |
| NACK/NACK (+n-SR) | Seq. 4 | Seq. 8 |
| ACK/ACK (+p-SR) | Seq. 4 | Seq. 5 |
| ACK/NACK (+p-SR) | Seq. 3 | Seq. 6 |
| NACK/ACK (+p-SR) | Seq. 2 | Seq. 7 |
| NACK/NACK (+p-SR) | Seq. 1 | Seq. 8 |

The above configurations may be generalized to say that if N sequence pairs transmitted in the first and second symbols to represent N HARQ-ACK states are configured as (Seq. $X_1$, Seq. $Y_1$), (Seq. $X_2$, Seq. $Y_2$), ..., (Seq. $X_N$, Seq. $Y_N$), the UE may represent HARQ-ACK+Positive SR by N ones of $N^2$ sequence pairs possibly produced from a sequence set {Seq. $X_1$, Seq. $X_2$, ..., Seq. $X_N$} and a sequence set {Seq. $Y_1$, Seq. $Y_2$, ..., Seq. $Y_N$}, and represent HARQ-ACK+Negative SR by the other N sequence pairs.

Unless otherwise conflicting, with each other, the 10th SR transmission method and other proposed methods of the present invention may be applied in combination.

3.11. 11th SR Transmission Method

When the UE represents a UCI state for an SR and a 2-bit HARQ-ACK by selecting one of a plurality of sequences and transmitting the selected sequence, the base station may indicate to the UE whether a part of the UCI states for the SR and the 2-bit HARQ-ACK are to be bundled into one state.

The base station may indicate bundling or non-bundling by higher-layer signaling (RRC signaling) and/or DCI.

Further, the number of sequences that the UE assumes to represent the SR and the 2-bit HARQ ACK may vary according to bundling or non-bundling.

More specifically, when the UE represents a UCI state for an SR and a 2-bit HARQ-ACK without bundling in the sequence selection scheme, the UE may need 8 sequences for a total of 8 UCI states as illustrated in the following table.

TABLE 24

| UCI state | Sequence |
|---|---|
| ACK/ACK (+n-SR) | Seq. 1 |
| ACK/NACK (+n-SR) | Seq. 2 |
| NACK/ACK (+n-SR) | Seq. 3 |
| NACK/NACK (+n-SR) | Seq. 4 |
| ACK/ACK (+p-SR) | Seq. 5 |
| ACK/NACK (+p-SR) | Seq. 6 |
| NACK/ACK (+p-SR) | Seq. 7 |
| NACK/NACK (+p-SR) | Seq. 8 |

If the UE uses the 8 sequences as listed in the above table, too much sequence resources may be required. Thus, a method of bundling some states and representing the bundled state by one sequence by the UE may be considered.

For example, the UE may bundle states having the same HARQ-ACK information and represent the bundled state by one sequence as illustrated in the following table, from the perspective of spatial bundling of 2-bit HARQ ACKs.

TABLE 25

| UCI state | Sequence |
|---|---|
| ACK/ACK (+n-SR) | Seq. 1 |
| ACK/NACK (+n-SR) | Seq. 2 |
| NACK/ACK (+n-SR) | |
| NACK/NACK (+n-SR) | |
| ACK/ACK (+p-SR) | Seq. 3 |
| ACK/NACK (+p-SR) | Seq. 4 |
| NACK/ACK (+p-SR) | |
| NACK/NACK (+p-SR) | |

If the UE always operate as illustrated in [Table 24], resources may be wasted significantly, while if the UE always operate as illustrated in [Table 25], the resolution of HARQ-ACK information may be decreased. In this context, the base station may configure one of the afore-described two modes semi-statically or dynamically according to a PUCCH resource state.

For example, the base station may indicate to the UE whether some of UCI states for an SR and a 2-bit HARQ ACK are to be bundled into one state by RRC signaling and/or DCI.

Unless otherwise conflicting, with each other, the 11th SR transmission method and other proposed methods of the present invention may be applied in combination.

3.12. 12th SR Transmission Method

The base station may configure a PUCCH resource set (for HARQ-ACK transmission) for the UE by higher-layer signaling, and indicate a PUCCH resource to be applied in the PUCCH resource set by DCI and/or implicit mapping. The base station may configure PUCCH resource sets (for HARQ-ACK transmission) independently in a (mini-) slot carrying an SR and a (mini-) slot without an SR.

In a specific example, since a PUCCH resource for HARQ-ACK transmission co-exists with a PUCCH resource for SR transmission in a slot configured to carry an SR, the base station may suffer from limitations in configuring a PUCCH resource set for HARQ-ACK transmission. On the contrary, there may be more candidates for PUCCH resources for HARQ-ACK transmission in a slot carrying no SR, which brings more freedom to the base station in configuring a PUCCH resource set.

In the latter case, for example, the base station may distribute a PUCCH resource set across a wider frequency band on a frequency axis, thereby facilitating achievement of a frequency diversity. Therefore, the base station may preferably configure PUCCH resource sets (for HARQ-ACK transmission) independently in a (mini-) slot carrying an SR and a (mini-) slot without an RS.

Unless otherwise conflicting, with each other, the 12$^{th}$ SR transmission method and other proposed methods of the present invention may be applied in combination.

3.13. 13$^{th}$ SR Transmission Method

When the base station indicates signal transmission to the UE such that an SR (short) PUCCH resource and a (short) PUCCH resource for $\log_2(N)$-bit (N=2 or 4) HARQ-ACK transmission overlap with each other (partially) over a time-domain resource, the UE may select one of a plurality of sequences and transmit the selected sequence in order to represent a UCI state for the SR and the HARQ-ACK. The base station may configure the SR (short) PUCCH resource and the (short) PUCCH resource for HARQ-ACK transmission (referred to as HARQ-ACK (short) PUCCH resource) as follows.

(1) Opt. 1: Method of allocating four sequences as an SR (short) PUCCH resource, and N sequences as an HARQ-ACK (short) PUCCH resource.

(1-1) Each of the four sequences in the SR (short) PUCCH resource may be a sequence obtained by applying one of four equidistant CS values (from the perspective of CS indexes) to a specific (low PAPR/cube metric (CM)) sequence within a PRB (the same PRB).

In a specific example, if L CSs are available in the PRB, and an initial CS index allocated to the SR (short) PUCCH resource is k, CS values corresponding to the four sequences may be set to k, (k+L/4) mod L, (k+2L/4) mod L, and (k+3L/4) mod L in terms of CS indexes.

(1-2) For SR only transmission, one of the four sequences in the SR (short) PUCCH resource may be used to indicate whether the SR is Positive SR or Negative SR by on/off keying. The sequence resource corresponding to SR only may be reserved in an SR transmission period.

In a specific example, the sequence may correspond to the initial CS index allocated to the SR (short) PUCCH resource.

(1-3) For HARQ-ACK only, N sequences in the HARQ-ACK (short) PUCCH resource may correspond to N HARQ-ACK states. Then, the UE may select and transmit a sequence corresponding to an HARQ-ACK state to be reported.

(1-4) When the base station indicates signal transmission to the UE such that an SR (short) PUCCH resource and an HARQ-ACK (short) PUCCH resource overlap with each other (partially) over a time-domain resource, a sequence corresponding to each UCI state may be defined as follows. To represent a corresponding UCI state, the UE may transmit a sequence corresponding to the UCI state.

(1-2-1) N=2

Two sequences in the SR (short) PUCCH resource may correspond to {Positive SR, ACK} and {Positive SR, NACK}, respectively.

In a specific example, if an initial CS index allocated to the SR (short) PUCCH resource is k, the two sequences may CS values corresponding to k and (k+L/2) mod L in terms of CS indexes.

Further, a sequence corresponding to {Positive SR, NACK} may be a sequence corresponding to SR only.

Two sequences in the HARQ-ACK (short) PUCCH resource may correspond to {Negative SR, ACK} and {Negative SR, NACK}, respectively.

(1-2-2) N=4

Four sequences in the SR (short) PUCCH resource may correspond to {Positive SR, A/A}, {Positive SR, A/N}, {Positive SR, N/A}, and {Positive SR, N/N}, respectively.

In a specific example, a sequence corresponding to {Positive SR, N/N} may be a sequence corresponding to SR only.

Four sequences in the HARQ-ACK (short) PUCCH resource may correspond to {Negative SR, A/A}, {Negative, A/N}, {Negative, N/A}, and {Negative SR, N/N}, respectively.

(2) Opt 2: Method of allocating two sequences as an SR (short) PUCCH resource, and N sequences as an HARQ-ACK (short) PUCCH resource.

(2-1) Each of the two sequences in the SR (short) PUCCH resource may be a sequence obtained by applying one of two equidistant CS values (from the perspective of CS indexes) to a specific (low PAPR/CM) sequence within a PRB (the same PRB).

In a specific example, when L CSs are available in the PRB, and an initial CS index allocated to the SR (short) PUCCH resource is k, CS values corresponding to the two sequences may be set to k and (k+L/2) mod L in terms of CS indexes.

(2-2) For SR only transmission, one of the two sequences in the SR (short) PUCCH resource may be used to indicate whether the SR is Positive SR or Negative SR by on/off keying. The sequence resource corresponding to SR only may be reserved in an SR transmission period.

In a specific example, the sequence may correspond to the initial CS index allocated to the SR (short) PUCCH resource.

(2-3) For HARQ-ACK only, N sequences in the HARQ-ACK (short) PUCCH resource may correspond to N HARQ-ACK states. Then, the UE may select and transmit a sequence corresponding to an HARQ-ACK state to be reported.

(2-4) When the base station indicates signal transmission to the UE such that an SR (short) PUCCH resource and an HARQ-ACK (short) PUCCH resource overlap with each other (partially) over a time-domain resource, a sequence corresponding to each UCI state may be defined as follows. To represent a corresponding UCI state, the UE may transmit a sequence corresponding to the UCI state.

(2-4-1) N=2

Two sequences in the SR (short) PUCCH resource may correspond to {Positive SR, ACK} and {Positive SR, NACK}, respectively.

In a specific example, if an initial CS index allocated to the SR (short) PUCCH resource is k, the two sequences may correspond to k and (k+L/2) mod L in terms of CS indexes.

Further, a sequence corresponding to {Positive SR, NACK} may be a sequence corresponding to SR only.

Two sequences in the HARQ-ACK (short) PUCCH resource may correspond to {Negative SR, ACK} and {Negative SR, NACK}, respectively.

(2-4-2) N=4

Two sequences in the SR (short) PUCCH resource may correspond to {Positive SR, A/A} and {Positive SR, A/N or N/A or N/N}, respectively.

In a specific example, one of the two sequences may correspond to Positive SR, and a NACK as a result of (logical AND-based) ACK/NACK bundling of 2-bit HARQ-ACKs. Further, a sequence corresponding to {Positive SR, A/N or N/A or N/N} may be a sequence corresponding to SR only.

Four sequences in the HARQ-ACK (short) PUCCH resource may correspond to {Negative SR, A/A}, {Negative SR, A/N}, {Negative SR, N/A}, and {Negative SR, N/N}, respectively.

(3) Opt. 3: Method of allocating one sequence as an SR (short) PUCCH resource, and (2N−1) sequences as an HARQ-ACK (short) PUCCH resource.

(3-1) The one sequence in the SR (short) PUCCH resource may be a CS value corresponding to an initial CS index allocated to the SR (short) PUCCH resource.

(3-2) For SR only transmission, the single sequence in the SR (short) PUCCH resource may be used to indicate whether the SR is Positive SR or Negative SR by on/off keying. The sequence resource corresponding to SR only may be reserved in an SR transmission period.

(3-3) For HARQ-ACK only transmission, N ones of the (2N−1) sequences in the HARQ-ACK (short) PUCCH resource may correspond to N HARQ-ACK states. Then, the UE may select and transmit a sequence corresponding to an HARQ-ACK state to be reported.

(3-4) When the base station indicates signal transmission to the UE such that an SR (short) PUCCH resource and an HARQ-ACK (short) PUCCH resource overlap with each other (partially) over a time-domain resource, a sequence corresponding to each UCI state may be defined as follows. To represent a corresponding UCI state, the UE may transmit a sequence corresponding to the UCI state.

(3-4-1) N=2

The single sequence available in the SR (short) PUCCH resource may correspond to {Positive SR, NACK}.

Three sequences in the HARQ-ACK (short) PUCCH resource may correspond to {Positive SR, ACK}, {Negative SR, ACK}, and {Negative SR, NACK}, respectively.

(3-4-2) N=4

The single sequence available in the SR (short) PUCCH resource may correspond to {Positive SR, N/N}.

7 sequences in the HARQ-ACK (short) PUCCH resource may correspond to {Positive SR, A/A}, {Positive SR, A/N}, {Positive SR, N/A}, {Negative SR, A/A}, {Negative SR, A/N}, {Negative SR, N/A}, and {Negative SR, N/N}, respectively.

(4) Opt. 4: Method of allocating one sequence as an SR (short) PUCCH resource, and 2N sequences as an HARQ-ACK (short) PUCCH resource.

(4-1) The one sequence in the SR (short) PUCCH resource may be a CS value corresponding to an initial CS index allocated to the SR (short) PUCCH resource.

(4-2) For SR only transmission, the single sequence in the SR (short) PUCCH resource may be used to indicate whether the SR is Positive SR or Negative SR by on/off keying. The sequence resource corresponding to SR only may be reserved in an SR transmission period.

(4-3) For HARQ-ACK only transmission, N ones of the 2N sequences in the HARQ-ACK (short) PUCCH resource may correspond to N HARQ-ACK states. Then, the UE may select and transmit a sequence corresponding to an HARQ-ACK state to be reported.

(4-4) When the base station indicates signal transmission to the UE such that an SR (short) PUCCH resource and an HARQ-ACK (short) PUCCH resource overlap with each other (partially) over a time-domain resource, a sequence corresponding to each UCI state may be defined as follows. To represent a corresponding UCI state, the UE may transmit a sequence corresponding to the UCI state.

(4-4-1) N=2

Specific two sequences in the HARQ-ACK (short) PUCCH resource may correspond to {Positive SR, ACK} and {Positive SR, NACK}, respectively.

The remaining two sequences in the HARQ-ACK (short) PUCCH resource may correspond to {Negative SR, ACK} and {Negative SR, NACK}, respectively. The two sequences may be for HARQ-ACK only.

(4-4-2) N=4

Specific four sequences in the HARQ-ACK (short) PUCCH resource may correspond to {Positive SR, A/A}, {Positive SR, A/N}, {Positive SR, N/A}, and {Positive SR, N/N}, respectively.

The remaining four sequences in the HARQ-ACK (short) PUCCH resource may correspond to {Negative SR, A/A}, {Negative SR, A/N}, {Negative SR, N/A}, and {Negative SR, N/N}, respectively. The four sequences may be two sequences for HARQ-ACK only.

In the above description, A/A, A/N, N/A, and N/N represent ACK/ACK, ACK/NACK, NACK/ACK, and NACK/NACK, respectively.

In the above configuration, a (short) PUCCH resource or a sequence corresponding to a UCI state for an SR and an HARQ-ACK may be transmitted in one or two OFDM symbols. Even though different sequences may actually be transmitted in the two symbols according to specific base sequence hopping or CS hopping, UCI may be repeatedly transmitted.

Further, when N sequences are allocated in an SR (short) PUCCH resource, and indicate an SR only state or a Positive SR+specific HARQ-ACK state under circumstances, a mapping relationship between the UCI states and the N sequences may change on a slot and/or symbol basis (according to a predetermined rule).

Further, the HARQ-ACK (short) PUCCH resource includes more than 4 sequence resources, two or more PRB resources may be configured to include the sequence resources. Particularly, if there are 2N sequence resources, each of the two PRBs may include N sequence resources, and each of the N sequence resources in each PRB may be a sequence obtained by applying one of N equidistant CS values (from the perspective of CS indexes) to a specific (low PAPR/CM) sequence.

Further, a CS value may refer to a low PAPR sequence to which a specific CS value is applied.

More specifically, when the base station indicates signal transmission to the UE such that an SR (short) PUCCH resource and a (short) PUCCH resource for 1-bit or 2-bit HARQ-ACK transmission overlap with each other (partially) over a time-domain resource, the UE may select and transmit one of a plurality of sequences to represent a (joint) UCI state for an SR and an HARQ-ACK in order to satisfy the single carrier property (or low PAPR/CM property).

Preferably, the SR (short) PUCCH resource may include at least a sequence resource for SR only transmission. Further, the HARQ-ACK (short) PUCCH resource should be valid even in the absence of an SR request, and thus may include at least sequence resources for Negative SR+specific HARQ-ACK states.

An issue may arise as to which resource between the SR (short) PUCCH resource and the HARQ-ACK (short) PUCCH resource should include sequence resources to represent the Positive SR+specific HARQ-ACK states among (joint) UCI states for an SR and an HARQ-ACK. The issue may be addressed in two methods: one is to include the sequence resources in the SR (short) PUCCH resource (Opt. 1 and Opt. 2), and the other is to include the sequence resources in the HARQ-ACK (short) PUCCH resource (Opt. 3 and Opt. 4).

The afore-described 13$^{th}$ SR transmission method is summarized in general terms as follows.

When the base station indicates signal transmission to the UE such that an SR (short) PUCCH resource and a (short) PUCCH resource for $\log_2(N)$-bit (N=2 or 4) HARQ-ACK transmission overlap with each other (partially) over a time-domain resource, the UE may transmit a (joint) UCI state for an SR and an HARQ-ACK. The SR (short) PUCCH resource and the HARQ-ACK (short) PUCCH resource may support transmission of (joint) UCI states for an SR and an HARQ-ACK as follows.

<1> Opt. A

<1-1> With the SR (short) PUCCH resource, transmission of UCI states corresponding to SR only and HARQ-ACK (with Positive SR) is supported.

<1-1-1> SR only may be represented by on/off keying of a (single) PUCCH resource or (single) sequence configured by a higher layer.

<1-1-2> SR only and All NACK (with Positive SR) may be regarded as the same UCI state.

<1-1-3> For HARQ-ACK (with Positive SR), ACK/NACK bundling (e.g., a logical AND operation) may be applied.

<1-1-4> If the SR (short) PUCCH resource is based on the sequence selection scheme, UCI states may be represented as follows. To represent a UCI state, the UE may then transmit a sequence corresponding to the UCI state.

<1-1-4-1> Opt. A-1: The SR (short) PUCCH resource is configured with 4 sequences.

<1-1-4-1-1> N=2

Two sequences in the SR (short) PUCCH resource may correspond to {Positive SR, ACK} and {Positive SR, NACK}, respectively.

For example, if an initial CS index allocated to the SR (short) PUCCH resource is k, the two sequences may be CS values corresponding to k and (k+L/2) mod L in a PRB (the same PRB) from the perspective of CS indexes (L is a maximum number of CSs in the PRB).

Further, a sequence corresponding to {Positive SR, NACK} may be a sequence corresponding to SR only.

(1-1-4-1-2) N=4

Four sequences in the SR (short) PUCCH resource may correspond to {Positive SR, A/A}, {Positive SR, A/N}, {Positive SR, N/A}, and {Positive SR, N/N}, respectively.

For example, a sequence corresponding to {Positive SR, N/N} may be a sequence corresponding to SR only.

<1-1-4-2> Opt. A-2: The SR (short) PUCCH resource is configured with 2 sequences.

<1-1-4-2-1> N=2

Two sequences in the SR (short) PUCCH resource may correspond to {Positive SR, ACK} and {Positive SR, NACK}, respectively.

For example, if an initial CS index allocated to the SR (short) PUCCH resource is k, the two sequences may be CS values corresponding to k and (k+L/2) mod L in a PRB (the same PRB) from the perspective of CS indexes (L is a maximum number of CSs in the PRB).

Further, a sequence corresponding to {Positive SR, NACK} may be a sequence corresponding to SR only.

Two sequences in the HARQ-ACK (short) PUCCH resource may correspond to {Negative SR, ACK} and {Negative SR, NACK}, respectively.

<1-1-4-2-2> N=4

Two sequences in the SR (short) PUCCH resource may correspond to {Positive SR, A/A} and {Positive SR, A/N or N/A or N/N}, respectively.

For example, one of the sequences may correspond to Positive SR and NACK as a result of (logical AND-based) ACK/NACK bundling of 2-bit HARQ-ACKs.

For example, a sequence corresponding to {Positive SR, A/N or N/A or N/N} may be a sequence corresponding to SR only.

Four sequences in the HARQ-ACK (short) PUCCH resource may correspond to {Negative SR, A/A}, {Negative SR, A/N}, {Negative SR, N/A}, and {Negative SR, N/N}, respectively.

<1-2> Transmission of UCI states corresponding to HARQ-ACK only and HARQ-ACK (with Negative SR) is supported per HARQ-ACK (short) PUCCH resource.

Herein, UCI states for HARQ-ACK only (for the same ACK/NACK information) and HARQ-ACK (with Negative SR) may be regarded as the same UCI state.

<2> Opt. B

<2-1> With the SR (short) PUCCH resource, transmission of UCI states corresponding to SR only is supported.

Herein, SR only may be represented by on/off keying of a (single) PUCCH resource or (single) sequence configured by a higher layer.

<2-2> Transmission of UCI states corresponding to HARQ-ACK only, HARQ-ACK (with Positive SR), and HARQ-ACK (with Negative SR) is supported per HARQ-ACK (short) PUCCH resource.

Herein, UCI states for HARQ-ACK only (for the same ACK/NACK information) and HARQ-ACK (with Negative SR) may be regarded as the same UCI state.

<3> Opt. C

<3-1> With the SR (short) PUCCH resource, transmission of UCI states corresponding to SR only is supported.

Herein, SR only may be represented by on/off keying of a (single) PUCCH resource or (single) sequence configured by a higher layer.

<3-2> Transmission of UCI states corresponding to HARQ-ACK only and HARQ-ACK (with Negative SR) is supported per HARQ-ACK (short) PUCCH resource.

Herein, UCI states for HARQ-ACK only (for the same ACK/NACK information) and HARQ-ACK (with Negative SR) may be regarded as the same UCI state.

<3-3> Transmission of UCI states corresponding to HARQ-ACK (with Positive SR) is supported with a (specific) (short) PUCCH resource configured separately (from an SR/HARQ-ACK PUCCH resource).

Herein, the (specific) (short) PUCCH resource may be configured in one of the following methods.

Opt. C-1: A single resource is configured per UE.

Opt. C-2: Configured per a PUCCH resource set (for HARQ-ACK transmission) configured for a UE Opt. C-3: Configured per a PUCCH format configured for a UE.

Opt. C-4: Configured per PUCCH resource (for HARQ-ACK transmission) configured for a UE.

In the above configuration, a transmission resource corresponding to All NACK (with Positive SR) may be configured to be the same as or independently of a transmission resource for SR only.

Further, the PUCCH resource for HARQ-ACK may be a resource of a long PUCCH (e.g., a PUCCH having 4 or more symbols in length) for an HARQ-ACK (having up to 2 bits).

In the afore-described 13$^{th}$ SR transmission method, a PUCCH resource (or PUCCH resource set) for HARQ-ACK transmission and an SR (short) PUCCH resource may be configured by higher-layer signaling and/or DCI, and independently of each other.

The following may be considered to be an additional operation for the 13$^{th}$ SR transmission method. It is assumed herein that one or more PUCCH resource sets for HARQ-ACK transmission are configured for the UE (by higher-layer signaling), and one or more PUCCH resources are included in each HARQ-ACK PUCCH resource, and a different PUCCH format may be used for each HARQ-ACK PUCCH resource.

1) Issue 1: Method of configuring a Positive SR+HARQ-ACK transmission resource in the above case.

Opt. 1-0: Configured per UE.

Opt. 1-1: Configured per HARQ-ACK PUCCH resource set.

Opt. 1-2: One configured per PUCCH format.

Opt. 1-3: One configured per HARQ-ACK PUCCH resource.

Opt. 1-4: One configured per SR PUCCH resource (per SR process or per SR procedure).

2) Issue 2: Relationship between a Positive SR+HARQ-ACK transmission resource and an SR only transmission resource in the above case.

2-1) Opt. 2-1: Among Positive SR+HARQ-ACK transmission resources, an ACK/NACK state uses a resource corresponding to "ALL NACK" as an SR only transmission resource (shared)

Opt. 2-1 may be combined with Opt. 1-0.

Opt. 2-1 may be combined with Opt. 1-1, and additional information indicating an HARQ-ACK PUCCH resource set to which a Positive SR+All NACK transmission resource used for SR only belongs may be required.

Opt. 2-1 may be combined with Opt. 1-2, and additional information indicating a PUCCH format in which a Positive SR+All NACK transmission resource used for SR only is configured may be required.

Opt. 2-1 may be combined with Opt. 1-3, and additional information indicating an HARQ-ACK PUCCH resource in which a Positive SR+All NACK transmission resource used for SR only is configured may be required.

Opt. 2-1 may be combined with Opt. 1-4.

2-2) Opt. 2-2: A resource configured independently of a Positive SR+HARQ-ACK transmission resource is used as an SR only transmission resource.

Unless otherwise conflicting with each other, the 13$^{th}$ SR transmission method and other proposed methods of the present invention may be applied in combination.

3.14. 14$^{th}$ SR Transmission Method

When the UE represents N (e.g., N=2 or 4) states (e.g., $S_0$, $S_1$, . . . , $S_{N-1}$) of an HARQ-ACK (with or without an SR) by selecting one of N CS indexes in a PRB and transmitting the selected CS index, the base station may set an initial CS index (i.e., $\in\{0, 1, \ldots, L-1\}$) as an HARQ-ACK (short) PUCCH resource. In this case, the UE may map CSs to UCI states in one of the following methods.

(1) Opt. 1: Method of mapping a UCI state, $S_k$ to a CS index, (q+k·L/N) mod L, for k=0, 1, . . . , N−1.

(2) Opt. 2: Method of calculating a CS index (q+k·L/N) mod L for each k (k=0, 1, . . . , N−1), and when the N CS indexes are arranged in ascending order (or descending order) to $CS_0$, $CS_0$, . . . , $CS_{N-1}$, mapping UCI states $S_k$ to $CS_k$, for k=0, 1, . . . , N−1.

L (e.g., 12) represents the total number of CSs in a PRB.

More specifically, in the case where N UCI states are represented as N CS indexes in a PRB, and the base station indicates an initial CS index to the UE, UCI states represented by the UE may sequentially correspond to CS indexes which (linearly) increase from the initial CS index.

Herein, if a value calculated by adding an increment to the initial CS index exceeds the number of CSs, L in the PRB, the UCI state may correspond to a value to which a modulo operation of L is further applied.

Or, if the value calculated by adding the increment to the initial CS index exceeds the number of CSs, L in the PRB, the UCI state may sequentially correspond to values obtained by acquiring CS indexes (linearly) increasing from the initial CS index and then re-ordering the CS indexes in ascending or descending order.

Unless otherwise conflicting with each other, the 14$^{th}$ SR transmission method and other proposed methods of the present invention may be applied in combination.

3.15. 15$^{th}$ SR Transmission Method

When the base station indicates signal transmission to the UE such that an SR (short) PUCCH resource overlaps (partially) with a $\log_2(N)$-bit (N=2 or 4) HARQ-ACK (short) PUCCH resource over a time-domain resource, the UE may represent SR-related information in X bits (X≥1), add the X bits to UCI payload, and transmit the UCI payload with the X bits in the HARQ-ACK (short) PUCCH resource.

The SR-related information may include one or more of the following pieces of information.

(1) Information indicating whether the SR is Positive SR or Negative SR (2) A (corresponding) SR process index (i.e., information indicating an SR process corresponding to the SR)

The UE may transmit the SR-related information in one of the following methods.

1) Only a 1-bit SR is transmitted, indicating Positive SR or Negative SR for an SR (process) with a highest priority.

2) An X-bit SR is transmitted, wherein (a) Positive SR or Negative SR per SR (process) is indicated by a bitmap, or (b) only Positive SR information for an SR having the highest priority among SRs (SR processes) having Positive SR. (In (b), for any other SR (process) than the above SRs (SR processes), Negative SR may be determined).

More specifically, if SR process #1, SR process #2, SR process #3 are prioritized in the order of #1>#2>#3, SR process #1 has Negative SR, SR process #2 has Positive SR, and SR process #3 has Positive SR, the UE may transmit '011' as a 3-bit SR in (a), whereas the UE may transmit '010' as a 3-bit SR in (b).

In the above configuration, if the SR-related information, X bits is added to a UCI payload size, a maximum coding rate configured for the HARQ-ACK (short) PUCCH resource may be exceeded. Then, the UE may perform one of the following operations. In the following description, A/N may represent HARQ-ACK.

<1> Opt 1: 1-bit SR+A/N bits

The 1-bit SR may be SR information (e.g., Positive SR or Negative SR) for an SR process having a highest priority among a plurality of (e.g., X) SR processes.

<2> Opt 2: X-bit SR+bundled A/N bits

The bundling may be spatial-domain A/N bundling.

<3> Opt 3: 1-bit SR+bundled A/N bits

The UE may immediately perform the operation of Opt 3, or if a maximum coding rate is exceeded in spite of Opt 1/2, the operation of Opt 3 may be performed as a second step for Opt 1/2.

<4> Opt. 4: Only A/N is transmitted with all SR transmissions dropped.

<5> Opt. 5: 1-bit (or X-bit) SR+(partial) A/N bits (i.e., some A/N bits are dropped)

The SR-related information, X bits may be associated with a process of selecting an HARQ-ACK (short) PUCCH resource set.

In a specific example, the UE may select one of (a plurality of) PUCCH resource sets on the basis of a UCI payload size (during HARQ-ACK transmission), and then the base station may indicate a specific PUCCH resource to be actually transmitted from the selected PUCCH resource set by DCI. If the UE transmits SR-related information with an HARQ-ACK, the UE may select a PUCCH resource set in one of the following methods.

1> Opt. 1: The PUCCH resource set is selected on the basis of the (total) UCI payload size of the HARQ-ACK and the SR-related information.

If any other UCI type (than the HARQ-ACK and the SR) is transmitted along (in the HARQ-ACK (short) PUCCH resource), the (total) UCI payload size may be calculated by reflecting the UCI payload size of the UCI type.

2> Opt. 2: The PUCCH resource set is selected on the basis of the UCI payload size of the HARQ-ACK.

3> In the above examples, the base station may configure a PUCCH resource set per UCI payload size range for the UE (by higher-layer signaling).

All operations of the afore-described 15$^{th}$ SR transmission method may be extended to simultaneous transmission of CSI and an SR at a UE.

More specifically, when an SR (short) PUCCH resource collides with an HARQ-ACK (short) PUCCH resource (for an HARQ-ACK having more than 2 bits) on the time axis, the UE may transmit X-bit information for the SR in the HARQ-ACK (short) PUCCH resource. Herein, the UE may add the size of the X-bit information to an HARQ-ACK payload size, and transmit coded bits of the summed UCI payload in the HARQ-ACK (short) PUCCH resource.

In this case, the SR-related X bits may include information about an SR process (or service) for which the SR is, as well as information indicating the presence or absence of an SR.

Unless otherwise conflicting with each other, the 15$^{th}$ SR transmission method and other proposed methods of the present invention may be applied in combination.

3.16. 16$^{th}$ SR Transmission Method

In the present invention, it is assumed hereinbelow that a PUCCH carrying UCI such as an HARQ-ACK or CSI for a PDSCH scheduled by a DL assignment has a different PUCCH format according to the payload size and transmission duration (the number of PUCCH symbols) of the UCI.

(1) PUCCH format 0
A supported UCI payload size: up to K bits (e.g., K=2)
The number of OFDM symbols in a single PUCCH: 1 to X symbols (e.g., X=2)
Transmission structure: It includes only a UCI signal without a DM-RS. According to the transmission structure, the UE may transmit a specific UCI state by selecting/transmitting one of a plurality of specific sequences.

(2) PUCCH format 1
A supported UCI payload size: up to K bits
The number of OFDM symbols in a single PUCCH: Y to Z symbols (e.g., Y=4, Z=14)
Transmission structure: A DM-RS and UCI are configured/mapped in TDM in different symbols, and for the UCI, a modulation (e.g., QPSK) symbol is multiplied by a specific sequence. As CSs/OCCs are applied to both of the UCI and the DM-RS, multiplexing between a plurality of UEs (in the same RB) can be supported.

(3) PUCCH format 2
A supported UCI payload size: more than K bits
The number of OFDM symbols in a single PUCCH: 1 to X symbols
Transmission structure: A DM-RS and UCI are configured/mapped in FDM in the same symbol, and the UE applies only inverse fast Fourier transform (IFFT) without discrete Fourier transform (DFT) to coded UCI bits, prior to transmission.

(4) PUCCH format 3
A supported UCI payload size: more than K bits
The number of OFDM symbols in a single PUCCH: Y to Z symbols
Transmission structure: A DM-RS and UCI are configured/mapped in TDM in different symbols, and the UE transmits coded UCI bits by applying DFT to the coded UCI bits. As an OCC is applied to the UCI at the front end of DFT, and a CS (or IFDM mapping) is applied to the DM-RS, multiplexing between a plurality of UEs can be supported.

(5) PUCCH format 4
A supported UCI payload size: more than K bits
The number of OFDM symbols in a single PUCCH: Y to Z symbols
Transmission structure: A DM-RS and UCI are configured/mapped in TDM in different symbols, and the UE transmits coded UCI bits by applying DFT to the coded UCI bits, without multiplexing between UEs.

In the following description, an SR refers to a physical layer signal by which a UE requests UL scheduling to an base station. Particularly, Positive SR indicates that the UE requests UL scheduling, and Negative SR indicates that the UE does not request UL scheduling.

The UE may support simultaneous transmission of an SR and an HARQ-ACK according to a combination of PUCCH formats configured for an SR (only) PUCCH resource (hereinafter, referred to as an SR PUCCH) and an HARQ-ACK (only) PUCCH resource (hereinafter, referred to as an A/N PUCCH).

<1> A/N PUCCH=PUCCH format 0
<1-1> SR PUCCH=PUCCH format 0
SR only or Positive SR+HARQ-ACK is transmitted on the SR PUCCH. Herein, an SR PUCCH may be configured per SR process.
HARQ-ACK only or Negative SR+HARQ-ACK is transmitted on the A/N PUCCH.
<1-2> SR PUCCH=PUCCH format 1
SR only is transmitted on the SR PUCCH.
Positive SR+HARQ-ACK is transmitted in one of the following methods.
Opt. 1: The SR transmission is dropped, and HARQ-ACK only is transmitted on the A/N PUCCH.
Opt. 2: Positive SR+HARQ-ACK is transmitted on the SR PUCCH.
Opt. 3: The UE configures a PUCCH format 0 resource separately (from the SR PUCCH and/or the A/N PUCCH), and transmits Positive SR+HARQ-ACK in the resource. The separate resource may be configured per SR process.
<1-3> HARQ-ACK only or Negative SR+HARQ-ACK is transmitted on the A/N PUCCH.
<2> A/N PUCCH=PUCCH format 1
<2-1> SR PUCCH=PUCCH format 0
SR only is transmitted on the SR PUCCH.

Positive SR+HARQ-ACK is transmitted in one of the following methods.

Opt. 1: The SR transmission is dropped, and HARQ-ACK only is transmitted on the A/N PUCCH.

Opt. 2: Positive SR+HARQ-ACK is transmitted on the SR PUCCH.

Opt. 3: The UE configures a PUCCH format 1 resource separately (from the SR PUCCH and/or the A/N PUCCH), and transmits Positive SR+HARQ-ACK in the resource. The separate resource may be configured per SR process.

HARQ-ACK only or Negative SR+HARQ-ACK is transmitted on the A/N PUCCH.

<2-2> SR PUCCH=PUCCH format 1

SR only or Positive SR+HARQ-ACK is transmitted on the SR PUCCH. An SR PUCCH may be configured per SR process.

HARQ-ACK only or Negative SR+HARQ-ACK is transmitted on the A/N PUCCH.

<3> A/N PUCCH=PUCCH format 2 or 3 or 4

<3-1> SR PUCCH=PUCCH format 0

SR only is transmitted on the SR PUCCH.

Positive SR+HARQ-ACK is added to UCI payload and transmitted on the A/N PUCCH.

HARQ-ACK only or Negative SR+HARQ-ACK is transmitted on the A/N PUCCH.

<3-2> SR PUCCH=PUCCH format 1

SR only is transmitted on the SR PUCCH.

Positive SR+HARQ-ACK is added to UCI payload and transmitted on the A/N PUCCH.

HARQ-ACK only or Negative SR+HARQ-ACK is transmitted on the A/N PUCCH. An SR PUCCH may be configured per SR process.

In the above configurations, one of the options may selectively be applied depending on a service type corresponding to an SR.

More specifically, when there are various transmission types for PUCCH resources or various PUCCH formats including format 0 (sequence selection), format 1 (sequence modulation), and format 2/3/4 (encoding/modulation) as assumed in the present invention, an efficient method for simultaneous transmission of an SR and an HARQ-ACK may vary depending on a combination of the PUCCH format of an SR PUCCH resource (hereinafter, referred to as an SR PUCCH) and the PUCCH format of an HARQ-ACK PUCCH resource (hereinafter, referred to as an A/N PUCCH).

For example, if the SR PUCCH and the A/N PUCCH are in the same PUCCH format, it may be efficient for the UE to transmit Positive SR+HARQ-ACK on the SR PUCCH (e.g., resource selection). On the contrary, if the SR PUCCH and the A/N PUCCH are in different PUCCH formats, and the PUCCH format of the A/N PUCCH is one of PUCCH format 2, PUCCH format 3, and PUCCH format 4, it may be more efficient for the UE to transmit Positive SR+HARQ-ACK on the A/N PUCCH because the PUCCH format may carry much UCI payload.

Or, in the case where the PUCCH formats of the SR PUCCH and the A/N PUCCH are identical in terms of their (supported) maximum UCI payload sizes and differ from each other in terms of their transmission durations (on the time axis of PUCCH resources), it may be preferred in UL coverage that if the transmission duration of the SR PUCCH is larger than that of the A/N PUCCH, the UE transmits Positive SR+HARQ-ACK on the SR PUCCH, and otherwise, the UE (additionally) configures a PUCCH resource (separately from the SR PUCCH and/or the A/N PUCCH), which has the same PUCCH format as the A/N PUCCH resource (in each SR process), and transmit Positive SR+HARQ-ACK in the configured resource.

Additionally, if the SR PUCCH is a short PUCCH and the A/N PUCCH is a long PUCCH, the UE may support simultaneous transmission of the SR and the HARQ-ACK as follows.

[1] SR only is transmitted on the SR PUCCH.

An SR PUCCH may be configured per SR process.

[2] Positive SR+HARQ-ACK is transmitted in one of the following methods.

Opt. 1: Positive SR+HARQ-ACK SR is transmitted on the SR PUCCH or a long PUCH configured separately (from the SR PUCCH and/or the A/N PUCCH) (per SR process), according to a service type corresponding to the SR. For example, the UE may transmit an SR having a high low-latency requirement (e.g., a URLLC SR) on the SR PUCCH, and an SR having a low low-latency requirement (e.g., an eMBB SR) on the long PUCCH.

Opt. 2: Method of transmitting Positive SR+HARQ-ACK on the SR PUCCH or the A/N PUCCH according to a service type corresponding to the SR. For example, the UE may transmit an SR having a high low-latency requirement (e.g., a URLLC SR) on the SR PUCCH, and an SR having a low low-latency requirement (e.g., an eMBB SR) on the A/N PUCCH.

[3] HARQ-ACK only or Negative SR+HARQ-ACK is transmitted on the A/N PUCCH.

The above configurations may be extended to simultaneous transmission of CSI and an SR.

Additionally, the UE may support simultaneous transmission of an SR and an HARQ-ACK as follows according to a combination of a PUCCH format configured for an SR (only) PUCCH resource (hereinafter, referred to as an SR PUCCH) and an HARQ-ACK (only) PUCCH resource (hereinafter, referred to as an A/N PUCCH).

(A) SR PUCCH=PUCCH format 0

(A-1) A/N PUCCH=PUCCH format 0

Opt. 1: Positive SR+HARQ-ACK information is transmitted in a PUCCH resource implicitly determined based on the A/N PUCCH resource. The PUCCH resource (carrying Positive SR+HARQ-ACK) may be a PUCCH format 0 resource derived by applying a CS offset (or a PRB offset) to the A/N PUCCH resource. Thus, the UE may represent Positive SR by selecting and transmitting the resource (other than the A/N PUCCH resource), and may additionally transmit the HARQ-ACK in the resource by sequence selection.

(A-2) A/N PUCCH=PUCCH format 1

Opt. 1: Positive SR+HARQ-ACK information is transmitted in a PUCCH resource implicitly determined based on the A/N PUCCH resource. The PUCCH resource (carrying Positive SR+HARQ-ACK) may be a PUCCH format 1 resource derived by applying a CS offset (an OCC offset or a PRB offset) to the A/N PUCCH resource. Thus, the UE may represent Positive SR by selecting and transmitting the resource (other than the A/N PUCCH resource), and may additionally transmit the HARQ-ACK in the resource by sequence modulation.

Opt. 2: Positive SR+HARQ-ACK information is transmitted in the SR PUCCH resource (or a PUCCH resource implicitly determined based on the SR PUCCH resource). The PUCCH resource (carrying Positive SR+HARQ-ACK) may be a PUCCH format 0 resource configured as the SR PUCCH resource (or derived by applying a CS offset (or a PRB offset) to the SR PUCCH resource). Thus, the UE may represent Positive SR by selecting and transmitting the resource (other than the A/N PUCCH resource), and may additionally transmit the HARQ-ACK in the resource by sequence selection.

Opt. 3: The SR transmission is dropped, and HARQ-ACK information is transmitted in the A/N PUCCH resource.

Opt. 4: The HARQ-ACK transmission is dropped, and SR information is transmitted in the SR PUCCH resource.

Opt. 5: HARQ-ACK information is transmitted in the A/N PUCCH resource, and SR information is transmitted by using CS offset (or phase difference) information between DM-RS symbols within the A/N PUCCH. The phase difference between DM-RS symbols in the A/N PUCCH may be applied by multiplying modulation symbols (e.g., differential phase shift keying (DPSK) symbols) corresponding to the SR information according to a differential encoding scheme.

(A-3) A/N PUCCH=PUCCH format 2 or 3 or 4

Opt. 1: SR information is represented in an explicit bit(s) and included in UCI payload. Then, Positive SR+HARQ-ACK information is transmitted in the A/N PUCCH resource. If the base station configures a plurality of SR processes (or configurations) for the UE, the SR information may include information indicating the presence or absence of an SR, and an SR process (or configuration) for which an SR exists.

(B) SR PUCCH=PUCCH format 1

(B-1) A/N PUCCH=PUCCH format 0

Opt. 1: Positive SR+HARQ-ACK information is transmitted in a PUCCH resource implicitly determined based on the A/N PUCCH resource. The PUCCH resource (carrying Positive SR+HARQ-ACK) may be a PUCCH format 0 resource derived by applying a CS offset (or a PRB offset) to the A/N PUCCH resource. Thus, the UE may represent Positive SR by selecting and transmitting the resource (other than the A/N PUCCH resource), and may additionally transmit the HARQ-ACK in the resource by sequence selection.

Opt. 2: Positive SR+HARQ-ACK information is transmitted in the SR PUCCH resource (or a PUCCH resource implicitly determined based on the SR PUCCH resource). The PUCCH resource (carrying Positive SR+HARQ-ACK) may be a PUCCH format 1 resource configured as the SR PUCCH resource (or derived by applying a CS offset (an OCC offset or a PRB offset) to the SR PUCCH resource). Thus, the UE may represent Positive SR by selecting and transmitting the resource (other than the A/N PUCCH resource), and may additionally transmit the HARQ-ACK in the resource by sequence modulation.

Opt. 3: The SR transmission is dropped, and HARQ-ACK information is transmitted in the A/N PUCCH resource.

Opt. 4: The HARQ-ACK transmission is dropped, and SR information is transmitted in the SR PUCCH resource.

(B-2) A/N PUCCH=PUCCH format 1

Opt. 1: Positive SR+HARQ-ACK information is transmitted in the SR PUCCH resource (or a PUCCH resource implicitly determined based on the SR PUCCH resource). The PUCCH resource (carrying Positive SR+HARQ-ACK) may be a PUCCH format 0 resource configured as the SR PUCCH resource (or derived by applying a CS offset (or a PRB offset) to the SR PUCCH resource). Thus, the UE may represent Positive SR by selecting and transmitting the resource (other than the A/N PUCCH resource), and may additionally transmit the HARQ-ACK in the resource by sequence selection.

(B-3) A/N PUCCH=PUCCH format 2 or 3 or 4

Opt. 1: SR information is represented in an explicit bit(s) and included in UCI payload. Then, Positive SR+HARQ-ACK information is transmitted in the A/N PUCCH resource. If the base station configures a plurality of SR processes (or configurations) for the UE, the SR information may include information indicating the presence or absence of an SR, and an SR process (or configuration) for which an SR exists.

In the above configurations, the UE may transmit SR only on the SR PUCCH, and HARQ-ACK only or Negative SR+HARQ-ACK on the A/N PUCCH.

Further in the present invention, sequence selection may refer to representing a UCI state by selecting one of a plurality of sequences and transmitting the selected sequence by a UE.

Further in the present invention, sequence modulation may refer to representing a UCI state by multiplying a modulation (e.g., QPSK) symbol by a specific sequence by a UE.

Further in the present invention, an SR process (or configuration) may refer to a time-domain/frequency-domain/code-domain resource configuration for SR transmission (for a specific service). A plurality of SR processes (or configurations) may refer to SR information for different services, respectively.

Further in the present invention, deriving another PUCCH resource by applying a CS offset, an OCC offset, or a PRB offset to a specific PUCCH resource may amount to deriving a PUCCH resource identical to the specific PUCCH resource, except that the former has a different CS index, OCC index, or PRB index from that the latter by a predetermined offset.

Additionally, when the base station configures a plurality of PUCCH resource sets for the UE (by (UE-specific) higher-layer signaling), and the UE selects one PUCCH resource set (for use in UCI transmission) from among the plurality of PUCCH resource sets according to the size of UCI payload, SR information may be excluded from the UCI payload based on which the PUCCH resource set is selected. For example, the UE may select a PUCCH resource set on the basis of the total UCI payload size of an HARQ-ACK and CSI.

Herein, the UE may select a specific PUCCH resource from the selected PUCCH resource set on the basis of a specific indicator (e.g., an ACK/NACK resource indication field) in additionally received DCI (and information implicitly indicated by the DCI (e.g., a control channel element (CCE) index, a PDCCH candidate index, or the like). For example, in the case where an A/N PUCCH resource is in PUCCH format 0 (or PUCCH format 1), and transmission of Positive SR+HARQ-ACK (up to 2 bits) in a PUCCH resource (of the same PUCCH format) implicitly determined from the A/N PUCCH resource is supported, if SR information is included in the UCI payload based on which the PUCCH resource set has been selected, the UE should determine Positive SR+2-bit HARQ-ACK to be UCI payload of 3 or more bits. Accordingly, the UE may select only a PUCCH resource set configured in PUCCH format 2/3/4, and thus may not transmit Positive SR+2-bit HARQ-ACK in PUCCH format 0 (or PUCCH format 1) implicitly determined from the A/N PUCCH resource.

Or if there is only a 2-bit HARQ-ACK when the UE selects a PUCCH resource set, the UE may exclude the SR information from the PUCCH resource set selection process (i.e., a PUCCH resource set corresponding to 2 bits is selected), and otherwise, the UE may select a PUCCH resource set on the basis of the size of UCI payload including all of an HARQ-ACK, an SR, and CSI.

Additionally, in order to support simultaneous transmission of an N-bit (1-bit or 2-bit) HARQ-ACK and an SR, the base station may configure a (single) (short) PUCCH resource (hereinafter, referred to as an SR PUCCH) of format 0, including M (=2 or 4) sequences (for a specific SR process). For SR only, the UE may select one of the M sequences and transmit the selected sequence by on/off keying (OOK), while for HARQ-ACK+Positive SR, the UE may represent a UCI state by using $2^N$ ones out of the M sequences in the sequence selection scheme (i.e., a scheme in which a specific UCI state is transmitted by selecting/transmitting one of K sequences). Herein, the UE may additionally support the following operations.

<A> Method of changing a sequence representing an SR only state on an SR PUCCH on a slot basis and/or a symbol basis (according to a specific pattern) (i.e., {+, DTX}-to-sequence mapping is changed in each slot and/or each symbol (according to a specific pattern)) (e.g., randomization). Herein, '+' represents Positive SR.

<B> Method of hopping the frequency resources of an SR PUCCH on a slot basis and/or a symbol basis (according to a specific pattern) (e.g., randomization)

- The frequency resources of the (short) PUCCH may be hopped based on a specific frequency resource granularity (e.g., X (=8 or 16) PRBs). For example, a frequency offset of a multiple of X (=8 or 16) PRBs, which is changed on a slot basis and/or a symbol basis, may additionally be applied to a reference frequency resource. X may be preset between the base station and the UE, or configured by higher-layer signaling (e.g., RRC signaling) of the base station.
- The slot-wise and/or symbol-wise frequency resource hopping may be applied only to a (short) PUCCH resource configured semi-statically (by higher-layer signaling such as RRC signaling), not to a (short) PUCCH resource which may be indicated dynamically (by higher-layer signaling such as RRC signaling, and DCI).

Unless otherwise conflicting with each other, the $16^{th}$ SR transmission method and other proposed methods of the present invention may be applied in combination.

3.17. $17^{th}$ SR Transmission Method

When the base station configures a plurality of SR processes (or configurations) (in which SR transmissions may take place at the same time point) for the UE, the UE may support simultaneous transmission of an SR and an HARQ-ACK in one or more of the following methods.

(1) Opt. 1: Method of deriving a plurality of PUCCH resources corresponding to the plurality of SR processes (or configurations) from an A/N PUCCH resource according to an implicit rule, and transmitting Positive SR+HARQ-ACK information in a PUCCH resource (derived from the A/N PUCCH resource) corresponding to a single SR process (or configuration) by a UE.

The UE may represent Positive SR for the specific SR process (or configuration) by selecting one of the plurality of PUCCH resources and transmitting the selected PUCCH resource, and may additionally transmit the HARQ-ACK in the resource.

The implicit rule may be a scheme of deriving a plurality of PUCCH resources corresponding to a plurality of SR processes (or configurations) by applying CS offsets, OCC offsets, or PRB offsets to an A/N PUCCH resource.

(2) Opt. 2: Method of configuring an SR PUCCH for each of the plurality of SR processes (or configurations) by the base station, and transmitting Positive SR+HARQ-ACK in an SR PUCCH resource corresponding to a single SR process (or configuration) by the UE.

The UE may represent Positive SR for the specific SR process (or configuration) by selecting a specific SR PUCCH resource and transmitting the selected SR PUCCH resource, and may additionally transmit the HARQ-ACK in the resource.

The above operation may be applied only when the SR PUCCH resource is in a specific format (e.g., PUCCH format 1).

(3) Opt. 3: Method of configuring multi-bit SR information for the plurality of SR processes (or configurations), and transmitting multi-bit SR+HARQ-ACK information in an A/N PUCCH resource by including the multi-bit SR information in UCI payload during HARQ-ACK transmission.

- The multi-bit SR may include Positive/Negative SR and information indicating an SR process (or configuration) for which an SR exists, and/or Positive/Negative SR information per SR process (or configuration) for all or some of the plurality of SR processes (or configurations).
- The base station may configure the UE to report whether at least one SR process (or configuration) has Positive SR (at the same time point) or all of the plurality of SR processes (or configurations) have Negative SR, or to report the multi-bit SR information for the plurality of SR processes (or configurations), by (UE-specific) higher-layer signaling (e.g., RRC signaling).
- In the case where the base station configures a plurality of PUCCH resource sets for the UE (by (UE-specific) higher-layer signaling), and the UE selects one of the PUCCH resource sets according to a UCI payload size, (when the base station configures multi-bit SR transmission,) multi-bit SR information may be included in UCI payload based on which the PUCCH resource set is selected.

In the present invention, a PUCCH resource indicated for HARQ-ACK (only) transmission may be referred to as an A/N PUCCH resource, and a PUCCH resource indicated for SR (only) transmission may be referred to as an SR PUCCH resource.

Further in the present invention, an SR PUCCH and an A/N PUCCH may refer to a PUCCH resource configured for SR only transmission, and a PUCCH resource for HARQ-ACK only transmission, respectively. The UE may transmit SR only on the SR PUCCH, and HARQ-ACK only or Negative SR+HARQ-ACK on the A/N PUCCH.

Further in the present invention, an SR process (or configuration) may refer to a time-domain/frequency-domain/code-domain resource configuration for SR transmission (for a specific service). A plurality of SR processes (or configurations) may refer to SR information for different services.

Further, deriving another PUCCH resource by applying a CS offset, an OCC offset, or a PRB offset to a specific PUCCH resource may amount to deriving a PUCCH resource identical to the specific PUCCH resource, except that the former has a different CS index, OCC index, or PRB index from that the latter by a predetermined offset.

More specifically, in the case where the UE simultaneously transmits an SR and an HARQ-ACK, if a PUCCH resource configured for SR only is in PUCCH format 0, the UE may transmit Positive SR+HARQ-ACK information in a PUCCH resource derived from an A/N PUCCH resource, and if the PUCCH resource configured for SR only is in PUCCH format 1, the UE may transmit Positive SR+HARQ-ACK information in an SR PUCCH resource.

When the base station configures a plurality of SR processes (or configurations), the UE may additionally report an SR process (or configuration) having Positive SR as well as Positive SR information to the base station, to thereby reduce UL scheduling delay of the base station. For example, if the UE reports only Positive/Negative SR information to the base station, without additional information about an SR process having Positive SR, the base station may be aware of a service type corresponding to the Positive SR only after receiving a BSR after SR transmission. As a result, UL scheduling may be delayed.

Accordingly, the UE according to the present invention may additionally indicate an SR process (or configuration) having Positive SR as well as Positive/Negative SR information.

Specifically, in the case where the UE transmits Positive SR+HARQ-ACK information in a PUCCH resource derived from an A/N PUCCH resource, the UE may derive a plurality of PUCCH resources corresponding to a plurality of SR processes (or configurations) by applying CS offsets, OCC offsets, or PRB offsets to the A/N PUCCH, and transmit Positive SR+HARQ-ACK information in a specific one of the plurality of PUCCH resources.

Or when the UE transmits Positive SR+HARQ-ACK information in the SR PUCCH resource, an SR PUCCH resource may be preset for each of the plurality of SR processes (or configurations). Then, the UE may transmit Positive SR+HARQ-ACK information in a specific one of the plurality of PUCCH resources. Herein, the UE may represent Positive SR for a specific SR process (or configuration) by selecting a specific one of the plurality of PUCCH resources (corresponding to the plurality of SR processes (or configurations)), and additionally transmit an HARQ-ACK in the selected resource.

In another method, if the base station configures a plurality of SR processes (or configurations) for the UE, the UE may transmit multi-bit SR+HARQ-ACK in an A/N PUCCH resource by adding, to UCI payload, multi-bit SR information including Positive/Negative SR and information about an SR process (or configuration) for which the SR exists, or Positive/Negative SR information per SR process (or configuration) for all or some of the plurality of SR processes (or configurations).

Unless otherwise conflicting with each other, the $17^{th}$ SR transmission method and other proposed methods of the present invention may be applied in combination.

3.18. $18^{th}$ SR Transmission Method

When PUCCHs of different UCI types (e.g., A/N PUCCH, SR PUCCH, and CSI PUCCH) to be transmitted by the UE overlap with each other only in some symbols on the time axis (e.g., partial overlapping), the UE may transmit the PUCCHs (in a single PUCCH resource) through UCI multiplexing to the base station.

In the present invention, a PUCCH resource configured for transmission of a UCI type (only) having a highest priority (hereinafter, referred to UCI A) among UCI types is referred to as PUCCH A, and a PUCCH resource selected on the assumption that the UE performs UCI multiplexing for a specific UCI type set S is referred to as PUCCH B. In an initial state, the UCI type set S includes all UCI types, and PUCCH B may be a PUCCH resource on the assumption of UCI multiplexing of all UCI types.

(1) PUCCH A=PUCCH B

For the UCI type(s) of the set S, the UE performs UCI multiplexing for UCI types for which UL transmission is indicated at or before a time point previous to a specific time corresponding to a (minimum) UL timing (or UE processing time) for a corresponding UCI type (or PUCCH) with respect to the transmission time of PUCCH A (included in the set S), and excludes other UCI types from UCI multiplexing (excluded from the set S).

For example, if PUCCH B is changed, the UE repeatedly performs the $18^{th}$ SR transmission method for the changed set S and PUCCH B.

In another example, if PUCCH B is not changed, the UE transmits UCI multiplexing information about the UCI type(s) of the set S on PUCCH B.

(2) PUCCH A≠PUCCH B (2-1) In the case where UL transmission is indicated for UCI A (or PUCCH A) at and before a time point previous to a specific time corresponding to a (minimum) UL timing (or UE processing time) for UCI A (or PUCCH A) with respect to the transmission time of PUCCH B, For the UCI type(s) of the set S, the UE performs UCI multiplexing for UCI types (or PUCCHs) for which UL transmission is indicated at or before a time point previous to a specific time corresponding to a (minimum) UL timing (or UE processing time) for a corresponding UCI type (or PUCCH) with respect to the transmission time of PUCCH B (included in the set S), and excludes other UCI types from UCI multiplexing (excluded from the set S).

For example, if PUCCH B is changed, the UE repeatedly performs the $18^{th}$ SR transmission method for the changed set S and PUCCH B.

In another example, if PUCCH B is not changed, the UE transmits UCI multiplexing information about the UCI type(s) of the set S on PUCCH B.

(2-2) In the case where UL transmission is indicated for UCI A (or PUCCH A) at and before a time point previous to a specific time corresponding to a (minimum) UL timing (or UE processing time) for UCI A (or PUCCH A) with respect to the transmission time of PUCCH B, the UE may detect a new set S and new PUCCH B that satisfy the following condition.

Condition: UL transmission is indicated for UCI A (or PUCCH A) at and before a time point previous to a specific time corresponding to a (minimum) UL timing (or UE processing time) for UCI A (or PUCCH A) with respect to the transmission time of PUCCH B.

A minimum set S of UCI type(s) subjected to UCI multiplexing, which satisfies the above condition, is UCI A only, and PUCCH B=PUCCH A.

The UE may perform the detection process, sequentially excluding a UCI type on the basis of the priorities of the UCI types.

Then, the UE may apply (2-1) of the $18^{th}$ SR transmission method on the basis of the new set S and PUCCH B.

In the present invention, an SR PUCCH, an A/N PUCCH, and a CSI PUCCH refer to resources configured for SR only transmission, HARQ-ACK only transmission, and CSI only transmission, respectively.

Further in the present invention, it is assumed that UCI types are prioritized in the order of HARQ-ACK>CSI>SR, a UCI type earlier in PUCCH transmission time has a higher priority, or a UCI type has a higher priority if UL transmission is indicated later for the UCI type.

Further, when a PUCCH B resource is determined, the PUCCH B resource may be determined only depending on a combination of UCI types to be UCI-multiplexed, with no regard to UL timing information.

In a specific example, if the SR PUCCH overlaps with the A/N PUCCH only in some symbols on the time axis, the UE may operate as follows, assuming that the SR PUCCH and the A/N PUCCH are prioritized in the order of A/N PUCCH> SR PUCCH (or HARQ-ACK> SR).

1) When Positive SR is generated within a predetermined previous time period corresponding to a (minimum) UL timing (or UE processing time) with respect to an A/N PUCCH transmission time, the UE may transmit only an HARQ-ACK, dropping the SR transmission.

2) When Positive SR is generated within the previous predetermined time period corresponding to the (minimum) UL timing (or UE processing time) with respect to the A/N PUCCH transmission time, the UE transmits UCI-multiplexed information of the SR and the HARQ-ACK. Herein, the UE may transmit the UCI-multiplexed information of the SR and the HARQ-ACK (e.g., Positive SR+HARQ-ACK) in the afore-described $16^{th}$ SR transmission method.

According to this method, if it is indicated to the UE that a plurality of PUCCH transmissions for a plurality of UCI types overlap with each other at least in some symbols, and the UE is capable of transmitting the whole or part of UCI for the plurality of UCI types through UCI multiplexing, transmission of a highest-priority UCI type (UCI A) among the plurality of UCI types may always be guaranteed, while UCI multiplexing between UCI types prepared in terms of UL timing (or UE processing time) may be supported as much as possible.

Additionally, if a plurality of PUCCHs having different starting symbols and/or different transmission durations overlap partially with each other in some time resources (Case 1), and if a PUCCH and a PUSCH having different starting symbols and/or different transmission durations overlap partially with each other in some time resources (Case 2), the UE may operate as follows in each case. Herein, at least one PUCCH may be a PUCCH for HARQ-ACK transmission in Case 1 and Case 2.

<1> Case 1

<1-1> In the case of a sufficient UE processing time (or UL timing) for HARQ-ACK transmission, A plurality of pieces of UCI configured to be transmitted in the plurality of PUCCH resources are transmitted (through UCI multiplexing) in a single PUCCH resource selected (from among the plurality of PUCCH resources) in a predetermined scheme (according to a combination of the UCI types of the plurality of pieces of UCI).

<1-2> In the case of an insufficient UE processing time (or UL timing) for HARQ-ACK transmission, Only a single PUCCH having a highest priority among the plurality of PUCCH resources is transmitted, while transmissions of the other PUCCHs are dropped.

<2> Case 2

<2-1> In the case of a sufficient UE processing time (or UL timing) for HARQ-ACK transmission, UCI (e.g., HARQ-ACK) configured to be transmitted on the PUCCH is transmitted piggybacked to the PUSCH.

<2-2> In the case of an insufficient UE processing time (or UL timing) for HARQ-ACK transmission, A PUCCH is transmitted, while a PUSCH transmission is dropped.

Or, the UE may rate-match or puncture a PUCCH or a PUSCH in some symbols overlapped between PUCCHs or between a PUSCH and a PUCCH.

Additionally, when PUCCHs of different UCI types (e.g., A/N PUCCH, SR PUCCH, and CSI PUCCH) to be transmitted by the UE overlap with each other only in some symbols on the time axis (e.g., partial overlapping), the UE may transmit the PUCCHs (in a single PUCCH resource) through UCI multiplexing to the base station.

In the present invention, an SR PUCCH, an A/N PUCCH, and a CSI PUCCH refer to PUCCH resources configured and/or indicated for SR (only) transmission, HARQ-ACK (only) transmission, and CSI (only) transmission, respectively.

Further in the present invention PF0, PF1, PF2, PF3, and PF4 represent PUCCH format 0, PUCCH format 1, PUCCH format 2, PUCCH format 3, and PUCCH format 4, respectively.

Further in the present invention, PF X/Y represents PF X or PF Y.

Further in the present invention, when it is said that Positive SR is generated, this may imply that UL data to be transmitted by the UE is generated or the UE determines to request UL scheduling.

1> Case 1: The A/N PUCCH overlaps with the SR PUCCH 1-1> If the A/N PUCCH is in PF2/3/4 and the SR PUCCH is in PF0/1, UCI including an HARQ-ACK bit(s) and an explicit SR bit(s) is transmitted on the A/N PUCCH.

The explicit SR bit(s) may include the following information with respect to an A/N PUCCH transmission (starting) time T.

Upon generation of Positive SR at or before a time $T-T_0$, the explicit SR bit(s) indicates Positive SR information.

Upon generation of Positive SR (until before the time T) after the time $T-T_0$, the explicit SR bit(s) indicates Negative SR information.

If Positive SR is not generated until before the time T, the explicit SR bit(s) indicates Negative SR information.

1-2> The A/N PUCCH is in PF0, and the SR PUCCH is in PF0.

Based on the A/N PUCCH transmission (starting) time T

Upon generation of Positive SR at and before the time $T-T_0$, the UE transmits HARQ-ACK information in a PF0 resource (obtained from the A/N PUCCH). The PF0 resource may be acquired by applying a PRB index offset and/or a CS index offset and/or an OCC index offset to the A/N PUCCH resource (e.g., a PF0 resource).

Upon generation of Positive SR after the time $T-T_0$, the UE may transmit the HARQ-ACK (only) on the A/N PUCCH, while dropping the SR transmission.

If Positive SR is not generated until before the time T, the UE transmits the HARQ-ACK (only) information on the A/N PUCCH.

1-3> The A/N PUCCH is in PF0, and the SR PUCCH is in PF1.

1-3-1> Opt. 1: Based on the A/N PUCCH transmission (starting) time T

Upon generation of Positive SR at and before the time $T-T_0$, the UE transmits the HARQ-ACK information in a PF0 resource (obtained from the A/N PUCCH). The PF0 resource may be acquired by applying a PRB index offset and/or a CS index offset and/or an OCC index offset to the A/N PUCCH resource (e.g., a PF0 resource).

Upon generation of Positive SR after the time T-T$_0$, the UE may transmit the HARQ-ACK (only) on the A/N PUCCH, while dropping the SR transmission.

If Positive SR is not generated until before the time T, the UE transmits the HARQ-ACK (only) information on the A/N PUCCH.

1-3-2> Opt. 2: Based on the SR PUCCH transmission (starting) time T

In the case where HARQ-ACK transmission is indicated at and before the time T-T$_0$.

For HARQ-ACK+Negative SR (or HARQ-ACK only), the UE transmits the HARQ-ACK information on the A/N PUCCH.

For HARQ-ACK+Positive SR, the UE transmits the HARQ-ACK information on the SR PUCCH. The HARQ-ACK information may be transmitted by multiplying (all or some) UCI sequence(s) in the SR PUCCH by a specific QPSK modulation symbol.

If HARQ-ACK transmission is indicated after the time T-T$_0$, the UE transmits the HARQ-ACK (only) on the A/N PUCCH, while dropping the SR transmission.

1-4> In the case where the A/N PUCCH is in PF1 and the SR PUCCH is in PF0, based on the A/N PUCCH transmission (starting) time T, 1-4-1> Upon generation of Positive SR at and before the time T-T$_0$, Opt. 1: The HARQ-ACK (only) is transmitted on the A/N PUCCH, while the SR transmission is dropped.

Opt. 2: The HARQ-ACK information is transmitted in a PF1 resource. The PF1 resource may be acquired by applying a PRB index offset and/or a CS index offset and/or an OCC index offset to the A/N PUCCH (e.g., a PF1 resource).

Opt. 3: The HARQ-ACK information is transmitted on the A/N PUCCH, and the SR information is transmitted by changing a specific sequence in the A/N PUCCH or a DM-RS sequence, or multiplying a DM-RS by a DPSK modulation symbol. The UE may change the UCI sequence or the DM-RS sequence by changing a base sequence or a CS.

1-4-2> Upon generation of Positive SR after the time T-T$_0$, the UE may transmit the HARQ-ACK (only) on the A/N PUCCH, while dropping the SR transmission.

1-4-3> If Positive SR is not generated until before the time T, the UE transmits the HARQ-ACK (only) information on the A/N PUCCH.

1-5> The A/N PUCCH is in PF1, and the SR PUCCH is in PF1.

1-5-1> Based on the A/N PUCCH transmission (starting) time T, 1-5-1-1> Upon generation of Positive SR at and before the time T-T$_0$, Opt. 1: The HARQ-ACK (only) is transmitted on the A/N PUCCH, while the SR transmission is dropped.

Opt. 2: The HARQ-ACK information is transmitted in a PF1 resource. The PF1 resource may be acquired by applying a PRB index offset and/or a CS index offset and/or an OCC index offset to the A/N PUCCH (e.g., a PF1 resource).

Opt. 3: The HARQ-ACK information is transmitted on the A/N PUCCH, and the SR information is transmitted by changing a specific sequence in the A/N PUCCH or a DM-RS sequence, or multiplying a DM-RS by a DPSK modulation symbol. The UE may change the UCI sequence or the DM-RS sequence by changing a base sequence or a CS.

Opt. 4: The HARQ-ACK information is transmitted on the SR PUCCH. Herein, the HARQ-ACK information may be transmitted by multiplying a UCI sequence in the SR PUCCH carrying the HARQ-ACK information by a specific QPSK modulation symbol. Further, the operation of Opt. 4 may be applied only when the transmission time of the SR PUCCH is later than or identical to that of the A/N PUCCH (or an SR PUCCH transmission duration is included in an A/N PUCCH transmission duration). Otherwise, the UE may transmit the HARQ-ACK (only) information on the A/N PUCCH, while dropping the SR transmission.

1-5-1-2> Upon generation of Positive SR after the time T-T$_0$, the UE may transmit the HARQ-ACK (only) on the A/N PUCCH, while dropping the SR transmission.

1-5-1-3> If Positive SR is not generated until before the time T, the UE transmits the HARQ-ACK (only) information on the A/N PUCCH.

1-5-2> Opt. 2: Based on the SR PUCCH transmission (starting) time T, 1-5-2-1> If HARQ-ACK transmission is indicated at and before the time T-T$_0$, 1-5-2-1-1> For HARQ-ACK+Negative SR (or HARQ-ACK only), the UE transmits the HARQ-ACK information on the A/N PUCCH.

1-5-2-1-2> For HARQ-ACK+Positive SR, the UE transmits the HARQ-ACK information on the SR PUCCH. Herein, the HARQ-ACK information may be transmitted by multiplying (all or some) UCI sequence(s) in the SR PUCCH carrying the HARQ-ACK information by a specific QPSK modulation symbol.

Additionally, if the (transmission) ending time of the SR PUCCH is later than the (transmission) ending time of the A/N PUCCH by a specific time Td, the UE may transmit the HARQ-ACK (only) on the A/N PUCCH, while dropping the SR transmission. The time Td may be preset or configured by the base station.

1-5-2-2> If HARQ-ACK transmission is indicated after the time T-T$_0$, the UE may transmit the HARQ-ACK (only) on the A/N PUCCH, while dropping the SR transmission.

2> Case 2: In the case where the A/N PUCCH overlaps with the CSI PUCCH, 2-1> If the A/N PUCCH is in PF0/1, and the CSI PUCCH is in PF2/3/4, The UE transmits the HARQ-ACK (only) on the A/N PUCCH, while dropping the CSI transmission.

2-2> If the A/N PUCCH is in PF2/3/4, and the CSI PUCCH is in PF2/3/4,

The UE transmits UCI including an HARQ-ACK bit(s) and a CSI bit(s) on the A/N PUCCH. Let the transmission (starting) time of the A/N PUCCH be denoted by T$_1$ and the transmission (starting) time of the CSI PUCCH be denoted by T$_2$. Then, a (time-domain) CSI reference resource for the CSI may be an earliest (valid) DL slot existing at and before the time T$_1$-T$_0$ and at and before a time T$_2$-T$_{CQI}$. Further, a (valid) DL slot may refer to a slot configured as a DL slot (for the UE) and/or a slot that is not included in a measurement gap, and/or a slot included in a DL bandwidth part (BWP) in which CSI reporting is performed. Further, T$_{CQI}$ may be a preset value between the base station and the UE, or a value that the base station configures for the UE.

If the A/N PUCCH carries HARQ-ACK information for a semi-persistent scheduling (SRS) PDSCH, the UE may perform UCI multiplexing as follows.

Based on the CSI PUCCH transmission time T,
If HARQ-ACK transmission is indicated at and before the time $T-T_0$, the UE transmits UCI including both of an HARQ-ACK bit(s) and a CSI bit(s) on the CSI PUCCH. In the presence of a plurality of CSI PUCCH resources, a (single) CSI PUCCH resource may be selected to transmit the HARQ-ACK bit(s) and the CSI bit(s).
If HARQ-ACK transmission is indicated after the time $T-T_0$, the UE transmits the HARQ-ACK (only) on the A/N PUCCH, while dropping the CSI transmission.

3> Case 3: In the case where the A/N PUCCH, the CSI PUCCH, and the SR PUCCH overlap with each other, 3-1> If the A/N PUCCH is in PF0/1, the UE drops the CSI transmission, and performs the operation of Case 1 according to a combination of PUCCH resources (from the perspective of PUCCH formats) configured/indicated for the HARQ-ACK and the SR.

3-2> If the A/N PUCCH is in PF2/3/4, and the CSI PUCCH is in PF2/3/4, 3-2-1> The UE may transmit UCI including an HARQ-ACK bit(s), a CSI bit(s), and an explicit SR bit(s) on the A/N PUCCH.

Let the transmission (starting) time of the A/N PUCCH be denoted by $T_1$ and the transmission (starting) time of the CSI PUCCH be denoted by $T_2$. Then, a (time-domain) CSI reference resource for the CSI may be an earliest (valid) DL slot existing at and before the time $T_1-T_0$ and at and before a time $T_2-T_{CQI}$. Further, a (valid) DL slot may refer to a slot configured as a DL slot (for the UE) and/or a slot that is not included in a measurement gap and/or a slot included in a DL BWP in which CSI reporting is performed. Further, $T_{CQI}$ may be a preset value between the base station and the UE or a value that the base station configures for the UE.

Further, the explicit SR bit(s) may include the following information with respect to the A/N PUCCH transmission (starting) time $T_1$.

Upon generation of positive ST at and before the time $T-T_0$, the explicit SR bit(s) indicates Positive SR information.

Upon generation of positive ST (until before the time T) after the time $T-T_0$, the explicit SR bit(s) indicates Negative SR information.

If Positive SR is not generated until before the time T, the explicit SR bit(s) indicates Negative SR information.

3-2-2> If the A/N PUCCH includes HARQ-ACK information for an SPS PDSCH, the UE may perform UCI multiplexing as follows.

Based on the CSI PUCCH transmission time T,
If HARQ-ACK transmission is indicated at and before the time $T-T_0$, the UE transmits UCI including an HARQ-ACK bit(s), a CSI bit(s), and an explicit SR bit(s) on the CSI PUCCH. In the presence of a plurality of CSI PUCCH resources, a (single) CSI-PUCCH resource may be selected to transmit the HARQ-ACK bit(s) and the CSI bit(s).
If HARQ-ACK transmission is indicated after the time $T-T_0$, the UE drops the CSI transmission, and then follows a UCI multiplexing rule between an HARQ-ACK and an SR (or performs the afore-described operation of Case 1).

In the above configurations, the time-axis unit of T and/or $T_0$ may be a slot and/or an OFDM symbol. Particularly, To may be a time corresponding to a (minimum) UL timing or UE processing time for HARQ-ACK transmission, or a time corresponding to a (minimum) UL timing or UE processing time required for the UE to change a PUCCH resource and transmit the changed PUCCH resource. To may be predetermined (according to a UE capability or the like) or configured by the base station.

Further, the A/N PUCCH which has not been made clear in the foregoing description may be a PUCCH resource carrying HARQ-ACK information for a PDSCH scheduled by a DL assignment (or DL scheduling DCI).

Further, the UE may autonomously transmit HARQ-ACK only on the A/N PUCCH, or transmit an HARQ-ACK and an SR in a preset PUCCH resource through UCI multiplexing (depending on implementation of the UE) in Case 1.

Unless otherwise conflicting with each other, the $18^{th}$ SR transmission method and other proposed methods of the present invention may be applied in combination.

3.19. $19^{th}$ SR Transmission Method

When the base station is capable of configuring a PUCCH transmission period (in OFDM symbols) for a PUCCH resource for SR transmission (referred to as an SR PUCCH) and/or an (SR) PUCCH transmission starting (OFDM) symbol (index) in a slot and/or a PUCCH transmission duration (in OFDM symbols) for the UE (by (UE-specific) higher-layer signaling (e.g., RRC signaling)), the UE may derive and apply a (relative) PUCCH transmission starting (OFDM) symbol (index) within the PUCCH transmission period (in OFDM symbols) (for the SR transmission) as follows.

$$N_0 = N_{offset} \bmod (N_{period} - N_{duration}) \qquad \text{[Equation 1]}$$

In [Equation 1], $N_0$, $N_{period}$, $N_{offset}$, and $N_{duration}$ represent the (relative) PUCCH transmission starting (OFDM) symbol (index) within the PUCCH transmission period (in OFDM symbols) (for the SR transmission), the PUCCH transmission period (in OFDM symbols), the (SR) PUCCH transmission starting (OFDM) symbol (index) in a slot, and the PUCCH transmission duration (in OFDM symbols), respectively.

Further, a slot is a basic scheduling unit including a plurality of (contiguous) OFDM symbols. For example, one slot may include 14 OFDM symbols.

In the present invention, the UE may expect the base station not to set a shorter PUCCH transmission period than a PUCCH transmission duration for the PUCCH resource for SR transmission (i.e., $N_{period} \geq N_{duration}$).

In the present invention, the (SR) PUCCH transmission starting (OFDM) symbol (index) in a slot (configured for SR transmission) may be determined by the transmission starting (OFDM) symbol (index) of a PUCCH resource configured for the UE by the base station and/or a separate time offset (e.g., an SR offset).

Further in the present invention, the (relative) PUCCH transmission starting (OFDM) symbol (index) within the PUCCH transmission period (in OFDM symbols) for the SR PUCCH may refer to an (OFDM) symbol (index) locally indexed within the PUCCH transmission period.

More specifically, 14 (contiguous) OFDM symbols may form one slot, and may be indexed 0, 1, 2, . . . , 13 in the NR system according to an embodiment of the present invention. For the UE, the base station may set the PUCCH transmission period for SR transmission to 7 OFDM symbols ($N_{period}=7$), the PUCCH transmission duration to 2 OFDM symbols ($N_{duration}=2$), and the PUCCH transmission starting symbol (index) in a slot to 6 ($N_{offset}=6$).

If the UE determines the PUCCH starting symbol (index) $N_0$ (for SR transmission) within the PUCCH transmission period simply by a modulo operation of the transmission period (e.g., $N_0=6 \bmod 7=6$), the first symbol of the SR PUCCH having a length of 2 symbols may be transmitted in OFDM symbol (index) 13 in a $k^{th}$ slot, and the second symbol may be transmitted in OFDM symbol (index) 0 in a $(k+1)^{th}$ slot. This operation of transmitting an SR across 2 slots by the UE requires that the base station ensures UL transmission in at least 2 slots, which is not favorable due to the resulting restriction on scheduling flexibility of the base station.

Accordingly, the present invention proposes a method of, when a PUCCH stating symbol (index) $N_0$ (for SR transmission) within a PUCCH transmission period is calculated, applying a modulo operation of a value calculated by subtracting a PUCCH transmission duration from the PUCCH transmission period (e.g., $N_0$=6 mod (7−2)=5), and thus restricting SR transmission to within a single slot.

Unless otherwise conflicting with each other, the $19^{th}$ SR transmission method and other proposed methods of the present invention may be applied in combination.

3.20. $20^{th}$ SR Transmission Method

When a PUCCH resource for HARQ-ACK transmission (hereinafter, referred to as an A/N PUCCH) overlaps fully or partially with a PUCCH resource for SR transmission (hereinafter, referred to as an SR PUCCH) on the time axis, the UE may perform UCI transmission on the basis of the priorities of an HARQ-ACK and an SR.

(1) In the case where the SR has a higher priority than the HARQ-ACK, (1-1) Upon generation of Positive SR before (or at) a time $T_{MUX}$-$T_1$, the UE transmits the A/N and the SR in a single PUCCH resource through UCI multiplexing.

(1-2) Upon generation of Positive SR after the time $T_{MUX}$-$T_1$,

The UE transmits the SR on the SR PUCCH, while dropping (or discontinuing) the A/N transmission.

Or for an A/N having X or fewer bits (e.g., X=2), the UE transmits the A/N and the SR in a single PUCCH resource through UCI multiplexing.

Or for an A/N having more than X bits (e.g., X=2), the UE transmits only an A/N for a specific single PDSCH (e.g., a primary cell (PCell) PDSCH) and the SR in a single PUCCH resource through UCI multiplexing.

(2) In the case where the HARQ-ACK has a higher priority than the SR, (2-1) Upon generation of Positive SR before (or at) the time $T_{MUX}$-$T_1$, the UE transmits the A/N and the SR in a single PUCCH resource through UCI multiplexing.

(2-2) Upon generation of Positive SR after the time $T_{MUX}$-$T_1$, the UE transmits only the A/N on the A/N PUCCH, while dropping (or discontinuing) the SR transmission.

In the present invention, $T_{MUX}$ is a transmission time of a PUCCH resource carrying a UCI-multiplexed result of the A/N and the SR, and $T_1$ may be one of the followings. Or $T_{MUX}$-$T_1$ may be a time when the UE starts to encode the HARQ-ACK.

1) Opt. 1: A (minimum) PDSCH-to-HARQ-ACK timing configured for the UE (by higher-layer signaling or the like)

2) Opt. 2: A PDSCH-to-HARQ-ACK timing configured/indicated for the last PDSCH (for which an HARQ-ACK is to be transmitted) that the UE has received.

3) Opt. 3: A (minimum) PDSCH-to-HARQ-ACK timing (or UE processing time) according to a UE capability (or implementation).

In the above configuration, the UE may perform UCI multiplexing (between the HARQ-ACK and the SR) according to PUCCH formats as follows.

<1> If the A/N PUCCH is in PF 2/3/4, and the SR PUCCH is in PF 0/1, the UE appends an SR bit(s) to UCI, and then transmits the A/N and the SR on the A/N PUCCH.

<2> If the A/N PUCCH is in PF 0/1, and the SR PUCCH is in PF 0/1 (except for the case in which both the A/N PUCCH and the SR PUCCH are in PF 1), the UE transmits the A/N on the A/N PUCCH with a CS increased by X (e.g., X=1) (Positive SR is represented by the CS increase).

<3> If the A/N PUCCH is in PF 1, and the SR PUCCH is in PF 1, the UE transmits A/N modulated symbols on the SR PUCCH (Positive SR is represented by selection/transmission of the SR PUCCH). This operation is applicable only when the starting symbol of the SR PUCCH is identical to or later than the starting symbol of the A/N PUCCH.

Further in the above configuration, the UE may prioritize the SR and the HARQ-ACK in the following manners.

1> The base station configures a prioritization relationship by higher-layer signaling.

2> The priorities are determined on the basis of the absolute value of an SR periodicity. For example, if the SR periodicity is equal to or less than a predetermined value, the SR may have a higher priority than the HARQ-ACK, and otherwise, the HARQ-ACK may have a higher priority than the SR.

3> The priorities are determined by comparing a PDSCH-to-HARQ-ACK timing configured for the UE with the SR periodicity. For example, if the PDSCH-to-HARQ-ACK timing is larger than the SR periodicity, the SR may have a higher priority than the HARQ-ACK, and otherwise, the HARQ-ACK may have a higher priority than the SR. The PDSCH-to-HARQ-ACK timing may be one of the following values.

Opt. 1: A (minimum) PDSCH-to-HARQ-ACK timing configured for the UE.

Opt. 2: A PDSCH-to-HARQ-ACK timing configured/indicated for the last PDSCH (for which an HARQ-ACK is to be transmitted) that the UE has received.

3) Opt. 3: A (minimum) PDSCH-to-HARQ-ACK timing (or UE processing time) according to a UE capability (or implementation).

In the present invention, the SR PUCCH and the A/N PUCCH may refer to PUCCH resources configured and/or indicated for SR (only) transmission and HARQ-ACK (only) transmission, respectively.

Further in the present invention, PF 0, PF 1, PF 2, PF 3, and PF 4 may represent PUCCH format 0, PUCCH format 1, PUCCH format 2, PUCCH format 3, and PUCCH format 4, respectively, and PF X/Y may represent PF X or PF Y.

Further in the present invention, a PDSCH-to-HARQ-ACK timing may refer to a time period spanning from the end of a PDSCH to an HARQ-ACK transmission time.

Further in the present invention, when it is said that Positive SR is generated, this may imply that UL data to be transmitted by the UE is generated, or the UE determines to request UL scheduling.

More specifically, in UCI-multiplexing between the HARQ-ACK and the SR, Positive SR may be generated after the UE starts to encode the HARQ-ACK or starts to transmit a PUCCH for the HARQ-ACK. Herein, consideration may be required regarding how the UE is to process the SR.

In the case where the HARQ-ACK has a higher priority than the SR, upon generation of Positive SR before encoding of the HARQ-ACK, the UE may multiplex the SR with the HARQ-ACK, and transmit the multiplexed SR and HARQ-ACK in a single PUCCH resource, and otherwise, the UE may transmit only the HARQ-ACK, while deferring the SR transmission to the next period.

However, there may be an SR transmission requiring low latency for the purpose of supporting a service such as URLLC in the NR system according to an embodiment of the present invention, and the SR transmission may have a higher priority than the HARQ-ACK transmission.

In the case where the SR has a higher priority than the HARQ-ACK as described above, upon generation of Positive SR before encoding of the HARQ-ACK, the UE may multiplex the SR with the HARQ-ACK, and transmit the multiplexed SR and HARQ-ACK in a single PUCCH resource, and otherwise, the UE may transmit only the SR, while dropping or discontinuing the HARQ-ACK transmission.

The starting time of the HARQ-ACK encoding at the UE may depend dominantly on the implementation of the UE, or may be preset to a time before a (minimum) PDSCH-to-HARQ-ACK timing with respect to the transmission starting time of a PUCCH resource carrying the UCI-multiplexed result. Herein, the base station is preferably allowed to control the priorities of the HARQ-ACK and the SR. For example, the following options may be considered for the base station to control the priorities of the HARQ-ACK and the SR.

[1] Opt. 1: Relative priorities are configured by higher-layer signaling (e.g., RRC signaling).

[2] Opt. 2: Relative priorities are configured according to the absolute value of an SR periodicity.

[3] Opt. 3: Relative priorities are determined on the basis of the relationship between a PDSCH-to-HARQ-ACK timing and an SR periodicity.

In Opt. 2, for example, if the SR periodicity is equal to or less than a predetermined value, the UE may determine that the SR has a higher priority than the HARQ-ACK. On the contrary, if the SR periodicity is larger than the predetermined value, the UE may determine that the HARQ-ACK has a higher priority than the SR.

In Opt. 3, for example, if the SR periodicity is less than a PDSCH-to-HARQ-ACK timing configured for the UE, the UE may determine that the SR has a higher priority than the HARQ-ACK. Otherwise, the UE may determine that the HARQ-ACK has a higher priority than the SR.

Figure 12:
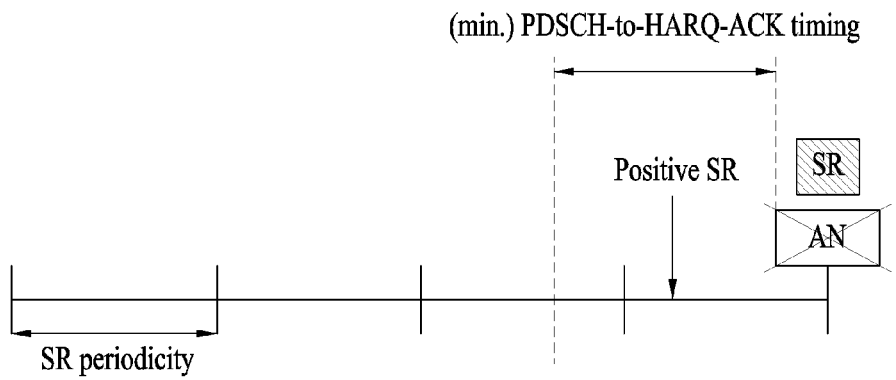
FIG. 12 is a schematic diagram illustrating an SR transmission method of a user equipment (UE), when an SR has a higher priority than a hybrid automatic repeat request-acknowledgement (HARQ-ACK) according to the present invention.

FIG. 12 is a schematic diagram illustrating an SR transmission period of a UE, when an SR has a higher priority than an HARQ-ACK according to the present invention.

FIG. 12 depicts a case in which when the HARQ-ACK and the SR are prioritized as in Opt. 3, the SR has a higher priority than the HARQ-ACK due to an SR periodicity shorter than a (minimum) PDSCH-to-HARQ-ACK timing.

Therefore, upon generation of Positive SR, the UE may transmit only the SR, while dropping the HARQ-ACK transmission. However, if Positive SR is generated during transmission of the HARQ-ACK, the UE may transmit the SR, discontinuing the HARQ-ACK transmission.

Figure 13:
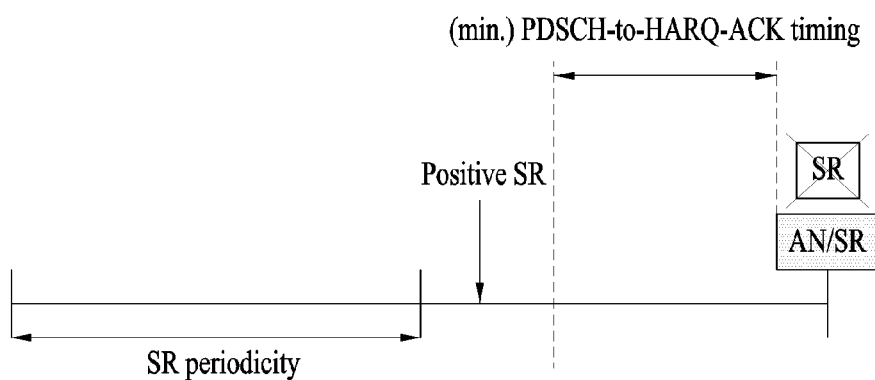
FIGS. 13 and 14 are schematic diagrams illustrating an SR transmission method of a UE, when an HARQ-ACK has a higher priority than an SR according to the present invention.
Figure 14:
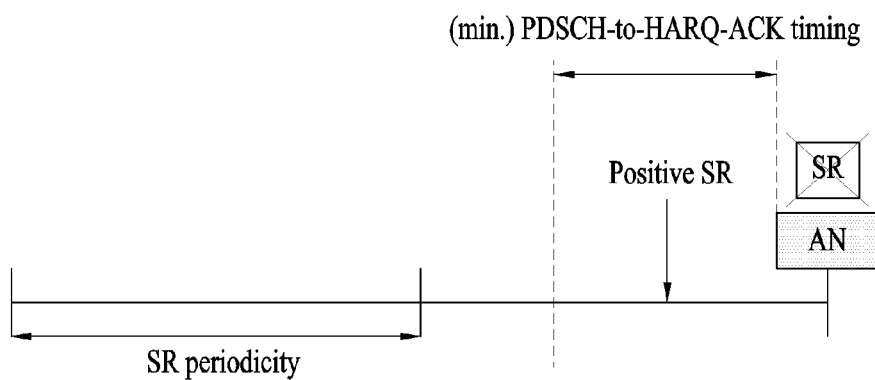

FIGS. 13 and 14 are schematic diagrams illustrating an SR transmission method of a UE, when an HARQ-ACK has a higher priority than an SR according to the present invention.

FIGS. 13 and 14 depict a case in which when the HARQ-ACK and the SR are prioritized as in Opt. 3, the HARQ-ACK has a higher priority than the SR due to an SR periodicity longer than a (minimum) PDSCH-to-HARQ-ACK timing. Then, upon generation of Positive SR before encoding of the HARQ-ACK starts, the UE may transmit the HARQ-ACK and the SR in a single PUCCH resource through UCI multiplexing, and otherwise, the UE may transmit the HARQ-ACK, deferring the SR transmission until the next period.

In the above configurations, the reason for setting a (minimum) PDSCH-to-HARQ-ACK timing as a reference time for an SR periodicity is that the value corresponds to the ending time of a bundling window to be referred to for HARQ-ACK multiplexing at the UE. That is, the base station may expect that the UE will start to encode the HARQ-ACK after detecting all PDSCHs within at least the bundling window.

Additionally, the single PUCCH resource carrying the UCI-multiplexed HARQ-ACK and SR may be defined as follows according to the PUCCH formats of PUCCH resources carrying the HARQ-ACK and the SR.

1] If the A/N PUCCH is in PF 2/3/4, and the SR PUCCH is in PF 0/1, the UE appends an SR bit(s) to UCI, and then transmits the A/N and the SR on the A/N PUCCH.

2] If the A/N PUCCH is in PF 0/1, and the SR PUCCH is in PF 0/1 (except for the case in which both the A/N PUCCH and the SR PUCCH are in PF 1), the UE transmits the A/N on the A/N PUCCH with a CS increased by X (e.g., X=1) (Positive SR is represented by the CS increase).

3] If the A/N PUCCH is in PF 1, and the SR PUCCH is in PF 1, the UE transmits A/N modulated symbols on the SR PUCCH (Positive SR is represented by selection/transmission of the SR PUCCH). If the starting symbol of the SR PUCCH is earlier than the starting symbol of the A/N PUCCH, the UE may transmit only the A/N on the A/N PUCCH, while dropping the SR transmission.

In the case where both of the A/N PUCCH and the SR PUCCH are in PF 1, the UE may perform the above operation only when the SR PUCCH and the AN PUCCH start in the same symbol, in order to prevent reduction of a UE processing time for HARQ-ACK encoding when HARQ-ACK information is transmitted on the SR PUCCH. Otherwise, the UE may drop the SR or HARQ-ACK transmission according to their priorities.

Additionally, when an HARQ-ACK (A/N) PUCCH resource (referred to as an A/N PUCCH) to be transmitted by the UE overlaps fully or partially on the time axis with an SR PUCCH resource (referred to as an SR PUCCH) to be transmitted by the UE, the A/N PUCCH may be in PF 2/3/4, and the SR PUCCH may be in PF 0/1. Then, the UE may represent SR information in an explicit bit(s), and then transmit coded modulated symbols of the SR bit(s) in punctured REs of the A/N PUCCH. (That is, the SR is transmitted piggybacked in some specific REs of the A/N PUCCH).

The modulation order of the SR bit(s) may be equal to that of the A/N.

Further, the number of coded modulated symbols of the SR (per layer) may be changed according to the size of UCI payload for the SR and an SR design parameter, beta-offset.

Further, SR REs mapped to REs of the A/N PUCCH by puncturing may be limited to a subset of (UCI) REs of the A/N PUCCH in OFDM symbols over which the A/N overlaps with the SR.

More specifically, the number of coded and modulated symbols of the SR (per layer) may be calculated on the basis of the coding rate of the A/N (or the UCI payload size of the A/N, the size of CRC bits for the A/N, and the number of REs carrying the A/N on the A/N PUCCH) or a maximum coding rate of the A/N PUCCH, a (SR) design parameter, beta-offset, a modulation order (of the SR), and the UCI payload size (of the SR).

For example, if the coding rate of the A/N (or the maximum coding rate of the A/N PUCCH) is denoted by $C_0$, the design parameter, beta-offset configured for the SR is denoted by $\beta_{offset}^{SR}$, the modulation order of the SR is denoted by $M_{SR}$, the UCI payload size of the SR is denoted by $O_{SR}$, and the CRC bit size of the SR is denoted by $L_{SR}$, the number of coded modulated symbols (per layer) for the SR, $Q'_{SR}$ may be calculated by the following equation.

$$Q'_{SR} = \min\left\{ \left\lceil \frac{\beta_{offset}^{SR} \cdot (O_{SR} + L_{SR})}{M_{SR} \cdot c_0} \right\rceil, UB_{SR} \right\} \quad \text{[Equation 2]}$$

In [Equation 2], $UB_{SR}$ represents an upper bound for the number of coded modulated symbols (per layer) for the SR. For example, $UB_{SR}$ may be the number of (UCI) REs in the A/N PUCCH in the OFDM symbols over which the A/N overlaps with the SR.

Additionally, when an HARQ-ACK (A/N) PUCCH resource (referred to as an A/N PUCCH) to be transmitted by the UE overlaps fully or partially on the time axis with an SR PUCCH resource (referred to as an SR PUCCH) to be transmitted by the UE, the UE may perform UCI transmission on the basis of the priorities of an HARQ-ACK (A/N) and an SR as follows.

(A) In the case where the A/N PUCCH is in PF 2/3/4, and the SR PUCCH in PF 0/1, (A-1) If the A/N has a higher priority than the SR (or the A/N PUCCH and the SR PUCCH start in the same symbol),
The UE transmits UCI payload configured by appending an SR bit(s) to the A/N on the A/N PUCCH.
If determining that there is no UL data arrival until before encoding of UCI to be transmitted on the A/N PUCCH starts, the UE regards this as Negative SR.

(A-2) If the SR has a higher priority than the A/N,
Opt. 1: The UE transmits only the SR PUCCH, while dropping the A/N transmission.
Opt. 2: The UE transmits (the whole or partial) SR PUCCH in overlapped (OFDM) symbols by puncturing A/N PUCCH REs in the (OFDM) symbols.
Opt. 3: the UE transmits the A/N on the A/N PUCCH, while the UE represents the (whole or partial) SR in an explicit bit(s), and transmits the coded modulated symbols of the SR in some punctured REs of the A/N PUCCH.

(B) In the case where the A/N PUCCH is in PF 0/1, and the SR PUCCH is in PF 0/1 (except for the case in which both of the A/N PUCCH and the SR PUCCH are in PF 1), (B-1) If the A/N has a higher priority than the SR (or the A/N PUCCH and the SR PUCCH start in the same symbol),
For Positive SR, the UE transmits the A/N on the A/N PUCCH with an increased CS, and for Negative SR, the UE transmits the A/N in the A/N PUCCH resource. The CS increase may be applied to the A/N PUCCH resource in whole (OFDM) symbols or (OFDM) symbols overlapped with the SR.
If determining that there is no UL data arrival until before the start of modulation of the A/N PUCCH, the UE regards this as Negative SR (or the Negative SR determination depends on UE implementation).

(B-2) If the SR has a higher priority than the A/N,
Opt. 1: The UE transmits only the SR PUCCH, while dropping the A/N transmission.
Opt. 2: The UE transmits the (whole or partial) SR PUCCH in overlapped (OFDM) symbols by puncturing A/N PUCCH REs in the (OFDM) symbols.
Opt. 3: The UE transmits the A/N on the A/N PUCCH, while the UE represents the (whole or partial) SR by changing a CS (or sequence) in the overlapped (OFDM) symbols.

(C) In the case where the A/N PUCCH is in F1 and the SR PUCCH is F1, (C-1) If the A/N has a higher priority than the SR (or the A/N PUCCH and the SR PUCCH starts in the same symbol),
For Positive SR, the UE transmits the A/N in the SR PUCCH resource, and for Negative SR, the UE transmits the A/N in the A/N PUCCH resource.
If determining that there is no UL data arrival until before the start of modulation (or subcarrier mapping) of the A/N PUCCH, the UE regards this as Negative SR (or the Negative SR determination depends on UE implementation).

(C-2) If the SR has a higher priority than the A/N,
Opt. 1: The UE transmits only the SR PUCCH, while dropping the A/N transmission.
Opt. 2: The UE punctures A/N PUCCH REs in the overlapped (OFDM) symbols, and transmits the (whole or partial) SR PUCCH in the (OFDM) symbols.
Opt. 3: The UE transmits the A/N on the A/N PUCCH, while the UE transmits the (whole or partial) SR by changing a CS (or sequence) in the overlapped (OFDM) symbols.

In the above configurations, the priorities of the A/N and the SR may be determined in a combination of one or more of the following prioritization rules, or configured by higher-layer signaling and/or DCI from the base station.

A) Opt. 1: A PUCCH having a shorter PUCCH duration has a higher priority.
B) Opt. 2: A PUCCH having a shorter period or a shorter UL timing (e.g., PDSCH-to-HARQ-ACK timing) has a higher priority.
C) Opt. 3: A PUCCH having an earlier starting symbol has a higher priority.

Additionally, the following description is given with the appreciation that relative priorities between the A/N and the SR are determined by PUCCH durations, an SR periodicity, and a (minimum) UL timing (e.g., PDSCH-to-HARQ-ACK timing) for the A/N. Specifically, if UCI 1 is transmitted on a long PUCCH, only when UCI 2 is transmitted on a short PUCCH and has a shorter period (or a shorter (minimum) UL timing), UCI 2 has priority over UCI 1. In any other case, it is assumed that UCI corresponding to the A/N between UCI 1 and UCI 2 has a higher priority.

<A> If the A/N PUCCH is in PF 3/4, and the SR PUCCH is in PF 1,
The UE transmits UCI payload configured by appending an SR bit(s) to the A/N on the A/N PUCCH.
If determining that there is no UL data arrival until before encoding of UCI to be transmitted on the A/N PUCCH starts, the UE regards this as Negative SR.

<B> In the case where the A/N PUCCH is in PF 3/4, and the SR PUCCH is in PF 0,

<B-1> If SR periodicity<(minimum) PDSCH-to-HARQ-ACK timing,
Opt. 1: The UE transmits only the SR PUCCH, while dropping the A/N transmission.
Opt. 2: The UE punctures A/N PUCCH REs in the overlapped (OFDM) symbols, and transmits the (whole or partial) SR PUCCH in the (OFDM) symbols.
Opt. 3: The UE transmits the A/N on the A/N PUCCH, while representing the (whole or partial) SR in an explicit bit(s) and transmitting the coded modulated symbols of the SR in some punctured REs of the A/N PUCCH.

<B-2> If SR periodicity>(minimum) PDSCH-to-HARQ-ACK timing,

The UE transmits UCI payload configured by appending an SR bit(s) to the A/N on the A/N PUCCH.

If determining that there is no UL data arrival until before encoding of UCI to be transmitted on the A/N PUCCH starts, the UE regards this as Negative SR.

<C> In the case where the A/N PUCCH is in PF 1, and the SR PUCCH is in PF 1,

For Positive SR, the UE transmits the A/N in the SR PUCCH resource, and for Negative SR, the UE transmits the A/N in the A/N PUCCH resource.

If determining that there is no UL data arrival until before modulation (or subcarrier mapping) of the A/N PUCCH starts, the UE regards this as Negative SR (or the Negative SR determination depends on UE implementation).

<D> In the case where the A/N PUCCH is in PF 1, and the SR PUCCH is in PF 0,

<B-1> If SR periodicity<(minimum) PDSCH-to-HARQ-ACK timing,

Opt. 1: The UE transmits only the SR PUCCH, while dropping the A/N transmission.

Opt. 2: The UE punctures A/N PUCCH REs in the overlapped (OFDM) symbols, and transmits the (whole or partial) SR PUCCH in the (OFDM) symbols.

Opt. 3: The UE transmits the A/N on the A/N PUCCH, while transmitting the (whole or partial) SR by changing a CS (or sequence) in the overlapped (OFDM) symbols.

<D-2> If SR periodicity>(minimum) PDSCH-to-HARQ-ACK timing

For Positive SR, the UE transmits the A/N on the A/N PUCCH with an increased CS, and for Negative SR, the UE transmits the A/N in the A/N PUCCH. The CS increase may be applied to the A/N resource in whole (OFDM) symbols or (OFDM) symbols overlapped with the SR.

If determining that there is no UL data arrival until before the start of modulation (or subcarrier mapping) of the A/N PUCCH, the UE regards this as Negative SR (or the Negative SR determination depends on UE implementation).

<E> If the A/N PUCCH is in PF 2, and the SR PUCCH is in PF 0/1,

The UE transmits UCI payload configured by appending an SR bit(s) to the A/N on the A/N PUCCH.

If determining that there is no UL data arrival until before encoding of UCI to be transmitted on the A/N PUCCH starts, the UE regards this as Negative SR.

<F> If the A/N PUCCH is in PF 0, and the SR PUCCH is in PF 0/1,

For Positive SR, the UE transmits the A/N on the A/N PUCCH with an increased CS, and for Negative SR, the UE transmits the A/N in the A/N PUCCH resource. The CS increase may be applied to the A/N PUCCH resource in whole (OFDM) symbols or (OFDM) symbols overlapped with the SR.

If determining that there is no UL data arrival until before the start of modulation (subcarrier mapping) of the A/N PUCCH, the UE regards this as Negative SR (or the Negative SR determination depends on UE implementation).

In the above configuration, a (minimum) PDSCH-to-HARQ-ACK timing may be the minimum of PDSCH-to-HARQ-ACK timings configured or preset for the A/N PUCCH.

Unless otherwise conflicting with each other, the $20^{th}$ SR transmission method and other proposed methods of the present invention may be applied in combination.

3.21. $21^{th}$ SR Transmission Method

When an HARQ-ACK PUCCH resource (an A/N PUCCH) to be transmitted by the UE overlaps fully or partially with a CSI PUCCH resource (a CSI PUCCH) on the time axis, the UE may transmit an HARQ-ACK and CSI on a single PUCCH through UCI multiplexing, and determine a CSI reference resource as follows.

(1) In the case where the single PUCCH is an A/N PUCCH,

The (time-domain) CSI reference resource for the CSI may be an earliest (valid) DL slot before (or at) a time $T_{A/N}\text{-}T_1$ and before (or at) a time $T_{CSI}\text{-}T_{CQI}$.

(2) In the case where the single PUCCH is a CSI PUCCH,

The (time-domain) CSI reference resource for the CSI may be the earliest (valid) DL slot before (or at) a time $T_{CSI}\text{-}T_1$, and before (or at) the time $T_{CSI}\text{-}T_{CQI}$.

Herein, $T_{A/N}$ may be an A/N PUCCH transmission time, and $T_1$ may be one of the following timings.

Opt. 1: A (minimum) PDSCH-to-HARQ-ACK timing configured for the UE.

Opt. 2: A PDSCH-to-HARQ-ACK timing for the last PDSCH (for which an HARQ-ACK is to be transmitted) that the UE has received.

Opt. 3: A (minimum) PDSCH-to-HARQ-ACK timing according to a UE capability (or implementation)

Herein, $T_{CSI}$ is a CSI PUCCH transmission time, and $T_{CQI}$ may be a value preset between the base station and the UE or configured for the UE by the base station.

Further, the CSI reference resource may refer to a time resource referred to for CSI calculation, a (valid) DL slot may refer to a slot configured as a DL slot (for the UE), and/or a slot that is not included in a measurement gap, and/or a slot included in a DL BWP in which CSI reporting is performed.

Further, the PDSCH-to-HARQ-ACK timing may refer to a time period spanning from the end of a PDSCH to an HARQ-ACK transmission time.

More specifically, if a PDSCH corresponding to an HARQ-ACK is a DL assignment-based PDSCH, an HARQ-ACK/SR and CSI may be transmitted on the AN PUCCH. Therefore, if a PUCCH resource carrying the HARQ-ACK/SR overlaps with a PUCCH resource carrying CSI on the time axis, the UE may always transmit the HARQ-ACK/SR and the CSI in a single PUCCH resource through UCI multiplexing, while changing only a CSI reference resource for CSI calculation in order to guarantee a UE processing time for the HARQ-ACK.

For example, it is assumed that a CSI reference resource for CSI only transmission is later than the starting time of HARQ-ACK encoding. When the UE is to jointly encode the HARQ-ACK and the CSI after CSI calculation, the UE processing time until the PUCCH transmission time may not be ensured because the UE performs the joint encoding later than encoding of HARQ-ACK only.

Therefore, in the case where a PUCCH (for HARQ-ACK/SR transmission) overlaps with a CSI PUCCH on the time axis, the present invention proposes a method of always transmitting the HARQ-ACK/SR and the CSI on a single PUCCH through UCI multiplexing, and changing a CSI reference resource such that the CSI reference resource exists before a (minimum) PDSCH-to-HARQ-ACK timing with respect to a PUCCH resource to carry the multiplexed UCI.

More specifically, a CSI reference resource may be defined as depicted in the following table in the NR system according to an embodiment of the present invention.

TABLE 26

5.2.2.1.1 CSI reference resource definition

The CSI reference resource for a serving cell is defined as follows:
   In the frequency domain, the CSI reference resource is defined by the group of downlink physical resource blocks corresponding to the band to which the derived CQI value relates.
   In the time domain, for a UE configured with a single CSI resource set for the serving cell, the CSI reference resource is defined by a single downlink slot n-$n_{CQI\_ref}$,
     where for periodic and semi-persistent CSI reporting $n_{CQI\_ref}$ is the smallest value greater than or equal to [TBD], such that it corresponds to a valid downlink slot.
     where for aperiodic CSI reporting, if the UE is indicated by the DCI to report CSI in the same slot as the CSI request, $n_{CQI\_ref}$ is such that the reference resource is in the same valid downlink slot as the corresponding CSI request, otherwise $n_{CQI\_ref}$ is the smallest value greater than or equal to [TBD], such that slot n-$n_{CQI\_ref}$ corresponds to a valid downlink slot.

Herein, $n_{CQI\_ref}$ may be set to be larger than the (minimum) PDSCH-to-HARQ-ACK timing. Thus, CSI calculation may not affect a UE processing time for an HARQ-ACK. Notably, n may represent a slot carrying CSI in this case.

Unless otherwise conflicting with each other, the 20$^{th}$ SR transmission method and other proposed methods of the present invention may be applied in combination.

Figure 15:
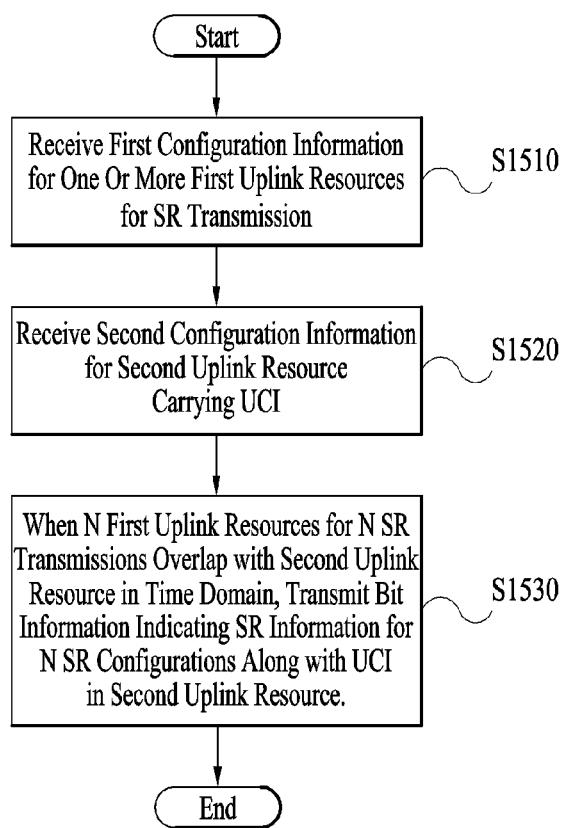
FIG. 15 is a flowchart illustrating a method of transmitting an SR by a UE according to the present invention.

FIG. 15 is a flowchart illustrating a method of transmitting an SR by a UE according to the present invention.

The UE first receives first configuration information for one or more first UL resources for SR transmission from an base station (S1510). The first configuration information may be received by higher-layer signaling.

The UE then receives second configuration information for a second UL resource for UCI transmission from the base station (S1520). The second configuration information may be received in DCI.

If N (N is a natural number larger than 1) first UL resources for N SR transmissions overlap with the second UL resource in the time domain, the UE transmits bit information indicating SR information for N SR configurations (or SR processes) together with the UCI in the second UL resource (S1530).

The bit information indicating the SR information for the N SR configurations may indicate information about one of the N SR configurations and Positive SR information corresponding to the one SR configuration.

Or, the bit information indicating the SR information for the N SR configurations may include a plurality of bits indicating whether SR information corresponding to each of the N SR configurations is Positive SR or Negative SR.

For example, if SR information corresponding to each of the plurality of bits is Positive SR, the bit has a value of 1, and if the SR information is Negative SR, the bit has a value of 0.

Further, the plurality of bits may be configured in an order of identification information about the N SR configurations. For example, the plurality of bits may be configured in an order of SR process (or SR configuration) indexes of SR information corresponding to the plurality of bits.

In the present invention, the first UL resources and the second UL resource may overlap fully or partially with each other in the time domain.

Further in the present invention, the second UL resource may be a PUCCH resource carrying HARQ-ACK information.

In the above configuration, the UCI may include one or more of CSI and HARQ-ACK information.

The UE may transmit the bit information indicating the SR information for the N SR configurations along with the HARQ-ACK information in the second UL resource in various methods. For example, the UE generates UCI payload by combining the bit information indicating the SR information for the N SR configurations with the UCI, generates a coded bit format for the UCI payload, and transmit the coded bit format in the second UL resource. Thus, the UE may transmit the bit information indicating the SR information for the N SR configurations along with the UCI in the second UL resource.

In correspondence with the operation of the UE, the base station transmits first configuration information for one or more first UL resources for SR transmission, and transmits second configuration information for a second UL resource carrying ACK/NACK information.

When N first UL resources for N SR transmissions overlap with the second UL resource in the time domain, the base station receives bit information indicating SR information for N SR configurations along with UCI in the second UL resource.

Additionally, the UE according to the present invention may transmit an SR in the following manner.

The UE first determines a first PUCCH format carrying SR information, and a second PUCCH format carrying HARQ-ACK information. The first and second PUCCH formats carrying the SR information and the HARQ-ACK information may be determined according to configuration information of the base station and/or UCI payload to be transmitted.

If the first PUCCH format is a PUCCH format including one or two symbols and supporting UCI of up to 2 bits, the second PUCCH format is a PUCCH format including 4 or more symbols and supporting UCI of up to 2 bits, and the SR information is Positive SR, the UE may transmit only the HARQ-ACK information in the second PUCCH format.

In this manner, the UE may simultaneously transmit the SR information and the HARQ-ACK information.

More specifically, the UE may perform the simultaneous transmission of the SR and the HARQ-ACK information, only when a first UL resource carrying the SR information overlaps with a second UL resource carrying the HARQ-ACK information in the time domain.

Therefore, in the case where the first UL resource carrying the SR information overlaps with the second UL resource carrying the HARQ-ACK information in the time domain as described above, upon receipt of the HARQ-ACK information only in the PUCCH format for HARQ-ACK information transmission from the UE, the base station may implicitly determine that UE-intended SR information is Positive SR, as agreed with the UE.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the base station to the UE through a predefined signal (e.g., physical layer signal, higher layer signal, etc.).

4. Device Configuration

Figure 16:
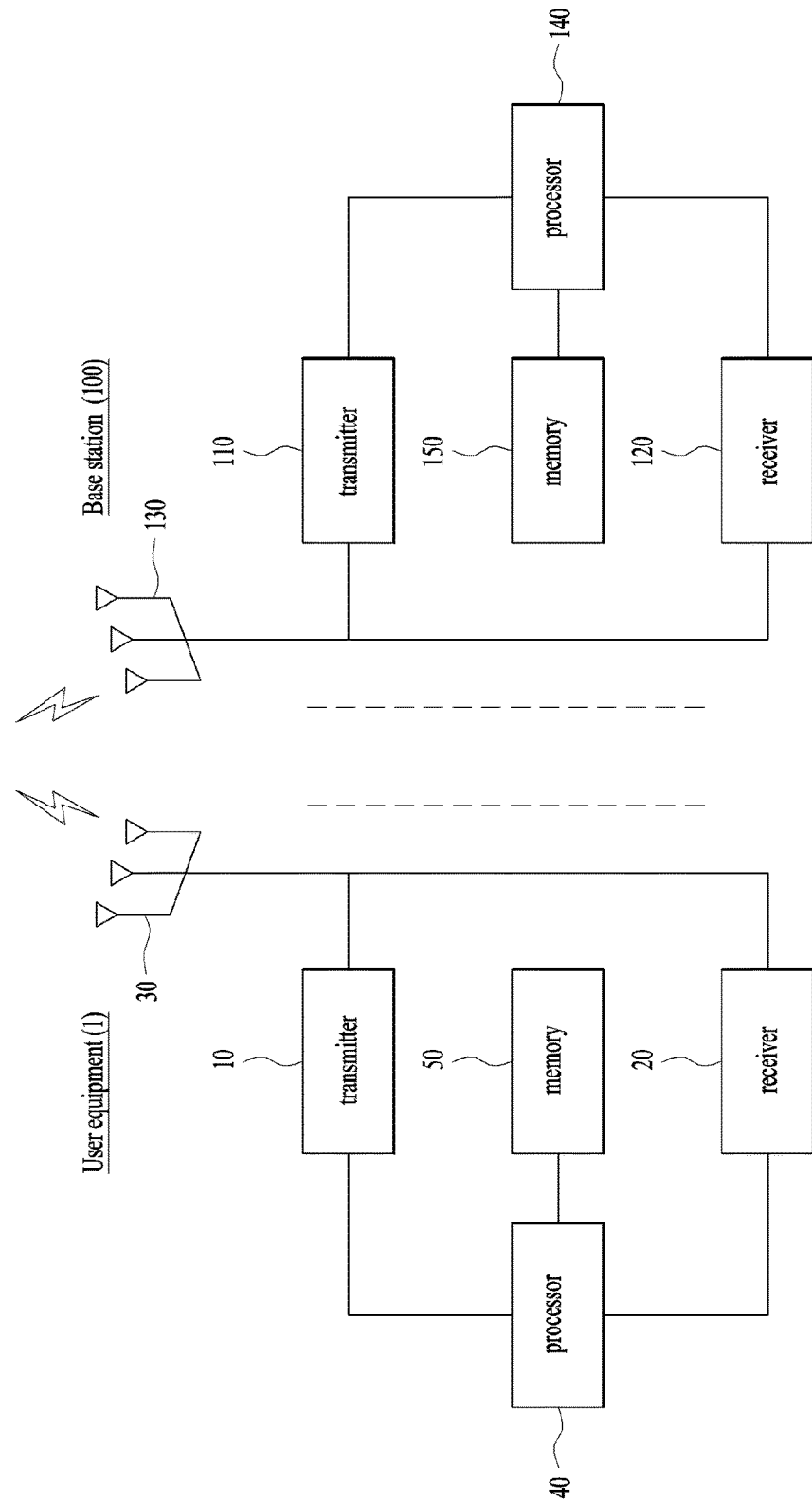
FIG. 16 is a block diagram of a UE and a base station (BS) for implementing the proposed embodiments.

FIG. 16 is a diagram illustrating configurations of a UE and a base station capable of being implemented by the embodiments proposed in the present invention. The UE and the base station illustrated in FIG. 16 operate to implement the afore-described embodiments of a method of transmitting and receiving an SR between a UE and a base station.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE having the above configuration receives first configuration information for one or more first UL resources for SR transmission and second configuration information for a second UL resource carrying UCI from the base station 100. When N first UL resources for N SR transmissions (N is a natural number larger than 1) overlaps with the second UL resource in the time domain, the UE 1 transmit bit information indicating SR information for N SR configurations along with the UCI in the second UL resource through the Tx 10.

In correspondence with the operation of the UE 1, the base station 100 transmits first configuration information for one or more first UL resources for SR transmission, and second configuration information for a second UL resource carrying UCI to the UE 1 through the Tx 110. When N first UL resources for SR transmission (N is a natural number larger than 1) overlap with the second UL resource in the time domain, the base station 100 receives bit information indicating SR information for N SR configurations along with the UCI in the second UL resource through the Rx 120.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 16 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting a scheduling request (SR) to a base station (BS) by a user equipment (UE) in a wireless communication system, the method comprising:
receiving, from the BS, (i) first information related to first physical uplink control channel (PUCCH) resources for a plurality of SRs, and (ii) second information related to a second PUCCH resource for hybrid automatic repeat request acknowledgement (HARQ-ACK) information, wherein at least one of the first PUCCH resources overlaps in time with the second PUCCH resource; and transmitting a signal comprising (i) the HARQ-ACK information and (ii) bit information related to the plurality of SRs, which is appended to the HARQ-ACK information,
wherein, in a state in which at least one of the plurality of SRs is a positive SR, and based on the HARQ-ACK information being larger than 2 bits: the bit information related to the plurality of SRs is configured to identify one SR from among the plurality of SRs.

2. The method according to claim 1, wherein the first information is received by higher-layer signaling.

3. The method according to claim 1, wherein the second information is received in downlink control information (DCI).

4. The method according to claim 1, wherein the bit information related to the plurality of SRs is configured to identify the one SR from among the plurality of SRs as a positive SR.

5. The method according to claim 1, wherein the bit information related to the plurality of SRs comprises a plurality of bits in which each bit indicates whether a corresponding SR among the plurality of SRs is a positive SR or a negative SR.

6. The method according to claim 5, wherein based on an SR among the plurality of SRs being a positive SR, a corresponding bit among the plurality of bits has a value of 1, and
wherein based on an SR among the plurality of SRs being a negative SR, a corresponding bit among the plurality of bits has a value of 0.

7. The method according to claim 5, wherein the plurality of bits are configured in an order according to identification information for each of the plurality of SRs.

8. The method according to claim 1, wherein the at least one of the first PUCCH resources overlaps in time fully or partially with the second PUCCH resource.

9. The method according to claim 1, wherein the second PUCCH resource carries uplink control information (UCI) comprising the HARQ-ACK information.

10. The method according to claim 9, wherein the bit information related to the plurality of SRs is transmitted in the second PUCCH resource by using a coded bit format generated by combining the bit information with the UCI.

11. The method according to claim 1, wherein transmitting the signal is performed via a third PUCCH resource.

12. The method according to claim 11, wherein the third PUCCH resource is the same as the second PUCCH resource for transmitting the HARQ-ACK.

13. The method according to claim 11, wherein the third PUCCH resource is determined based on a total size of (i) the HARQ-ACK information and (ii) the bit information related to the plurality of SRs.

14. The method according to claim 1, wherein the bit information related to the plurality of SRs is configured to identify the one SR by an index for the one SR, from among an ordered plurality of indices corresponding to the plurality of SRs.

15. A method of receiving a scheduling request (SR) from a user equipment (UE) by a base station (BS) in a wireless communication system, the method comprising:
transmitting, to the UE, (i) first information related to first physical uplink control channel (PUCCH) resources for a plurality of SRs, and (ii) second information related to a second PUCCH resource for hybrid automatic repeat request acknowledgement (HARQ-ACK) information, wherein at least one of the first PUCCH resources overlaps in time with the second PUCCH resource; and receiving a signal comprising (i) the HARQ-ACK information, and (ii) bit information related to the plurality of SRs, which is appended to the HARQ-ACK information, wherein, in a state in which at least one of the plurality of SRs is a positive SR, and based on the HARQ-ACK information being larger than 2 bits: the bit information related to the plurality of SRs is configured to identify one SR from among the plurality of SRs.

16. A user equipment (UE) configured to transmit a scheduling request (SR) to a base station (BS) in a wireless communication system, the UE comprising:
a receiver;
a transmitter;
at least one processor; and
at least one computer memory operably connectable to the at least one processor and storing instructions that, when executed by the at least one processor, perform operations comprising:
receiving, from the BS, (i) first information related to first physical uplink control channel (PUCCH) resources for a plurality of SRs, and (ii) second information related to a second PUCCH resource for hybrid automatic repeat request acknowledgement (HARQ-ACK) information, wherein at least one of the first PUCCH resources overlaps in time with the second PUCCH resource; and
transmitting a signal comprising (i) the HARQ-ACK information, and (ii) bit information related to the plurality of SRs, which is appended to the HARQ-ACK information,
wherein, in a state in which at least one of the plurality of SRs is a positive SR, and based on the HARQ-ACK information being larger than 2 bits: the bit information related to the plurality of SRs is configured to identify one SR from among the plurality of SRs.

17. A base station (BS) configured to receive a scheduling request (SR) from a user equipment (UE) in a wireless communication system, the BS comprising:
a receiver;
a transmitter;
at least one processor; and
at least one computer memory operably connectable to the at least one processor and storing instructions that, when executed by the at least one processor, perform operations comprising:
transmitting, to the UE, (i) first information related to first physical uplink control channel (PUCCH) resources for a plurality of SRs, and (ii) second information related to a second PUCCH resource for hybrid automatic repeat request acknowledgement (HARQ-ACK) information, wherein at least one of the first PUCCH resources overlaps in time with the second PUCCH resource; and
receiving a signal comprising (i) the HARQ-ACK information and (ii) bit information related to the plurality of SRs, which is appended to the HARQ-ACK information, wherein, in a state in which at least one of the plurality of SRs is a positive SR, and based on the HARQ-ACK information being larger than 2 bits: the bit information related to the plurality of SRs is configured to identify one SR from among the plurality of SRs.

* * * * *